(12) United States Patent
Kitano et al.

(10) Patent No.: US 12,716,792 B2
(45) Date of Patent: Aug. 25, 2026

(54) ESTIMATING DEVICE, ESTIMATING METHOD, AND ESTIMATING PROGRAM

(71) Applicant: BRIDGESTONE CORPORATION, Tokyo (JP)

(72) Inventors: Hajime Kitano, Tokyo (JP); Yasumichi Wakao, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 261 days.

(21) Appl. No.: 18/718,066

(22) PCT Filed: Jul. 12, 2022

(86) PCT No.: PCT/JP2022/027488
§ 371 (c)(1),
(2) Date: Jun. 10, 2024

(87) PCT Pub. No.: WO2023/112369
PCT Pub. Date: Jun. 22, 2023

(65) Prior Publication Data

US 2025/0383244 A1 Dec. 18, 2025

(30) Foreign Application Priority Data

Dec. 14, 2021 (JP) ................................ 2021-202866
Dec. 14, 2021 (JP) ................................ 2021-202867
Dec. 14, 2021 (JP) ................................ 2021-202868

(51) Int. Cl.
*G01L 1/20* (2006.01)
*G01B 7/16* (2006.01)
(Continued)

(52) U.S. Cl.
CPC ................ *G01L 1/205* (2013.01); *G01B 7/18* (2013.01); *G01L 1/2256* (2013.01);
(Continued)

(58) Field of Classification Search
CPC ..... G01L 1/205; G01L 1/2256; G01L 1/2287; G01L 5/0052; G01B 7/18; G01M 1/122
See application file for complete search history.

(56) References Cited

U.S. PATENT DOCUMENTS 9,399,557 B1 7/2016 Mishra et al.
12,569,989 B2 * 3/2026 Kitano .................... B25J 9/163
(Continued)

FOREIGN PATENT DOCUMENTS

AU 2016308995 A1 3/2018
CN 110414366 A 11/2019
(Continued)

OTHER PUBLICATIONS

International Search Report issued by JPO in International Application No. PCT/JP2022/027488 on Sep. 27, 2022.
(Continued)

*Primary Examiner* — Stephanie E Bloss
*Assistant Examiner* — Diana Hancock
(74) *Attorney, Agent, or Firm* — SOLARIS Intellectual Property Group, PLLC

(57) ABSTRACT

An estimating device including: a detecting section detecting electrical characteristics at a flexible material that is electrically conductive and has electrical characteristics that vary in accordance with a magnitude of an applied stimulus and that is at an assisting member that has the flexible material and is provided at a transporting section that transports a transported object; and an estimating section that inputs time-series electrical characteristics to a learning model that is trained by using, as learning data, time-series electrical characteristics at times when a stimulus was applied to the flexible material, and placed state information expressing a placed state of the transported object with respect to the assisting member that applies a stimulus to the
(Continued)

flexible material, such that the time-series electrical characteristics are inputs of the learning model and the learning model outputs the placed state information expressing a placed state corresponding to inputted time-series electrical characteristics.

14 Claims, 32 Drawing Sheets

(51) Int. Cl.
*G01L 1/22* (2006.01)
*G01L 5/00* (2006.01)
*G01M 1/12* (2006.01)

(52) U.S. Cl.
CPC .......... *G01L 1/2287* (2013.01); *G01L 5/0052* (2013.01); *G01M 1/122* (2013.01)

(56) References Cited

U.S. PATENT DOCUMENTS

2018/0172526 A1* 6/2018 Dunne .................... G01B 7/18
2020/0386630 A1* 12/2020 Ronay .................... G01L 1/04
2023/0017613 A1 1/2023 Sakurai et al.
2024/0104374 A1* 3/2024 Wakao .................... G01B 7/18
2024/0286278 A1* 8/2024 Kitano .................... B25J 9/1612
2025/0044072 A1* 2/2025 Kitano .................... G01B 7/18

FOREIGN PATENT DOCUMENTS

JP 2013-101096 A 5/2013
JP 2020-154849 A 9/2020
JP 2021-099552 A 7/2021
WO 2017/029905 A1 2/2017
WO 2021/198935 A1 10/2021

OTHER PUBLICATIONS

Yang, Yuan et al., "A flexible touching sensor with the variation of electrical impedance distribution", Measurement, Institute of Measurement and Control. London, GB, vol. 183, Jun. 22, 2021.

Sakurai Ryo et al., "Emulating a sensor using soft material dynamics: A reservoir computing approach to pneumatic artificial muscle", 2020 3rd IEEE International Conferenceon Soft Robotics (Robosoft), IEEE, May 15, 2020, pp. 710-717.

* cited by examiner 1
2
3
STATE DATA
STIMULUS
22
75
75
#1
76
A
4
INPUT DATA (ELECTRICAL CHARACTERISTICS)
5
ESTIMATING SECTION
51
LEARNING MODEL
6
OUTPUT DATA (STATE)

A
A
2(21, 22)
2-1
21
22
2-2
21
22
2-3
21
22
2-4
21
22
2-5
22
21
2-6
21
22

52
540
(INPUT LAYER)
542
(INTERMEDIATE LAYER)
544
(OUTPUT LAYER)
65
COMPU-
TING
UNIT
ERROR
GENERATED
OUTPUT
DATA
6A
CORRECT
PARAMETERS
CORRECT
PARAMETERS
CORRECT
PARAMETERS
CORRECT
PARAMETERS
6
OUTPUT
DATA
(TARGET)
3
STATE
DATA
(STIMULUS)
4
INPUT DATA
(ELECTRICAL
CHARACTERISTICS)
54

100
102
104
106
108
108M
108D
108P
110
112
114
116
118(2)
CPU
RAM
ROM
I/O
LEARNING MODELS
DATA
CONTROL PROGRAM
COMMUNICATION SECTION
OPERATION/DISPLAY PORTION
DETECTING SECTION
75
75
22
76
A 1C
10C-1
BEHAVIOR STATE ESTIMATING SECTION
BEHAVIOR STATE ANALYZING SECTION
12C
COMPARING/ JUDGING SECTION
14C
THRESHOLD VALUE STORING SECTION
16C
CONTROL COMMAND OUTPUTTING SECTION
6
OUTPUT DATA (BEHAVIOR STATE)
DEVICE

ESTIMATING DEVICE, ESTIMATING METHOD, AND ESTIMATING PROGRAM

TECHNICAL FIELD

The present disclosure relates to an estimating device, an estimating method and an estimating program.

BACKGROUND ART

Conventionally, changes in shape arising at an object are detected, and the state of a person or a thing that imparts deformation to the object is estimated by using the results of detection. In an aspect in which changes in shape that arise at an object are detected, it is difficult to detect deformation of the object without obstructing the deformation. Further, because it is difficult to use strain sensors, which are used in detecting rigid bodies such as metal deformation or the like, in products, a special detecting device is needed in order to detect deformation of an object. For example, there is known a technique in which displacement and vibrations of an object are measured by using a camera, images of the deformation are acquired, and the deformation amount is extracted therefrom (see, for example, International Publication No. 2017/029905). Further, techniques relating to flexible touch sensors that estimate the amount of deformation from the amount of transmitted light also are known (see, for example, Japanese Patent Application Laid-Open (JP-A) No. 2013-101096).

SUMMARY OF INVENTION

Technical Problem

By the way, when transporting a transported object, it is preferable to dispose the transported object at a transporting section while maintaining the balance of the transported object. For example, in a case in which plural transported objects are loaded on and transported by a transporting section, if a transported object is disposed so as to be offset from a specific place, there are cases in which the transported object will break or move. Further, there are cases in which a transported object breaks or moves due to a moment that arises depending on the transporting direction at the time of transporting, e.g., the moving direction in a case in which a transported object is placed on a moving body and transported. Accordingly, the state at the time of placing the transported object is important.

However, in an aspect in which changes in shape that arise at an object or the like are detected, if the deformation amount such as the displacement or the like of the transported object at the transporting section is detected by using a camera and an image analysis method, the system that includes the camera and the image analysis and the like becomes a large-scale system, which leads to an increase in the size of the device and therefore is not preferable. Further, portions that are hidden and that cannot be captured by the camera cannot be measured by optical methods that use a camera. Accordingly, there is room for improvement in applying the detection of deformation of an object to the transporting of transported objects.

Solution to Problem

An estimating device of the present disclosure including: a detecting section detecting electrical characteristics between a plurality of predetermined detection points at a flexible material that is electrically conductive and has electrical characteristics that vary in accordance with a magnitude of an applied stimulus and that is at an assisting member that has the flexible material and is provided at a transporting section that transports a transported object; and an estimating section that inputs time-series electrical characteristics detected by the detecting section to a learning model that is trained by using, as learning data, time-series electrical characteristics at times when a stimulus was applied to the flexible material, and placed state information expressing a placed state of the transported object with respect to the assisting member that applies a stimulus to the flexible material, or contact state information expressing a contact state with an external object that applies deformation to the flexible material, or behavior state information that expresses a behavior state of the transported object with respect to the assisting member that applies a stimulus to the flexible material, such that the time-series electrical characteristics are inputs of the learning model and the learning model outputs the placed state information or the contact state information or the behavior state information, and the estimating section estimates placed state information expressing a placed state corresponding to inputted time-series electrical characteristics, or contact state information expressing a contact state corresponding to inputted time-series electrical characteristics, or behavior state information expressing a behavior state corresponding to inputted time-series electrical characteristics.

A first aspect is an estimating device, including:

a detecting section detecting electrical characteristics between a plurality of predetermined detection points at a flexible material that is electrically conductive and has electrical characteristics that vary in accordance with a magnitude of an applied stimulus and that is at an assisting member that has the flexible material and is provided at a transporting section that transports a transported object; and an estimating section that inputs time-series electrical characteristics detected by the detecting section to a learning model that is trained by using, as learning data, time-series electrical characteristics at times when a stimulus was applied to the flexible material, and placed state information expressing a placed state of the transported object with respect to the assisting member that applies a stimulus to the flexible material, such that the time-series electrical characteristics are inputs of the learning model and the learning model outputs the placed state information, and the estimating section estimates placed state information expressing a placed state corresponding to inputted time-series electrical characteristics.

A second aspect is an estimating device, including:

a detecting section detecting electrical characteristics between a plurality of predetermined detection points at a flexible material that is electrically conductive and has electrical characteristics that vary in accordance with deformation and that is at an assisting member that has the flexible material and is provided at an exterior of a transporting section that transports a transported object; and an estimating section that inputs time-series electrical characteristics detected by the detecting section to a learning model that is trained by using, as learning data, time-series electrical characteristics of the flexible material that deforms by contact of an external object, and contact state information expressing a contact state with the external object that applies deformation to the flexible material, such that the time-series electrical characteristics are inputs of the learning model and the learning model outputs the contact state information, and the estimating section estimates contact state information expressing a contact state corresponding to inputted time-series electrical characteristics.

A third aspect is an estimating device, including:

a detecting section detecting electrical characteristics between a plurality of predetermined detection points at a flexible material that is electrically conductive and has electrical characteristics that vary in accordance with a magnitude of an applied stimulus and that is at an assisting member that has the flexible material and is provided at an interior of a transporting section that transports a transported object; and an estimating section that inputs time-series electrical characteristics detected by the detecting section to a learning model that is trained by using, as learning data, time-series electrical characteristics at times when a stimulus was applied to the flexible material, and behavior state information that expresses a behavior state of the transported object with respect to the assisting member that applies a stimulus to the flexible material, such that the time-series electrical characteristics are inputs of the learning model and the learning model outputs the behavior state information, and the estimating section estimates behavior state information expressing a behavior state corresponding to inputted time-series electrical characteristics.

DESCRIPTION OF EMBODIMENTS

Figure 1:
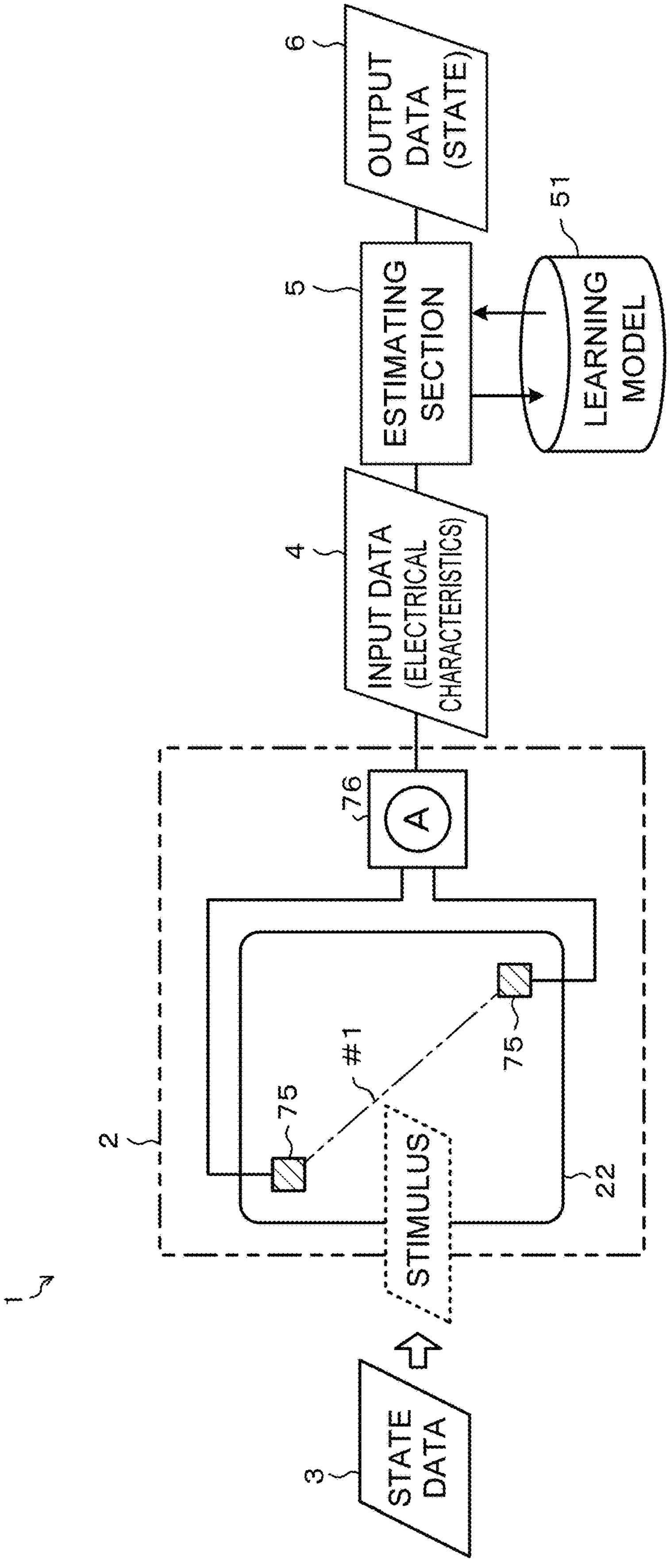
FIG. 1 is a drawing illustrating the structure of an estimating device relating to a first embodiment.

Embodiments that realize the technique of the present disclosure are described in detail hereinafter with reference to the drawings. Note that structural elements and processings whose operations and functions have the same workings are denoted by the same reference numerals throughout all of the drawings, and repeat description may be omitted as appropriate. Further, the present disclosure is not limited in any way to the following embodiments, and can be implemented by appropriate changes being made thereto within the scope of the object of the present disclosure.

Note that a figure in the present disclosure is a concept including at least one of a human body and an object that can apply a stimulus by a physical amount to a target object. In the following explanation, description will be given by collectively calling the concept, which includes humans and things, a figure without differentiating between at least one of a human body and an object. Namely, respective human bodies and objects themselves, and combined structures in which human bodies and objects are combined, are collectively called figures.

First Embodiment

A first embodiment of the present disclosure is described next.

First, a flexible material, which applies the technique of the present disclosure and to which electrical conductivity is imparted, and state estimating processing that, by using the flexible material, estimates a state of an applying side with respect to the flexible material, are described with reference to FIG. 1 through FIG. 7.

<Flexible Material>

The "flexible material" in the present disclosure is a concept that includes materials at which at least a portion thereof can deform such as bend or the like, and includes flexible elastic bodies such as rubber materials or the like, structures having a skeleton that is least one of fiber-like and mesh-like, and structures in whose interior plural, minute air bubbles are scattered. Polymer materials such as urethane and the like are examples of these structures. Further, in the present disclosure, a flexible material to which electrical conductivity is imparted is used. A "flexible material to which electrical conductivity is imparted" is a concept including materials that are electrically conductive, and includes materials in which an electrically-conductive material has been applied to a flexible material in order to impart electrical conductivity thereto, and materials in which a flexible material is electrically conductive. Polymer materials such as urethane materials and the like are suitable as flexible materials to which electrical conductivity is imparted. In the following explanation, description is given by calling a member, which is formed by compounding or infiltrating (also called impregnating) or the like an electrically-conductive material into all of or some of a urethane material, an "electrically-conductive urethane" as an example of the flexible material to which electrical conductivity is imparted. The electrically-conductive urethane can be formed by any method among compounding and infiltrating (impregnating) an electrically-conductive material, and can be formed by compounding or infiltrating (impregnating) an electrically-conductive material, or can be formed by combining the compounding and the infiltrating (impregnating) of an electrically-conductive material. For example, in a case in which the electrical conductivity of an electrically-conductive urethane formed by infiltration (impregnation) is higher than that of an electrically-conductive urethane formed by compounding, it is preferable to form the electrically-conductive urethane by infiltration (impregnation).

The electrically-conductive urethane has the feature that the electrical characteristics thereof vary in accordance with a physical amount applied thereto. A stimulus value in accordance with a pressure value that expresses a stimulus (hereinafter called pressure stimulus) that is due to pressure that deforms at least a part of the structure such as bending or the like, is an example of the physical amount that gives rise to the feature of the electrical characteristics varying. Note that pressure stimuli include the application of pressure in accordance with the distribution of pressure that is applied to a predetermined region and pressure of a predetermined range. Further, other examples of the physical amount are stimulus values such as the percentage of contained water, or the moisture content that expresses a stimulus (hereinafter called material stimulus) that changes (alters) the properties of the material due to the application of moisture or the like, and the like. The electrical characteristics of the electrically-conductive urethane vary in accordance with the physical amount that is applied. Electrical resistance value is an example of a physical amount that expresses the electrical characteristics. Further, a voltage value and a current value are other examples.

Due to electrical conductivity being imparted to a flexible material that has a predetermined volume, electrical characteristics corresponding to the applied physical amount (i.e., changes in the electrical resistance values) appear at the electrically-conductive urethane, and the electrical resistance values can be understood as being the volume resistance values of the electrically-conductive urethane. In the electrically-conductive urethane, the electrical paths cooperate in a complex manner, and, for example extend/contract or expand/contract in accordance with deformation. Further, there are also cases in which the behavior of the electrical paths being temporarily cut-off, and the behavior of connection that is different than that previously arising, are exhibited. Accordingly, the electrically-conductive urethane exhibits the behavior of having electrical characteristics that differ due to deformation or alteration that corresponds to the magnitude or the distribution of a stimulus (a pressure stimulus or a material stimulus) that is in accordance with an applied physical amount, at positions that are a predetermined distance apart from one another (e.g., positions of detection points where electrodes are disposed). Therefore, the electrical characteristics vary in accordance with the magnitude or the distribution of the stimulus that is in accordance with the physical amount applied to the electrically-conductive urethane.

Note that, by using the electrically-conductive urethane, there is no need to provide detection points such as electrodes or the like at places that are targets of deformation and alteration. It suffices to provide detection points such as electrodes or the like at at least two arbitrary places that sandwich therebetween a place where a stimulus that is in accordance with a physical amount is applied to the electrically-conductive urethane (FIG. 1 for example).

A number of detection points that is greater than two detection points may be used in order to improve the accuracy of detecting the electrical characteristics of the electrically-conductive urethane. Further, an electrically-conductive urethane 22 illustrated in FIG. 1 may be made to be one electrically-conductive urethane piece, and the electrically-conductive urethane of the present disclosure may be formed by an electrically-conductive urethane group formed by plural electrically-conductive urethane pieces being arranged. In this case, the electrical characteristics may be detected at each of the plural electrically-conductive urethane pieces, or the electrical characteristics of plural electrically-conductive urethane pieces may be detected collectively. In a case of detecting the electrical characteristics at each of the plural electrically-conductive urethane pieces, the electrical characteristics such as the electrical resistance values or the like can be detected per placement region (e.g., detection sets #1~ #n). Further, as another example, the detection range on the electrically-conductive urethane 22 may be divided, and a detection point may be provided in each of the divisional detection ranges, and the electrical characteristics may be detected per detection range.

<Estimating Device>

An example of an estimating device, which utilizes the electrically-conductive urethane and estimates the state of an applying side with respect to the electrically-conductive urethane, is described next.

An example of the structure of an estimating device 1, which can execute estimating processing that estimates the state of an applying side, is illustrated in FIG. 1. The estimating device 1 has an estimating section 5, and is connected to a target object 2 such that the electrical characteristics at the electrically-conductive urethane 22 are inputted to the estimating device 1. At the estimating device 1, the state of an applying side, with respect to the electrically-conductive urethane 22 that includes the target object 2, is estimated. The estimating device 1 can be realized by a computer that is provided with a CPU serving as an executing device that executes processings described later.

Deformation and alteration of the above-described electrically-conductive urethane arise due to a physical amount that is applied in time-series to the electrically-conductive urethane. This physical amount that is applied in time series depends on the state of the applying side. Accordingly, the electrical characteristics of the electrically-conductive urethane that vary in time series correspond to the state of the applying side of the physical amount that is applied to the electrically-conductive urethane. For example, in a case in which a pressure stimulus that deforms the electrically-conductive urethane or a material stimulus that alters the electrically-conductive urethane is applied, the electrical characteristics of the electrically-conductive urethane that vary in time series correspond to the state of the applying side, which expresses the position, the distribution and the magnitude of the pressure stimulus. Accordingly, the state of the applying side with respect to the electrically-conductive urethane can be estimated from the electrical characteristics of the electrically-conductive urethane that vary in time series.

At the estimating device 1, the state of an unknown applying side is estimated and outputted by an estimating processing that is described later, by using a learning model 51 that has been trained. Due thereto, the state of the applying side with respect to the target object 2 can be identified without using a special device or a large device and without directly measuring deformation and alteration of the electrically-conductive urethane 22 that is included in the target object. The learning model 51 is trained by using, as the inputs thereof, the state of the applying side with respect to the target object 2, and electrical characteristics of the target object 2 (i.e., electrical characteristics such as electrical resistance values or the like of the electrically-conductive urethane 22 disposed at the target object 2). The training of the learning model 51 is described later.

Figure 2:
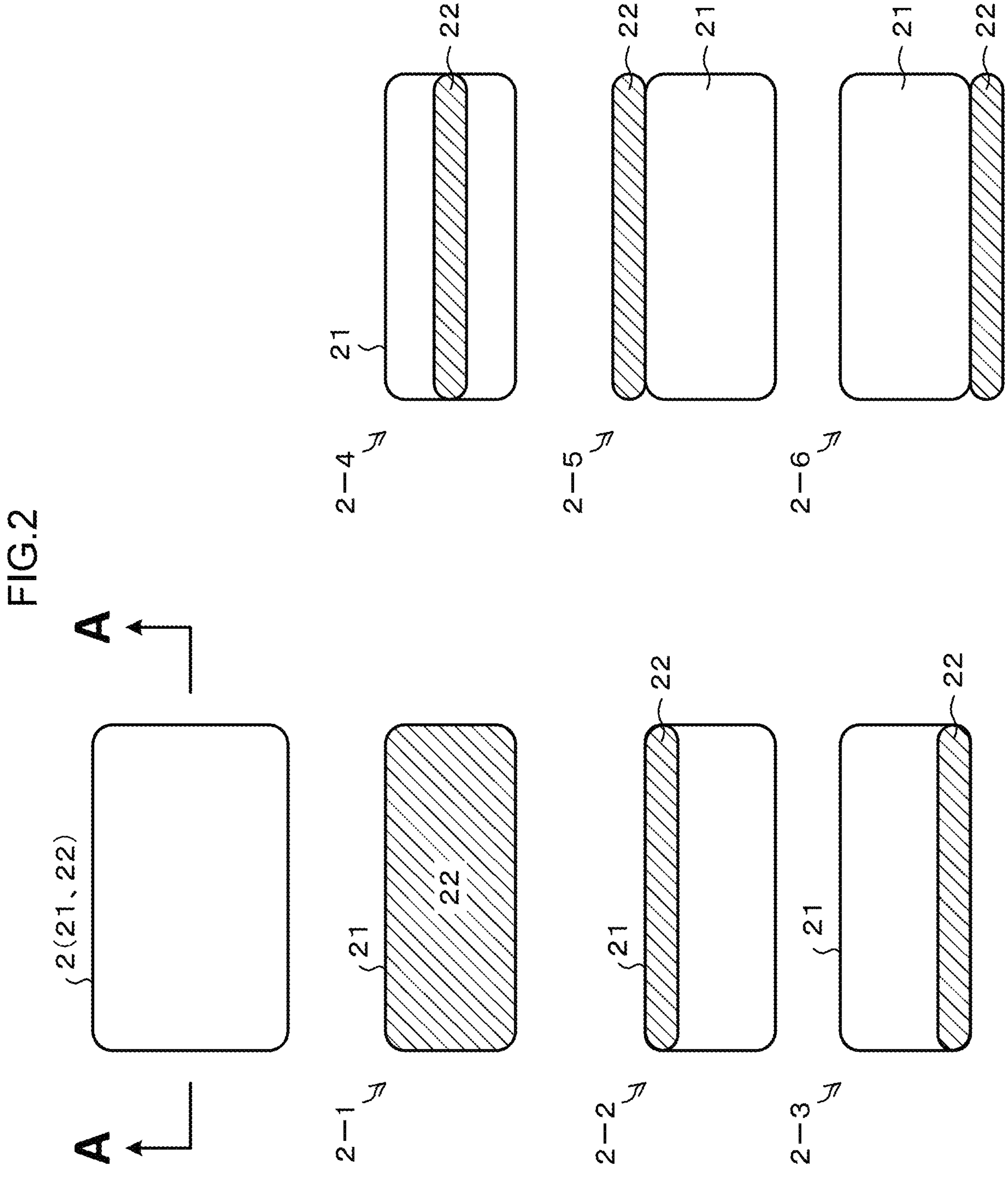
FIG. 2 is a drawing illustrating arrangements of an electrically-conductive urethane relating to the first embodiment.

Note that the target object 2 can be structured by placing the electrically-conductive urethane 22 at a member 21 that is flexible (FIG. 2). The target object 2, which is structured by the member 21 at which the electrically-conductive urethane 22 is disposed, includes an electrical characteristic detecting section 76. It suffices for the electrically-conductive urethane 22 to be disposed at at least a portion of the member 21, and the electrically-conductive urethane 22 may be disposed at the interior thereof or may be disposed at the exterior thereof. Further, it suffices for the electrically-conductive urethane to be disposed such that the state of the applying side with respect to the electrically-conductive urethane can be estimated, and, for example, it suffices for the electrically-conductive urethane to be disposed such that it can be contacted by a figure, directly or indirectly or both.

FIG. 2 illustrates examples of arranging the electrically-conductive urethane 22 at the target object 2. As illustrated by target object cross-section 2-1 that is the A-A cross-section of the target object 2, the electrically-conductive urethane 22 may be formed so as to fill the entire interior of the member 21. Further, as illustrated by target object cross-section 2-2, the electrically-conductive urethane 22 may be formed on one side (the surface side) at the interior of the member 21. Or, as illustrated by target object cross-section 2-3, the electrically-conductive urethane 22 may be formed at the other side (the reverse surface side) of the interior of the member 21. Moreover, as illustrated by target object cross-section 2-4, the electrically-conductive urethane 22 may be formed at a portion of the interior of the member 21. Further, as illustrated by target object cross-section 2-5, the electrically-conductive urethane 22 may be disposed separately at the outer side of the obverse side of the member 21, or, as illustrated by target object cross-section 2-6, may be disposed at the outer side of the other side (the reverse surface side). In a case in which the electrically-conductive urethane 22 is disposed at the exterior of the member 21, the electrically-conductive urethane 22 and the member 21 may be merely layered, or the electrically-conductive urethane 22 and the member 21 may be made integral by adhesion or the like. Note that, even in a case in which the electrically-conductive urethane 22 is disposed at the exterior of the member 21, the flexibility of the member 21 is not impeded because the electrically-conductive urethane 22 is a urethane member that is electrically conductive.

As illustrated in FIG. 1, the electrically-conductive urethane 22 detects the electrical characteristics of the electrically-conductive urethane 22 (i.e., the volume resistance values that are electrical resistance values) by signals from at least two detection points 75 that are disposed so as to be separated by a distance. The example of FIG. 1 illustrates detection set #1 that detects electrical characteristics (time-series electrical resistance values) from signals from the two detection points 75 that are disposed at diagonal positions on the electrically-conductive urethane 22. Note that the number of and the arrangement of the detection points 75 is not limited to the positions illustrated in FIG. 1. Provided that the positions are positions at which it is possible to detect the electrical characteristics of the electrically-conductive urethane 22, the number thereof may be three or more, and the positions thereof may be any positions. Note that it suffices to connect the electrical characteristic detecting section 76 that detects the electrical characteristics (e.g., volume resistance values that are electrical resistance values) to the detection points 75, and to use the output thereof as the electrical characteristics of the electrically-conductive urethane 22.

In the present embodiment, the electrically-conductive urethane 22 is used as a sensor, and therefore, in a case in which a figure is interposed for example, the strange feeling that is imparted to the figure is extremely small as compared with a conventional sensor. Therefore, the state of the applying side in relation to the figure is not impeded during measurement, and measurement and estimation of the state of the applying side can be carried out simultaneously. This is advantageous as compared with conventional sensors that separately carry out measurement and estimation of the state of the applying side, and the merits are great particularly in estimation in accordance with long-term measurement/evaluation that follows time-series variations.

The estimating section 5 is a functional section that is connected to the target object 2 and that, on the basis of electrical characteristics that vary in accordance with at least one of deformation and alteration of the electrically-conductive urethane 22, estimates the state of the applying side by using the learning model 51. Specifically, time-series input data 4, which expresses magnitudes of electrical resistances (electrical resistance values or the like) at the electrically-conductive urethane 22, is inputted to the estimating section 5. The input data 4 corresponds to state data 3 that expresses a state of the applying side with respect to the target object 2, e.g., a state relating to the posture of the figure that contacts the target object 2, or the behavior of the figure such as movement or the like. For example, at a time of contacting the target object 2, the figure contacts in a predetermined state such as a posture or the like, and, in accordance with this state, a stimulus (at least one of a pressure stimulus and a material stimulus) is applied as a physical amount to the electrically-conductive urethane 22 that structures the target object 2, and the electrical characteristics of the electrically-conductive urethane 22 vary. Accordingly, the electrical characteristics of the electrically-conductive urethane 22, which vary in time series and are shown by the input data 4, correspond to the state of the applying side with respect to the target object 2, i.e., the electrically-conductive urethane 22. Further, the estimating section 5 outputs, as the results of the estimation using the trained learning model 51, output data 6 that expresses the state of the applying side corresponding to the electrical characteristics of the electrically-conductive urethane 22 that vary in time series.

The learning model 51 is a model that has been trained and that derives the output data 6 expressing the state of the applying side, from the electrical resistances (the input data 4) of the electrically-conductive urethane 22 that vary due to the stimulus (pressure stimulus or material stimulus) that is applied as the physical amount. The learning model 51 is, for example, a model that prescribes a trained neural network, and is expressed as a collection of information of the weights (strengths) of the connections between the nodes (neurons) that structure the neural network.

<Learning Processing>

The learning processing that generates the learning model 51 is described next.

Figure 3:
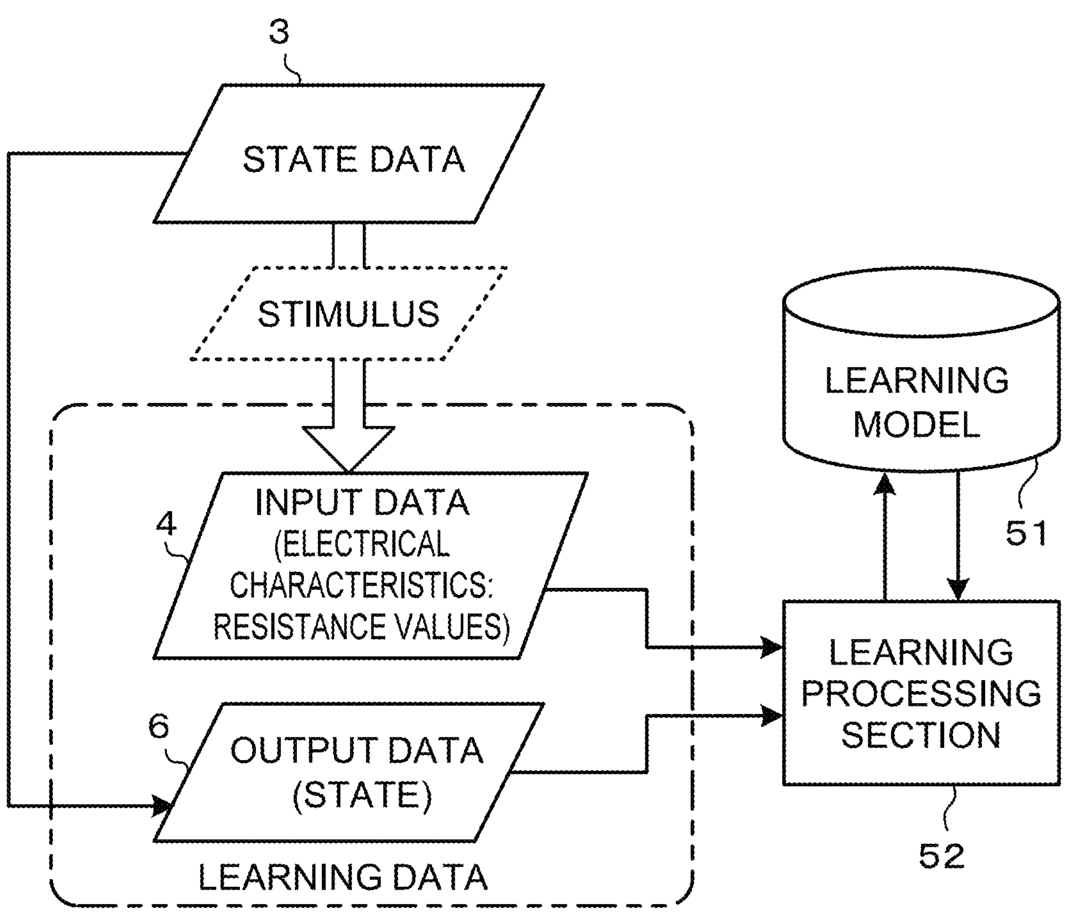
FIG. 3 is a drawing illustrating the schematic structure of a learning model generating device relating to the first embodiment.

FIG. 3 illustrates the schematic structure of a learning model generating device that generates the learning model 51. The learning model generating device has a learning processing section 52. The learning model generating device can be structured to include a computer having an unillustrated CPU, and is executed as the learning processing section 52 and generates the learning model 51, by learning data collecting processing and learning model generating processing that are executed by the CPU.

<Learning Data Collecting Processing>

In the learning data collecting processing, the learning processing section 52 collects, as learning data, a large amount of the input data 4 that is obtained by measuring in time series the electrical characteristics (e.g., the electrical resistance values) at the electrically-conductive urethane 22 and whose labels are the state data 3 that express states of the applying side. Accordingly, the learning data includes a large number of sets of the input data 4 expressing the electrical characteristics, and the state data 3 expressing states of the applying side that correspond to those input data 4.

Specifically, in the learning data collecting processing, electrical characteristics (e.g., electrical resistance values) that vary due to a stimulus (a pressure stimulus or material stimulus) corresponding to the state of the applying side at the time when a state at the target object 2 (i.e., a state of the applying side with respect to the electrically-conductive urethane 22) is formed, are acquired in time series. Next, the state data 3 is applied as a label to the electrical characteristics that were acquired in time series (the input data 4), and the processings are repeated until the sets of the state data 3 and the input data 4 reach a predetermined number that has been set in advance or a predetermined time that has been set in advance. These sets of the state data 3 that express states of the applying side, and the time-series electrical characteristics of the electrically-conductive urethane 22 that are acquired per state of the applying side (the input data 4), are used as the learning data. Note that the state data 3 of the learning data are stored in an unillustrated memory so as to be treated as the output data 6 that express states of the applying side at which the estimation results are the correct answers in the learning processing that is described later.

Note that, in the learning data, time-series information may be set in correspondence by applying information expressing the time of measurement to each of the electrical resistance values of the electrically-conductive urethane 22 (the input data 4). In this case, the time-series information may be set in correspondence by applying information expressing the time of measurement to sets of time-series electrical resistance values at the electrically-conductive urethane 22, in a time period that is set as the state of the applying side.

An example of the above-described learning data is shown in a table next. Table 1 is an example of data sets in which time-series electrical resistance value data (r) and state data (R) expressing states of the applying side are set in correspondence with one another as learning data relating to the state of the applying side with respect to the electrically-conductive urethane 22.

TABLE 1

| time-series electrical resistance value data | state |
|---|---|
| r11, r12, r13, . . . , r1n | R1 |
| r21, r22, r23, . . . , r2n | R2 |
| . . . | . . . |
| rk1, rk2, rk3, . . . , rkn | Rk |
| . . . | . . . |

Note that the electrical characteristics detected at the electrically-conductive urethane 22 (the time characteristics in accordance with the time-series electrical resistance value data) can be considered as distinctive patterns relating to the states of the applying side with respect to the electrically-conductive urethane 22. Namely, different stimuli are applied to the electrically-conductive urethane 22 in time series, depending on the state of the applying side with respect to the electrically-conductive urethane 22. Accordingly, it is thought that time-series electrical characteristics within a predetermined time period appear as distinctive electrical characteristics with respect to the state of the applying side. Accordingly, patterns (e.g., the shape of the distribution of the time-series electrical resistance values in the electrical characteristics), which are shown in the electrical characteristics detected at the electrically-conductive urethane 22 (the time characteristics in accordance with time-series electrical resistance value data), correspond to the states of the applying side, and function effectively in the learning processing that is described later.

<Learning Model Generating Processing>

Learning model generating processing is described next. The learning model generating device illustrated in FIG. 3 generates the learning model 51 by using the above-described learning data, by learning model generating processing at the learning processing section 52.

Figure 4:
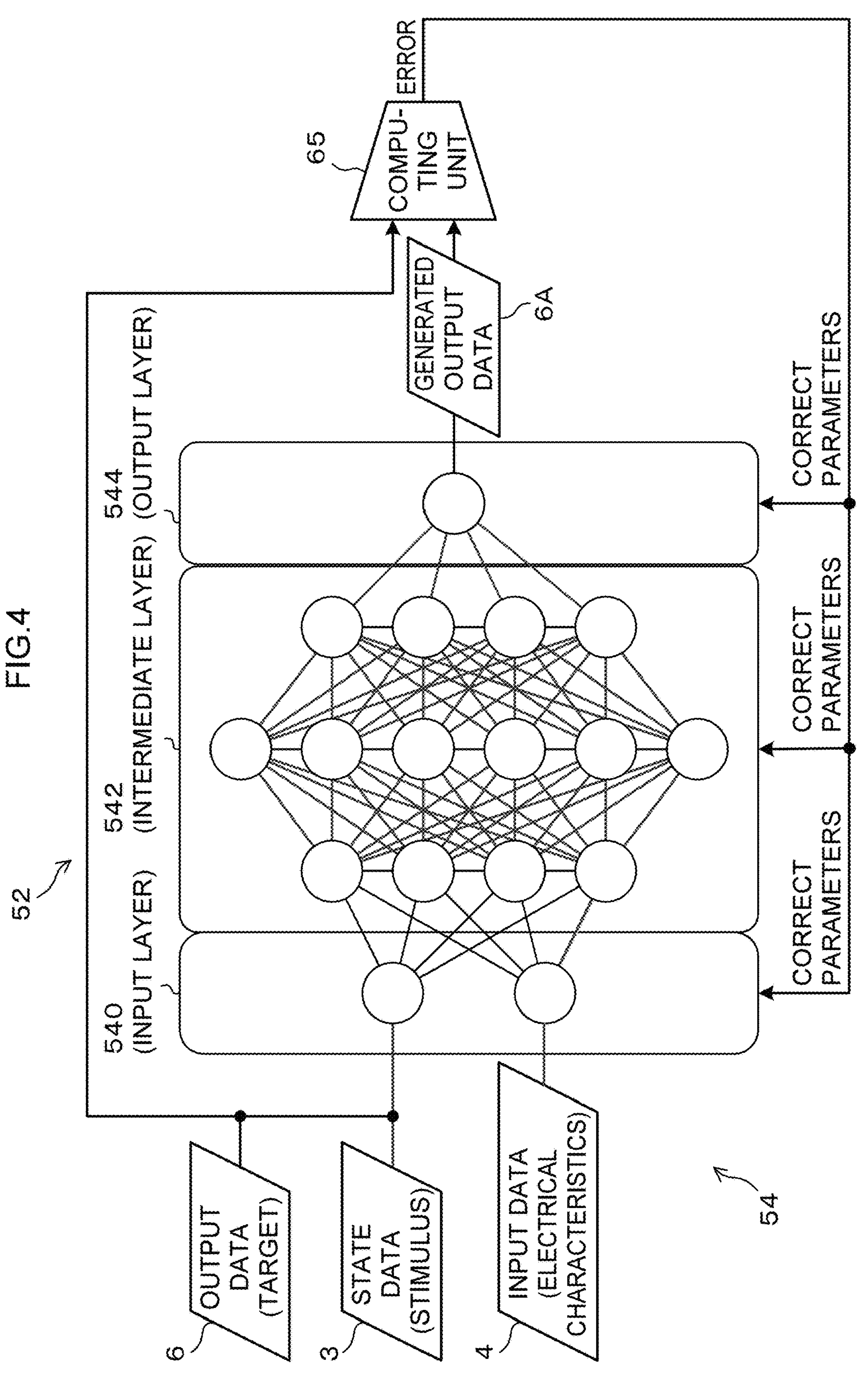
FIG. 4 is a drawing illustrating functional structures of a learning processing section relating to the first embodiment.

FIG. 4 is a drawing illustrating functional structures of the learning processing section 52, i.e., functional structures of an unillustrated CPU in relation to the learning model generating processing executed at the learning processing section 52. The unillustrated CPU of the learning processing section 52 operates as functional sections that are a generating unit 54 and a computing unit 56. The generating unit 54 has the function of generating output while taking into consideration the before-after relationships of the electrical resistance values acquired in time series that are the inputs.

The learning processing section 52 holds, as the learning data and in an unillustrated memory, a large number of sets of the above-described input data 4 (e.g., electrical resistance values), and the output data 6 that are the state data 3 expressing states of the applying side that applied a stimulus to the electrically-conductive urethane 22.

The generating unit 54 includes an input layer 540, an intermediate layer 542 and an output layer 544, and structures a known neural network (NN). Because neural networks themselves are known technology, detailed description thereof is omitted. However, the intermediate layer 542 includes a large number of node groups (neuron groups) having inter-node connections and feedback connections. Data from the input layer 540 is inputted to the intermediate layer 542, and the data that is the results of calculation of the intermediate layer 542 is outputted to the output layer 544.

The generating unit 54 is a neural network that generates generated output data 6A that serves as data expressing the state of the applying side or data close to the state of the applying side, from the inputted input data 4 (electrical resistance values). The generated output data 6A is data in which the state of the applying side that applied a stimulus to the electrically-conductive urethane 22 is estimated from the input data 4. The generating unit 54 generates the generated output data that expresses a state close to the state of the applying side, from the input data 4 that was inputted in time series. By learning by using a large number of the input data 4, the generating unit 54 can generate the generated output data 6A that is close to the state of the applying side such as a figure or the like that applied a stimulus to the target object 2, i.e., the electrically-conductive urethane 22. In another aspect, the electrical characteristics that are the input data 4 inputted in time series can be considered as patterns, and, by learning these patterns, the generating unit 54 can generate the generated output data 6A that is close to the state of the applying side such as a figure or the like that applied a stimulus to the target object 2, i.e., the electrically-conductive urethane 22.

The computing unit 56 is a computing unit that compares the generated output data 6A and the output data 6 of the learning data, and computes the error of these results of comparison. The learning processing section 52 inputs the generated output data 6A and the output data 6 of the learning data to the computing unit 56. In accordance therewith, the computing unit 56 computes the error between the generated output data 6A and the output data 6 of the learning data, and outputs a signal expressing these computational results.

On the basis of the error computed at the computing unit 56, the learning processing section 52 carries out training of the generating unit 54, which is the tuning of the weighting parameters of the connections between the nodes. Specifically, the learning processing section 52 feeds-back, to the generating unit 54, the weighting parameters of the connections between the nodes of the input layer 540 and the intermediate layer 542, the weighting parameters of the connections between the nodes within the intermediate layer 542, and the weighting parameters of the connections between the nodes of the intermediate layer 542 and the output layer 544, respectively at the generating unit 54 by using, for example, a method such as the gradient descent method or backpropagation or the like. Namely, the learning processing section 52 optimizes all of the connections between the nodes such that the errors between the generated output data 6A and the output data 6 of the learning data are minimized, with the target thereof being the output data 6 of the learning data.

Note that the generating unit 54 may use a regression neural network having the function of generating the outputs while taking the before-after relationships of the time-series inputs into consideration, or may use another method.

The learning processing section 52 generates the learning model 51 by learning model generating processing by using the above-described learning data. The learning model 51 is expressed as a collection of information of weighting parameters (weights or strengths) of the connections between the nodes, which are the results of learning, and is stored in an unillustrated memory.

Specifically, the learning processing section 52 executes the learning model generating processing in accordance with the following processes. In a first learning processing, the learning processing section 52 acquires the input data 4 (electrical characteristics) that are the learning data that are results of time-series measurement, and whose labels are information expressing the state of the applying side. In a second learning processing, the learning processing section 52 generates the learning model 51 by using the learning data that are the results of time-series measurement. Namely, the learning processing section 52 obtains the collection of information of the weighting parameters (weights or strengths) of the connections between the nodes that are the results of learning that have been learned by using a large number of learning data as described above. Then, in a third learning processing, the learning processing section 52 stores, as the learning model 51, data that is expressed as a collection of information of the weighting parameters (weights or strengths) of the connections between the nodes that are the results of learning.

Then, the above-described estimating device 1 uses, as the learning model 51, the trained generating unit 54 (i.e., data that is expressed as a collection of information of the weighting parameters of the connections between the nodes that are the results of learning). If the learning model 51 that has been sufficiently trained is used, it is possible to identify the state of the applying side from the target object 2, i.e., the time-series electrical characteristics of the electrically-conductive urethane 22 (e.g., the characteristics of the electrical resistance values that vary in time series).

<PRC>

By the way, as described above, at the electrically-conductive urethane 22, the electrical paths cooperate in a complex manner, and the electrically-conductive urethane 22 exhibits behavior corresponding to variations (deformation) such as extension/contraction, expansion/contraction, temporary cutting-off, new connections and the like of the electrical paths, and variations (alteration) in the properties of the material. As a result, the electrically-conductive urethane 22 exhibits the behavior of having electrical characteristics that differ in accordance with the applied stimulus (e.g., pressure stimulus). With regard to this point, the electrically-conductive urethane 22 can be treated as a reservoir that accumulates data relating to deformation of the electrically-conductive urethane 22. Namely, the estimating device 1 can apply the electrically-conductive urethane 22 to a network model (hereinafter called a PRCN) that is called physical reservoir computing (PRC). Because PRCs and PRCNs themselves are known techniques, detailed description thereof is omitted. However, PRCs and PRCNs are suitable for estimating information relating to deformation and alteration of the electrically-conductive urethane 22. Note that there are cases in which the reservoir is called a reservoir or a reservoir.

Figure 5:
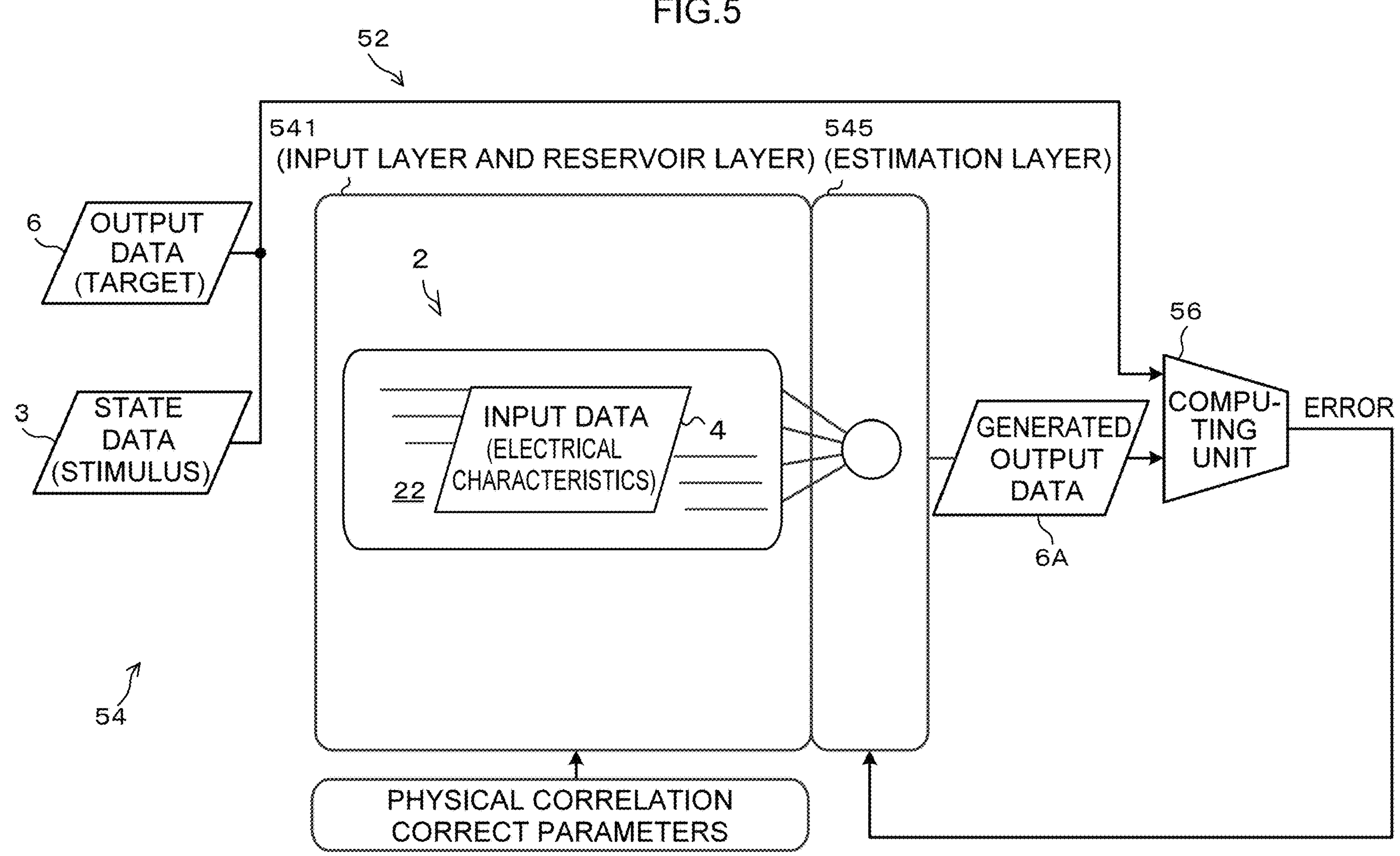
FIG. 5 is a drawing illustrating other functional structures of the learning processing section relating to the first embodiment.

FIG. 5 illustrates an example of functional structures of the learning processing section 52 that utilizes a PRCN. The learning processing section 52 that utilizes a PRCN includes an input/reservoir layer 541 and an estimation layer 545. The input/reservoir layer 541 corresponds to the electrically-conductive urethane 22 that is included in the target object 2. Namely, the learning processing section 52 that utilizes a PRCN carries out learning by treating the target object 2 that includes the electrically-conductive urethane 22 as a reservoir that accumulates data relating to deformation and alteration of the target object 2 that includes the electrically-conductive urethane 22. The electrically-conductive urethane 22 has electrical characteristics (electrical resistance values) corresponding to diverse stimuli respectively, and functions as an input layer that inputs the electrical resistance values, and further functions as a reservoir layer that accumulates data relating to deformation and alteration of the electrically-conductive urethane 22. Because the electrically-conductive urethane 22 outputs electrical characteristics (the input data 4) that differ in accordance with the stimulus applied due to the state of the applying side that is a figure or the like, at the estimation layer 545, it is possible to estimate the state of the unknown applying side from the electrical resistance values of the electrically-conductive urethane 22 to which the stimulus was applied. Accordingly, in the learning processing at the learning processing section 52 that utilizes a PRCN, it suffices to learn the estimation layer 545.

<Structure of Estimating Device>

Figure 6:
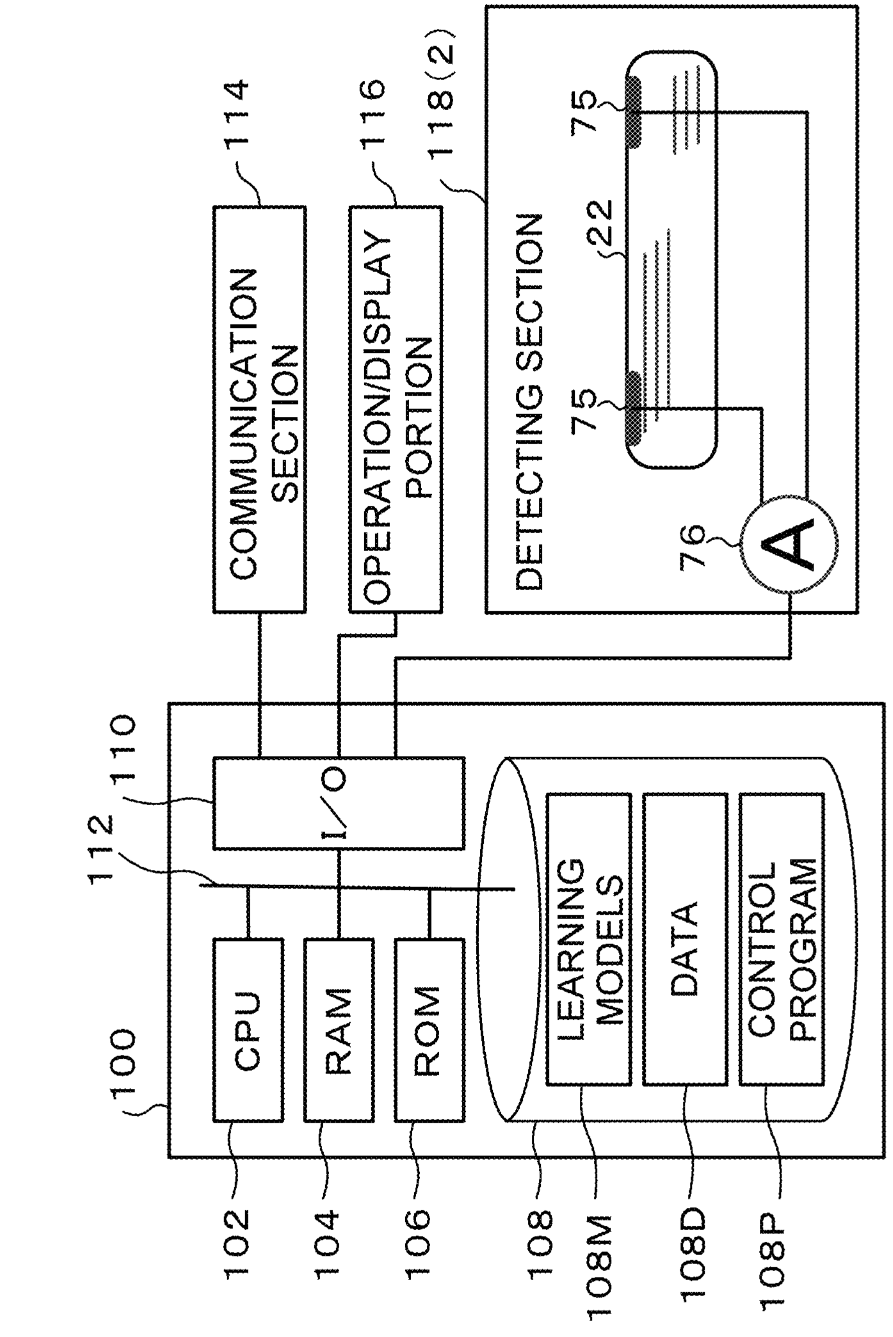
FIG. 6 is a drawing illustrating electrical structures of the estimating device relating to the first embodiment.

Next, an example of specific structures of the above-described estimating device 1 is further described. FIG. 6 illustrates an example of the electrical structures of the estimating device 1. The estimating device 1 illustrated in FIG. 6 is structured to include a computer serving as an executing device that executes processings that realize the above-described various functions. The above-described estimating device 1 can be realized by causing a computer to execute a program that expresses the above-described respective functions.

The computer that functions as the estimating device 1 has a computer main body 100. The computer main body 100 has a CPU 102, a RAM 104 such as a volatile memory or the like, a ROM 106, an auxiliary storage device 108 such as a hard disk device (HDD) or the like, and an input/output interface (I/O) 110. These CPU 102, RAM 104, ROM 106, auxiliary storage device 108 and input/output I/O 110 are structures that are connected via bus 112 so as to be able to transfer data and commands to and from one another. Further, a communication section 114 for communicating with external devices, an operation/display portion 116 such as a display and a keyboard or the like, and a detecting section 118 are connected to the input/output I/O 110. The detecting section 118 functions to acquire the input data 4 (the electrical characteristics that are the time-series electrical resistance values or the like) from the target object 2 that includes the electrically-conductive urethane 22. Namely, the detecting section 118 includes the target object 2 at which the electrically-conductive urethane 22 is disposed, and can acquire the input data 4 from the electrical characteristic detecting section 76 that is connected to the detection points 75 at the electrically-conductive urethane 22. Note that the detecting section 118 may be connected via the communication section 114.

A control program 108P, which is for causing the computer main body 100 to function as the estimating device 1 that serves as an example of the estimating device of the present disclosure, is stored in the auxiliary storage device 108. The CPU 102 reads-out the control program 108P from the auxiliary storage device 108, and expands the control program 108P in the RAM 104, and executes processings. Due thereto, the computer main body 100 that executes the control program 108P operates as the estimating device 1.

Note that learning models 108M that include the learning model 51, and data 108D that includes various data, are stored in the auxiliary storage device 108. The control program 108P may be provided by a recording medium such as a CD-ROM or the like.

<Estimating Processing>

Figure 7:
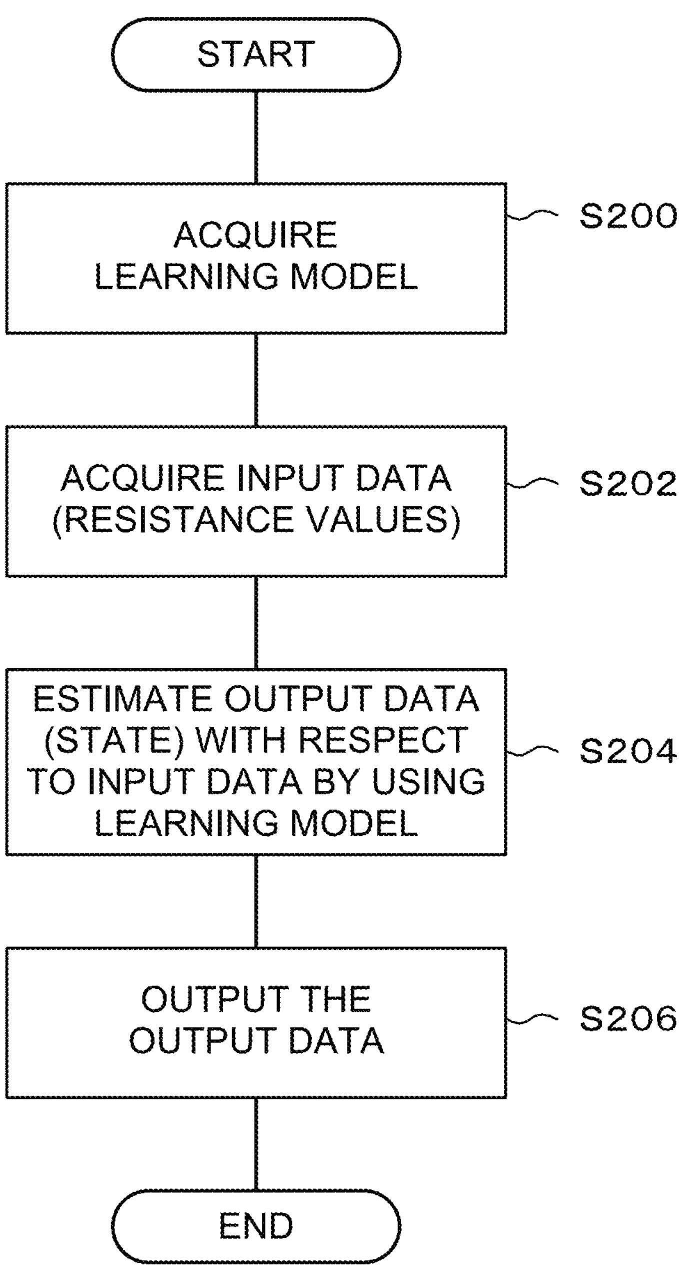
FIG. 7 is a flowchart illustrating the flow of estimating processing relating to the first embodiment.

Next, the estimating processing at the estimating device 1 that is realized by a computer is further described. FIG. 7 illustrates an example of the flow of the estimating processing in accordance with the control program 108P executed at the computer main body 100. The estimating processing illustrated in FIG. 7 is executed by the CPU 102 when the power of the computer main body 100 is turned on. The CPU 102 reads-out the control program 108P from the auxiliary storage device 108, and expands the control program 108P in the RAM 104, and executes processings.

First, the CPU 102 acquires the learning model 51 by reading-out the learning model 51 from the learning models 108M of the auxiliary storage device 108 and expanding the learning model 51 in the RAM 104 (step S200). Specifically, the learning model 51, in which the connections between the nodes in accordance with weighting parameters are realized, is constructed due to the CPU 102 expanding, in the RAM 104, the network model (refer to FIG. 4 and FIG. 5) that is formed from the connections between the nodes in accordance with the weighting parameters expressed as the learning model 51.

Next, the CPU 102 acquires, in time series and via the detecting section 118, the unknown input data 4 (electrical characteristics) that are subjects in estimating the state of the applying side that is due to the stimulus applied to the electrically-conductive urethane 22 (step S202). Next, by using the learning model 51, the CPU 102 estimates the output data 6 (the state of the unknown applying side) that corresponds to the acquired input data 4 (step S204). Then, the CPU 102 outputs the output data 6 (the state of the applying side) that is the results of estimation via the communication section 114 (step S206), and ends the present processing routine.

In this way, in accordance with the estimating device 1, the state of the unknown applying side can be estimated from electrical resistance values of the electrically-conductive urethane 22. Specifically, at the estimating device 1, the state of the applying side such as a figure or the like can be estimated from the input data 4 (electrical characteristics)

that vary in accordance with the stimulus applied to the electrically-conductive urethane 22 due to the state of the applying side. Namely, the state of the applying side such as a figure or the like can be estimated without using a special device or a large device and without directly measuring deformation of a flexible member.

By the way, when transporting a transported object, it is preferable to dispose the transported object such that the balance thereof is maintained, in order to prevent loading of a large number of transported objects and load shifting during transporting and the like. However, in an aspect that detects changes in shape that arise at an object or the like, a system that detects amounts of displacement and amounts of deformation of transported objects by using a camera and an image analysis method becomes a large-scale system, which leads to an increase in the size of the device and therefore is not preferable. Thus, in the present embodiment, the above-described electrically-conductive urethane is provided at a transporting section such as a moving body or the like, and the placed state of a transported object in accordance with a pressure stimulus aspect is estimated by using the electrical characteristics of the electrically-conductive urethane, without using a special detecting device.

Further, when transporting transported objects, there are also cases in which leaks, in which the contents of a transported object leak-out to the exterior of the transported object, occur. For example, there are cases in which, although leaks do not arise in a state in which the balance of a transported object is maintained, leaking does occur due to loss of balance or a moment being generated. However, because a special detecting device is needed in order to sense leaks and the like, this is not preferable. Thus, in the present embodiment, the placed state of a transported object in accordance with a material stimulus aspect is estimated by using electrical characteristics of the above-described electrically-conductive urethane, without using a special detecting device.

The present embodiment is an example in which the technique of the present disclosure is applied to an assisting member that is provided at a transporting section such as a moving body or the like, and assists the transporting of a transported object, and serves as the above-described target object 2. Note that, hereinafter, in order to simplify explanation, description is given of an example in which the electrically-conductive urethane 22 is disposed on the entirety of the member 21, and the target object 2 is formed by the electrically-conductive urethane 22 (target object cross-section 2-1 in FIG. 2). However, the electrically-conductive urethane 22 is not limited to being placed on the entire member 21, and the technique of the present disclosure can, of course, be applied similarly to any of the above-described arrangements.

"Placement" and "placed state" in the present embodiment are a concept including the state of a transported object at which at least one of a pressure stimulus and a material stimulus is applied to the electrically-conductive urethane 22 at the time when the transported object is placed on the electrically-conductive urethane 22. Further, these are also a concept including states that the electrically-conductive urethane 22 is changed to from a predetermined time (e.g., the initial formation of the electrically-conductive urethane 22), in relation to at least one of deformation and alteration of the electrically-conductive urethane 22 at the time when at least one of a pressure stimulus and a material stimulus is applied thereto. Placed states in which a pressure stimulus is applied include an equilibrium state. An equilibrium state is a state in which the transported object is in balance, and a pressure stimulus is applied uniformly to the electrically-conductive urethane 22 from the transported object. From the standpoint of the structure and shape of the electrically-conductive urethane 22, examples of values of placed states in which a pressure stimulus is applied are the pressure distribution that applies a pressure stimulus to the electrically-conductive urethane 22, the center of gravity position of the transported object, the offset (ratio) of the center of gravity position with respect to the center of the placed surface of the transported object, and the like. Further, from the standpoint of the material properties of the electrically-conductive urethane 22, examples of values of placed states in which a material stimulus is applied are the moisture content (e.g., the content of a liquid such as moisture or the like, the water content, the percentage of contained water or the like) that serves as a physical amount that applies a material stimulus to the electrically-conductive urethane 22.

<Placed State Estimating Device>

An example of the placed state estimating device is described next. The placed state estimating device estimates the placed state of a transported object by using the electrically-conductive urethane 22.

Figure 8:
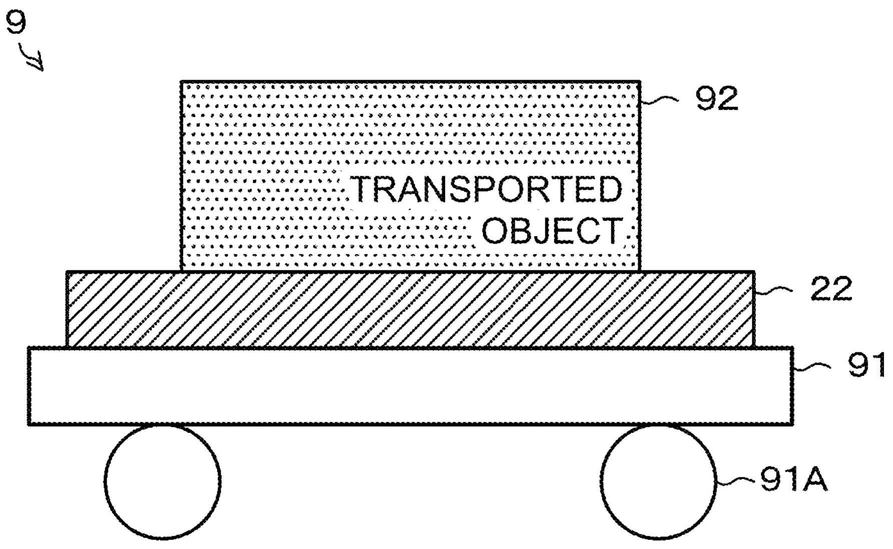
FIG. 8 is a drawing illustrating an example of a transported object and a transporting section relating to the first embodiment.
Figure 9:
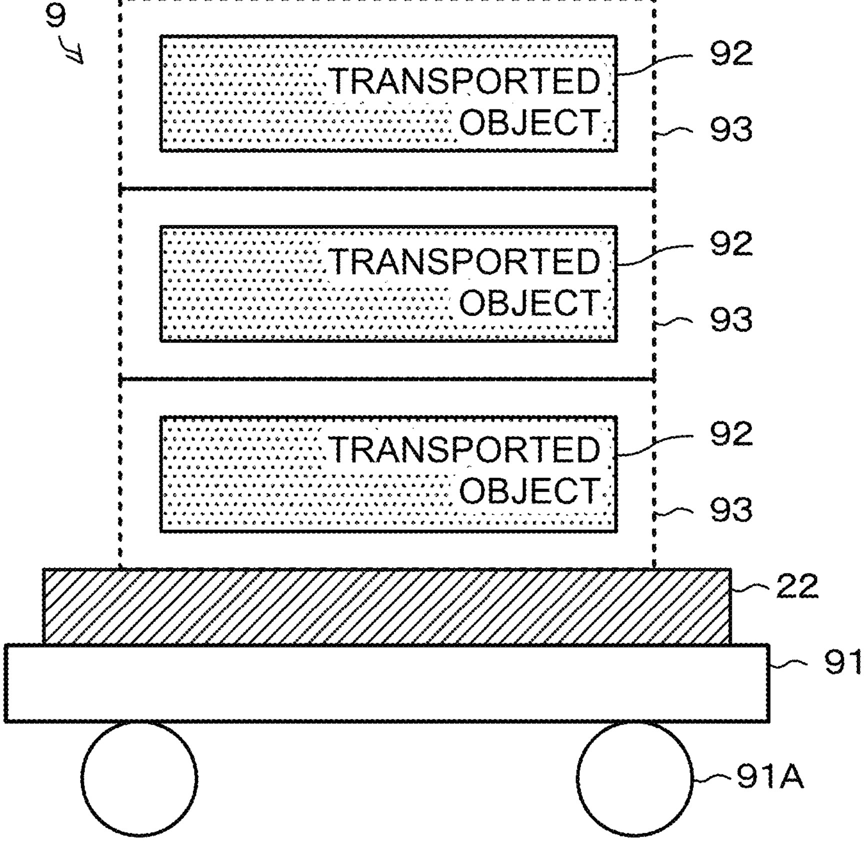
FIG. 9 is a drawing illustrating an example of the structure of the transporting section that transports plural transporting pallets having the transported objects relating to the first embodiment.

In FIG. 8 and FIG. 9, a transporting body, which includes the transported object whose placed state is to be estimated, is illustrated as transporting body 9. FIG. 8 illustrates, as an example, a transporting section 91 on which one transported object 92 is placed, and that transports by rotational driving of a rotating driving section 91A. FIG. 9 illustrates, as another example, the transporting section 91 on which plural (three in FIG. 9) transporting pallets 93 having the transported objects 92 are loaded, and that transports by rotational driving of the rotating driving section 91A.

At the transporting body 9, the placed state of the transported object 92 or the transporting pallets 93 that have the transported objects 92 is estimated from the electrical characteristics of the electrically-conductive urethane 22. Note that, although FIG. 9 illustrates a case in which the plural transporting pallets 93 are placed on the electrically-conductive urethane 22, the electrically-conductive urethane 22 may be disposed between the transporting pallets 93 that are adjacent, for example, at the top and bottom, or the left and right, or the front and rear.

Figure 10:
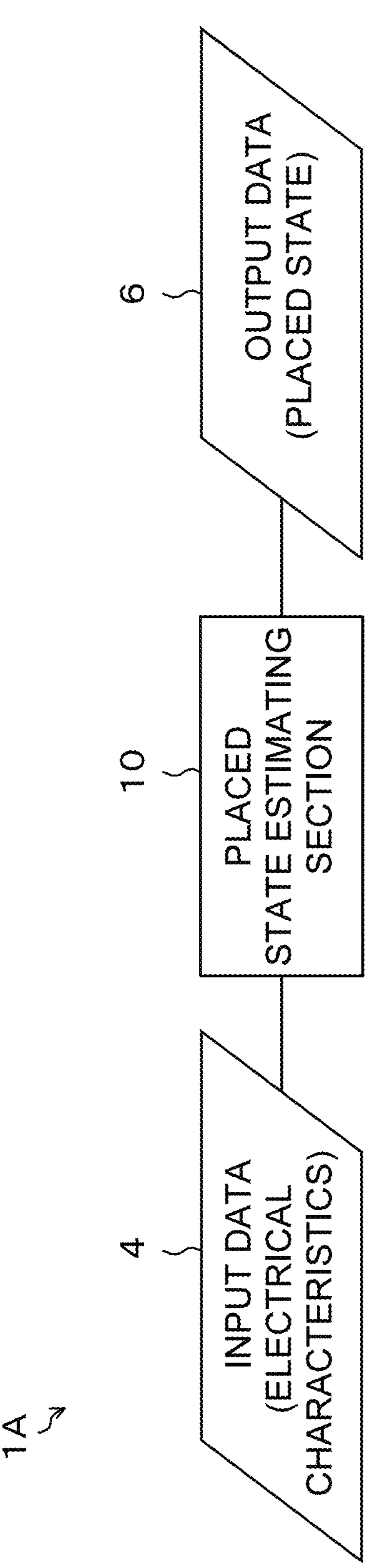
FIG. 10 is a drawing illustrating an example of the structure of a placed state estimating device relating to the first embodiment.

FIG. 10 illustrates an example of the structure of estimating device 1A that serves as a placed state estimating device relating to the present embodiment. The estimating device 1A illustrated in FIG. 10 has placed state estimating section 10 instead of the estimating section 5 illustrated in FIG. 1.

The estimating processing at the estimating device 1A estimates and outputs the placed state of an unknown transported object (object of estimation) by using the learning model 51 that has been trained. The learning model 51 is trained by learning data that includes electrical characteristics of the electrically-conductive urethane 22 and placed states of a transported object that is placed on the electrically-conductive urethane 22.

The learning processing that generates the learning model 51 relating to the present embodiment is described next. Learning is carried out by using, as the learning data, electrical characteristics of the electrically-conductive urethane 22 (the input data 4) whose labels are placed state information (the state data 3) expressing placed states of a transported object.

First, the learning data in the learning processing is described.

Figure 11:
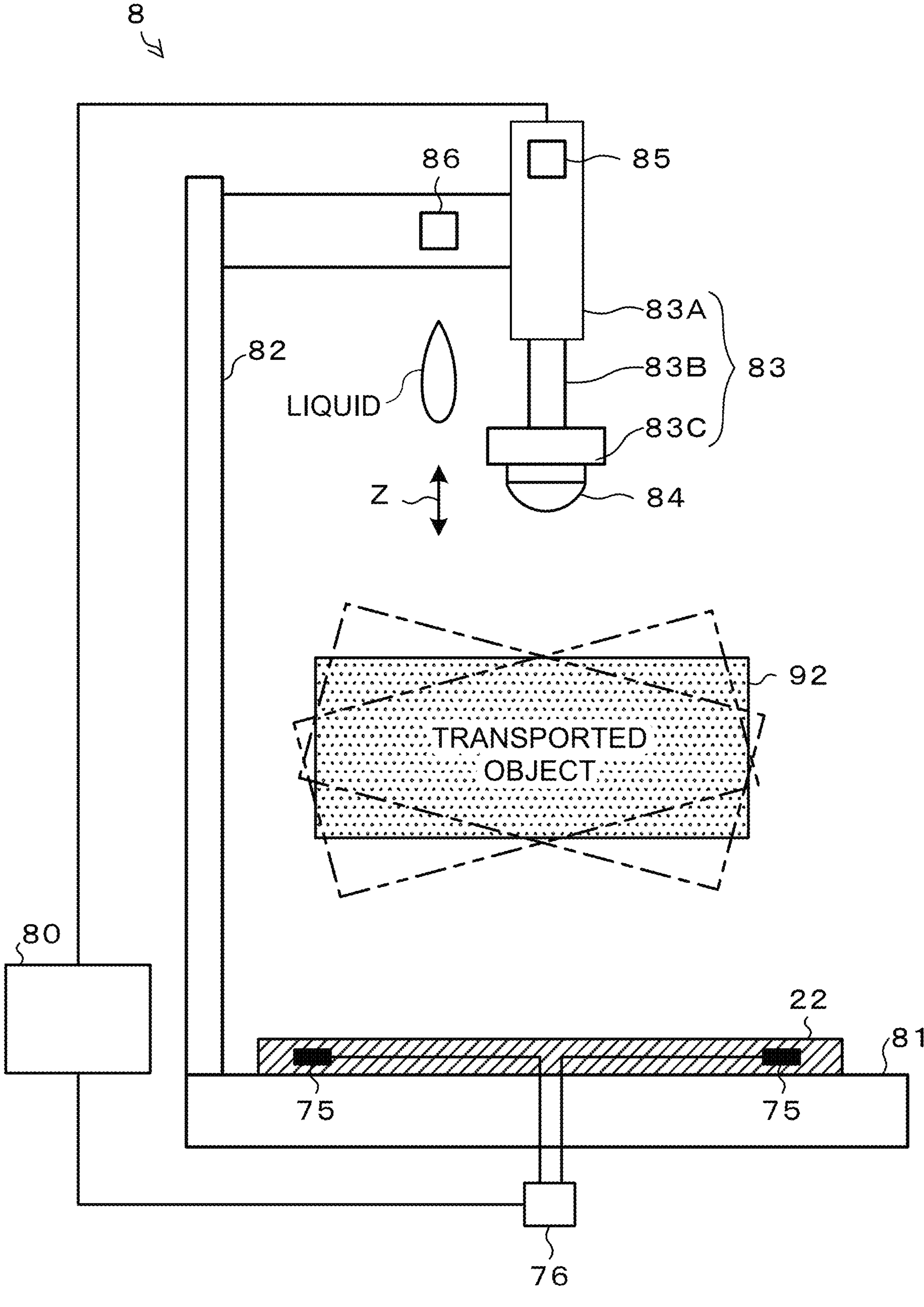
FIG. 11 is a drawing illustrating a measuring device that measures a physical amount that relates to a placed state relating to the first embodiment.

FIG. 11 illustrates an example of measuring device 8 that measures physical amounts relating to placed states. The measuring device 8 measures electrical characteristics of the electrically-conductive urethane 22 by applying at least one of a pressure stimulus and a material stimulus to the electrically-conductive urethane 22.

At the measuring device 8, a pressure applying section 83 for applying a pressure stimulus to the electrically-conductive urethane 22 is mounted to a fixed portion 82 that is fixed to a base 81. The pressure applying section 83 has a pressure applying main body 83A, an arm 83B that can extend and retract with respect to the pressure applying main body 83A, and a distal end portion 83C mounted to the distal end of the arm 83B. The pressure applying main body 83A is fixed to the fixed portion 82. The arm 83B is extended and retracted in accordance with an input signal, and the distal end portion 83C is moved in a predetermined direction (the arrow Z direction and the direction opposite thereto). Due thereto, a pushing member 84 can contact the electrically-conductive urethane 22 that is set on the base 81 and can push the electrically-conductive urethane 22 after contacting it, and can move away from the electrically-conductive urethane 22.

Further, a moisture applying section 86 for applying a material stimulus to the electrically-conductive urethane 22 also is mounted to the fixed portion 82. The moisture applying section 86 applies moisture to the electrically-conductive urethane 22.

The electrically-conductive urethane 22 is disposed on the base 81, and the transported object 92 is disposed on the electrically-conductive urethane 22. The pushing member 84 that is a predetermined shape is mounted to the distal end portion 83C of the pressure applying section 83. The electrically-conductive urethane 22 is disposed such that the pushing member 84, which is mounted to the distal end portion 83C of the pressure applying section 83, can at least contact the electrically-conductive urethane 22. The pushing member 84 is a member that applies a pressure stimulus by a predetermined pressure to the electrically-conductive urethane 22. A pushing member whose distal end is shaped as a curved surface (e.g., a portion of a sphere) may be used as the pushing member 84, and the cross-sectional shape thereof may be any of trapezoidal, circular, oval and polygonal, or may be another shape.

The pressure applying section 83 operates such that, due to the arm 83B extending, the distal end portion 83C pushes the pushing member 84 against the electrically-conductive urethane 22.

The pressure applying main body 83A has a force sensor 85 having the function of detecting forces in six axial directions for example. The force sensor 85 has the function of detecting the pushing state of the pushing member 84 with respect to the electrically-conductive urethane 22, and the function of detecting the pressure applied to the target object 2, from the detected forces. Due to this force sensor 85, it is possible to detect, in time series, physical amounts in states in which the pushing member 84 is pushing the electrically-conductive urethane 22, and it is possible to detect, in time series, pressures applied to the target object 2. Note that the force sensor 85 may be omitted.

The moisture applying section 86 operates so as to expel, onto the electrically-conductive urethane 22, a liquid (e.g., water) that is instructed from a controller 80 described hereinafter.

The measuring device 8 has the controller 80 that is connected to the pressure applying section 83, the force sensor 85, and the moisture applying section 86. The controller 80 has an unillustrated CPU, carries out control of the pressure applying section 83 by the unillustrated CPU, applies at least one of a pressure stimulus via the transported object 92 and a material stimulus by a liquid to the electrically-conductive urethane 22, and acquires and stores the time-series electrical characteristics of the electrically-conductive urethane 22 with respect to the applied stimulus.

In the present embodiment, the controller 80 carries out reciprocal movement that extends and retracts the arm 83B, and applies a pressure stimulus that artificially reproduces a state in which the transported object 92 loses balance. Namely, the controller 80 carries out control of the pressure applying section 83 so as to carry out application of and canceling of a pressure stimulus with respect to the electrically-conductive urethane 22. For example, it is possible to make the position where the pressure stimulus is applied be the center of gravity position of the transported object 92, and to use the amount of offset (ratio) between the center of gravity position, which is determined from the position where the pressure stimulus is applied, and the central position of the placed surface of the transported object. Further, the controller 80 outputs an instruction to the moisture applying section 86 to expel liquid of a set amount, and applies a material stimulus that artificially reproduces the state of a leak from the transported object 92. Moreover, synchronously with the pressure stimulus, or with the pressure stimulus and the material stimulus, that is applied to the electrically-conductive urethane 22, the controller 80 acquires the electrical characteristics at the electrically-conductive urethane 22. Accordingly, the measuring device 8 can acquire, in time series, the electrical characteristics of the electrically-conductive urethane 22 to which a stimulus is applied, as one learning data.

First, a case of measuring the electrical characteristics of the electrically-conductive urethane 22 with respect to the placed state of the transported object in accordance with the pressure stimulus aspect is described.

Figure 12:
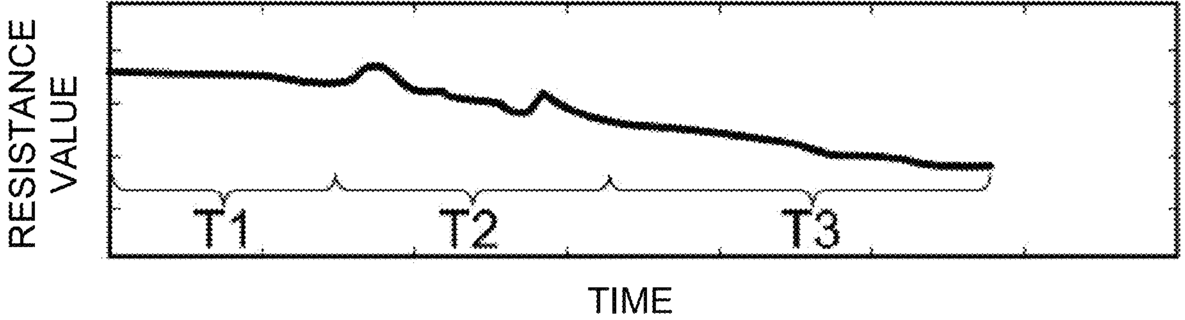
FIG. 12 is a schematic drawing illustrating an example of electrical characteristics of the electrically-conductive urethane relating to the first embodiment.

FIG. 12 illustrates, as a schematic drawing, an example of electrical characteristics of the electrically-conductive urethane 22 in accordance with the results of the above-described test. FIG. 12 is a concept of the electrical characteristics at times (times T1, T2, T3) when the three transporting pallets 93 (FIG. 9) having the respective transported objects 92 are successively loaded on the electrically-conductive urethane 22. Note that FIG. 12 illustrates a case in which balanced states are maintained at the respective transporting pallets 93 that have the transported objects 92, and the balanced states are maintained also at the time when the three transporting pallets 93 are loaded. As illustrated in FIG. 12, the pressure stimulus varies at the time when one of the transporting pallets 93 is loaded, and the corresponding electrical characteristics are exhibited, and, each time that the transporting pallet 93 is loaded, there is an electrical characteristic corresponding to the changed pressure stimulus. The electrical characteristics at the time of applying a pressure stimulus, which artificially reproduces a state in which the transported object 92 becomes unbalanced, are measured with respect to these electrical characteristics.

The present embodiment describes a case of artificially reproducing a state in which the transported object 92 loses balance (the states of the transported object 92 illustrated by the one-dot chain line and the two-dot chain line in FIG. 11) due to a pressure stimulus being applied by the pressure applying section 83. However, the technique of the present disclosure is not limited to this. For example, the center of gravity of the transported object 92 may be moved, instead of a pressure stimulus that artificially reproduces a state in which the balance of the transported object 92 (the equilibrium state) is lost. Further, the measuring device 8 may be loaded on a moving body and moved so as to apply a moment, and the pressure stimulus that applies the moment may be reproduced.

The placed state of the transported object is described next.

The electrical characteristics of the electrically-conductive urethane 22 fluctuate due to the position and the magnitude of the pressure stimulus applied from the transported object 92 or the transporting pallet 93 for example. Further, if the center of gravity of the transported object 92 or the transporting pallet 93 becomes offset or the applied pressure distribution becomes offset, the equilibrium state (balance) of the transported object 92 or the transporting pallet 93 is lost. This appears as the direction and the magnitude of the offset, and the distribution ratio within the plane of contact, and the like, of the applied pressure distribution. For example, in a case in which the center of gravity is included in the central position of the transported object 92, there is the tendency that, as the amount of offset of the center of gravity position from the central position of the transported object 92 increases, the loss of the equilibrium state of the transported object becomes greater such as the transported object that is loaded falls-over or the like. There are also cases in which movement of the center of gravity arises also due to the direction and the magnitude of a moment that arises at the transported object 92. Accordingly, the tendency for the equilibrium state (the balance) to be lost due to the direction and the magnitude of the offset of the applied pressure distribution (e.g., the distribution ratio within the plane of contact) or the like, appears in the electrical characteristics of the electrically-conductive urethane 22. Thus, in the present embodiment, the tendency to lose balance is quantified by the center of gravity of the transported object and the applied moment, and is used as an index expressing the equilibrium state.

The amount of offset from the position of a predetermined center of gravity (e.g., the center of the region that is the placed region of the transported object 92 with respective to the electrically-conductive urethane 22) can be used as the center of gravity that serves as an index expressing the equilibrium state. Namely, the greater this amount of offset, the stronger the tendency for the transported object 92 to lose balance. Further, the magnitude that involves the direction of the moment also can be used. Namely, as this moment increases, the tendency for the transported object 92 to lose balance increases.

Placed state information (the state data 3), which expresses the placed state of the transported object 92, can be set in accordance with the above-described index. Accordingly, by deriving the above-described tendency that is exhibited in the electrical characteristics of the electrically-conductive urethane 22, it is possible to set the placed state of the transported object 92 in correspondence with the time-series electrical characteristics relating to the stimulus to the electrically-conductive urethane 22, as another one learning data. Accordingly, the set that is formed by the information, which express respectively the time-series electrical characteristics at the electrically-conductive urethane 22 and the placed state of the transported object 92 with respect to the electrical characteristics, is used as the learning data.

An example of the learning data is illustrated as a table next. Table 2 is an example of data sets in which time-series electrical resistance value data (r) and state data (R) expressing placed states are set in correspondence, as learning data relating to the placed state of the transported object 92 in accordance with the pressure stimulus aspect.

TABLE 2

| time-series electrical resistance value data (r) | *pressure stimulus R → placed state (equilibrium state) (center of gravity position x, moment m) | notes |
|---|---|---|
| r11, r12, r13, . . . , r1n | Ra1(x1, m1) | balanced |
| r21, r22, r23, . . . , r2n | Ra2(x2, m2) | tilting slightly |
| rk1, rk2, rk3, . . . , rkn | Ra3(x3, m3) | tilting greatly |
| . . . | . . . | . . . |

Table 2 is an example of state data (Ra), which is set in correspondence with the placed state in accordance with the pressure stimulus aspect, as the state data (R). It suffices for the state data (R) to be set in correspondence with any tendency that is exhibited in the above-described electrical characteristics. Table 2 illustrates a case of using the center of gravity position (x) or the moment (m) in the state data (R) that serves as an index expressing the equilibrium state. Note that the notes column in Table 2 shows examples in which information, which express messages that are intuitive to a user, are set in correspondence with the center of gravity position (x) and the moment (m) that are the state data (R). Accordingly, because the placed state of the transported object 92 in accordance with the pressure stimulus aspect is expressed distinctively in the time-series electrical characteristics of the electrically-conductive urethane 22, this functions effectively in the learning processing.

A case of measuring the electrical characteristics of the electrically-conductive urethane 22 with respect to the placed state of the transported object in accordance with the material stimulus aspect is described next.

The electrical characteristics of the electrically-conductive urethane 22 fluctuate due to the position and magnitude of an applied material stimulus such as a leak or the like of the transported object 92 or the transporting pallet 93. Accordingly, it is possible to detect that there is a placed state of the transported object 92 that has changed from its initial placement, e.g., a state of the transported object 92 such as a leak or the like that increases as the magnitude of the material stimulus increases. Accordingly, the tendency for the state of the material of the transported object 92 to vary due to the position and the magnitude (e.g., the content of a liquid such as moisture or the like, the water content or the percentage of contained water, which serve as moisture contents) or the like of the applied material stimulus, appears in the electrical characteristics of the electrically-conductive urethane 22. Thus, in the present embodiment, the tendency for the state of the material to change is quantified by the material stimulus that is applied to the electrically-conductive urethane 22, and is used as an index expressing the material change state.

At the measuring device 8, moisture is applied to the electrically-conductive urethane 22 by the moisture applying section 86. The properties of the electrically-conductive urethane 22 vary (are altered) due to the application of a material stimulus by the moisture applying section 86. Accordingly, by measuring the electrical characteristics of the electrically-conductive urethane 22 with respect to the moisture content that is applied as the material stimulus, it is possible to set the placed state of the transported object 92 that is in accordance with the material stimulus aspect, in correspondence with time-series electrical characteristics relating to the stimulus to the electrically-conductive urethane 22, as another one learning data. Accordingly, the set that is formed by the information, which express respectively the time-series electrical characteristics at the electrically-conductive urethane 22 and the placed state of the transported object with respect to the electrical characteristics, is used as the learning data.

Examples of data sets in which time-series electrical resistance value data (r) and state data (R) expressing placed states are set in correspondence, are illustrated in following Table 3 as learning data relating to the placed state of the transported object 92 in accordance with the material stimulus aspect.

TABLE 3

| time-series electrical resistance value data | *material stimulus R → placed state (leak state) (moisture content g and position y) | notes |
|---|---|---|
| r11, r12, r13, . . . , r1n | Rb1(g1: y1) | no leak |
| r21, r22, r23, . . . , r2n | Rb2(g2: y2) | there is a leak |
| rk1, rk2, rk3, . . . , rkn | Rb3(g3: y3) | large leak |
| . . . | . . . | . . . |

Table 3 is an example of state data (Rb), which is set in correspondence with the placed state in accordance with the material stimulus aspect, as the state data (R). Table 3 illustrates a case in which the moisture content (g) and the position (y) of the leak are used as the state data (R). Namely, due to moisture being applied to the electrically-conductive urethane 22, the properties of the material vary (are altered), and the electrical characteristics (e.g., the electrical resistance values) vary. Accordingly, the electrical characteristics (e.g., the electrical resistance values) vary in accordance with the position and the amount of moisture. It suffices to acquire, as the learning data, data that relates to this variation. Note that the notes column in Table 3 shows examples in which information, which express messages that are intuitive to a user, are set in correspondence with the moisture amount (g) that is the state data (R). Accordingly, because the placed state of the transported object 92 in accordance with the material stimulus aspect is expressed distinctively in the time-series electrical characteristics of the electrically-conductive urethane 22, this functions effectively in the learning processing.

By the way, with regard to leaks from the transported object 92, leaks arise upon placing the transported object 92 on the electrically-conductive urethane 22. Namely, it is thought that a pressure stimulus is applied, and a material stimulus is applied, to the electrically-conductive urethane 22. For example, it is thought that, if a leak from the transported object 92 arises, there will be electrical characteristics that vary even more from the electrical characteristics in the state in which the transported object 92 was placed before the leak. Thus, the placed state of the transported object 92 at the time when a pressure stimulus and a material stimulus are applied to the electrically-conductive urethane 22 is considered. Consideration of the placed state of the transported object 92 at the time when a pressure stimulus and a material stimulus are applied can be realized by combining above Table 2 and Table 3. Further, concretely, it is also possible to use the electrical characteristics at a time when a pressure stimulus and a material stimulus are applied.

Examples of data sets in which time-series electrical resistance value data (r) and state data (R) expressing the placed state are set in correspondence, are illustrated in following Table 4 as learning data relating to the placed state of the transported object 92 in accordance with the pressure stimulus and material stimulus aspects.

TABLE 4

| time-series electrical resistance value data | *pressure stimulus and material stimulus R → placed state (center of gravity, leak) | notes |
|---|---|---|
| r11, r12, r13, . . . , r1n | Rc1(x1, g1: y1) | balanced no leak |
| r21, r22, r23, . . . , r2n | Rc2(x2, g2: y2) | slightly tilted no leak |
| rk1, rk2, rk3, . . . , rkn | Rc3(x3, g3: y3) | slightly tilted there is a leak |
| . . . | . . . | . . . |

Table 4 is an example of state data (Rc), which is set in correspondence with the placed state in accordance with both the pressure stimulus and the material stimulus aspects, as the state data (R). Table 4 illustrates a case in which the center of gravity position (x), the moisture content (g) and the position (y) of the leak are used as the state data (R). Note that the notes column in Table 4 shows examples in which information, which express messages that are intuitive to a user, are set in correspondence with the pressure stimulus and the material stimulus that are the state data (R). Accordingly, because the placed state of the transported object 92 in accordance with both the pressure stimulus and the material stimulus aspects is expressed distinctively in the time-series electrical characteristics of the electrically-conductive urethane 22, this functions effectively in the learning processing.

Learning processing that generates the learning model 51, which relates to the placed state of the transported object 92 relating to the present embodiment, is described next.

Figure 13:
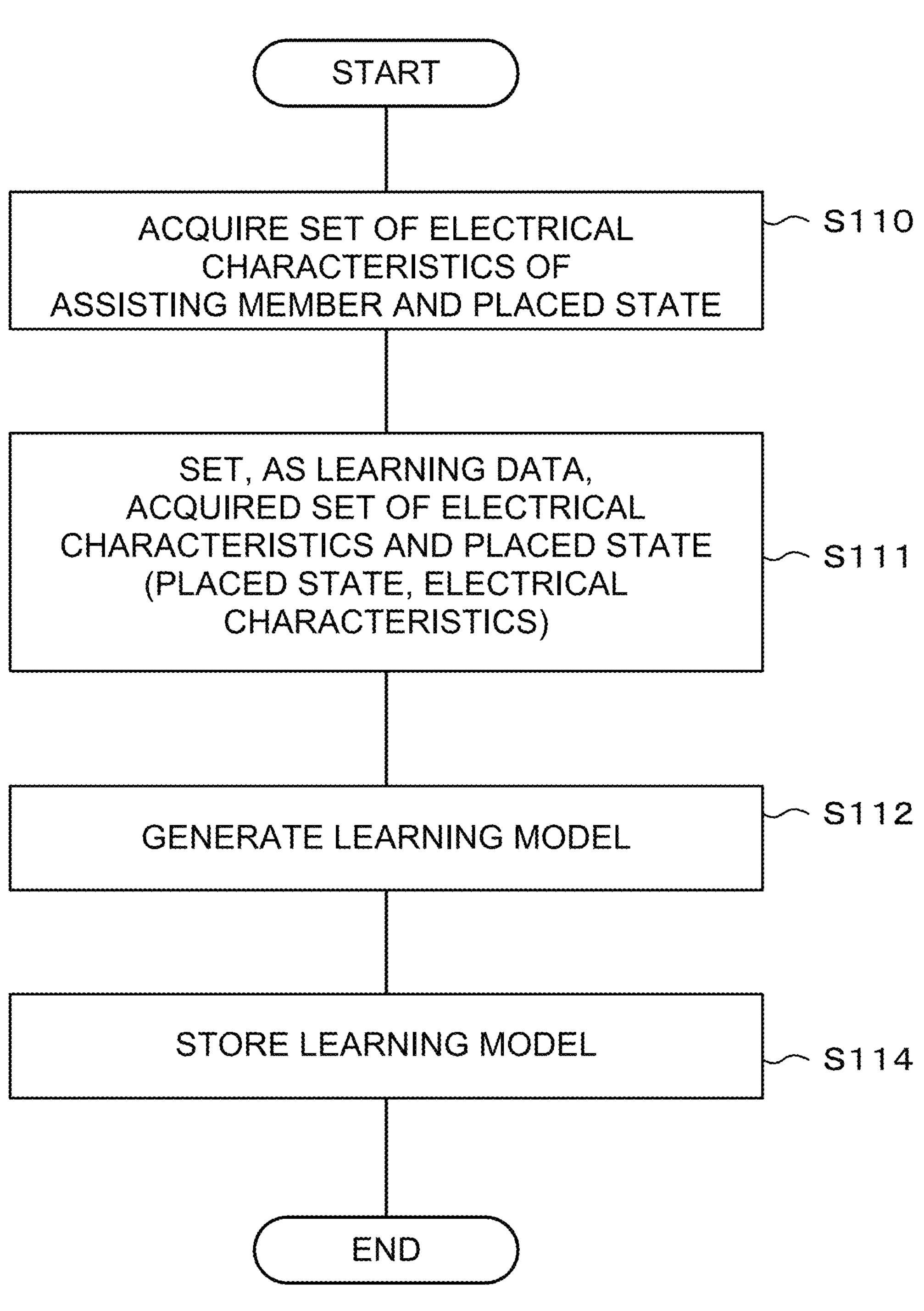
FIG. 13 is a drawing illustrating an example of the flow of learning processing relating to the first embodiment.

FIG. 13 illustrates an example of the flow of learning processing executed at the learning processing section 52. The learning processing is carried out by the processing of an unillustrated CPU at the above-described learning processing section 52.

In step S110, the electrical characteristics of the electrically-conductive urethane 22 (the input data 4) are acquired. In next step S111, first, the state data 3 expressing the placed state of the transported object 92 is acquired by deriving the index that expresses the above-described placed state and that was given to the electrical characteristics of the electrically-conductive urethane 22 (the input data 4). In this step S111, the input data 4 that are the electrical characteristics of the target object 2, and the state data 3 that expresses the placed state of the transported object 92, are set in correspondence with one another, and the set of the input data 4 (electrical resistances) whose label is the state data 3 (index) is acquired as learning data. In next step S112, the learning model 51 is generated by using the acquired learning data. Namely, the collection of information of weighting parameters (weights or strengths) of the connections between the nodes, which are the results of learning learned by using a large number of learning data as described above, is acquired. Then, in step S114, data, which is expressed as the collection of the information of the weighting parameters (weights or strengths) of the connections between the nodes which are the results of learning, are stored as the learning model 51. Note that the processings of step S110 and step S111 are examples of processings executed by the acquiring section of the present disclosure. Further, the processing of step S112 is an example of the processing executed by the learning model generating section of the present disclosure.

The processing of estimating the placed state of a transported object by using the learning model 51 relating to the present embodiment is described next.

As described above, at the placed state estimating device 1A, by using the trained learning model 51 that has been generated by the method exemplified above, it is possible to identify the placed state of a transported object from the electrical characteristics that are due to the stimulus applied by the transported object 92, if the learning model 51 that has been sufficiently trained is used.

Note that the placed state estimating device 1 of the target object is an example of the estimating section and the estimating device of the present disclosure. The electrical characteristic detecting section 76 is an example of the detecting section of the present disclosure. The operation/display portion 116 is an example of the outputting section of the present disclosure.

Figure 14:
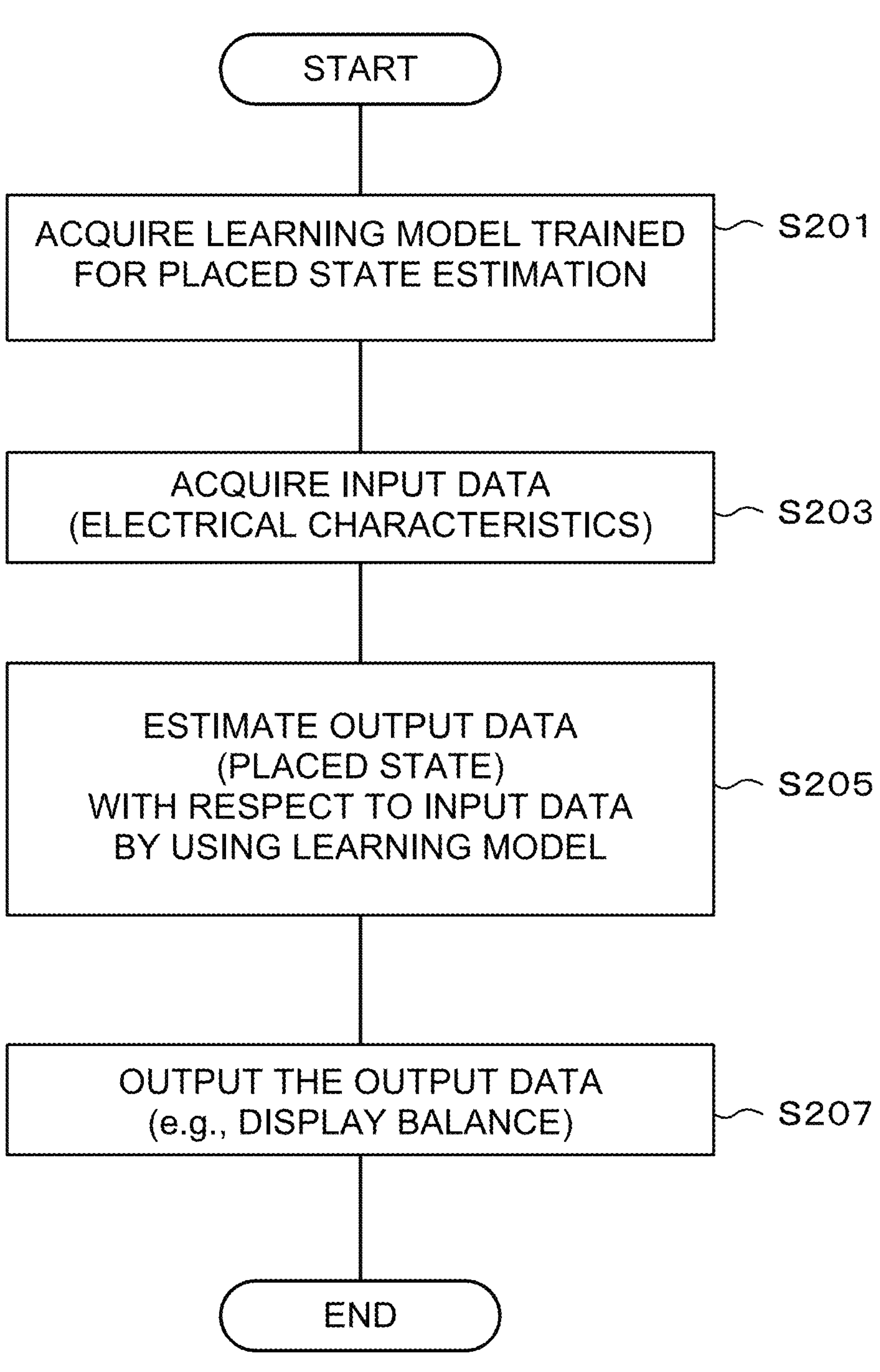
FIG. 14 is a flowchart illustrating an example of the flow of placed state estimating processing relating to the first embodiment.

An example of the flow of the processing of estimating the placed state of a transported object in accordance with the control program 108P executed at the computer main body 100 is illustrated in FIG. 14. The estimating processing illustrated in FIG. 14 is executed by the CPU 102 when the power of the computer main body 100 is turned on.

First, in step S201, the learning model 51 is acquired and the learning model 51 is constructed due to the learning model 51, which has been trained for the above-described placed state estimation, being read-out from the learning models 108M of the auxiliary storage device 108 and being expanded in the RAM 104. In step S201, the learning model 51, which has been trained by any of the above-described placed states of the transported object 92 in accordance with the pressure stimulus aspect (Table 2), placed states of the transported object 92 in accordance with the material stimulus aspect (Table 3), and placed states of the transported object 92 in accordance with both the pressure stimulus and the material stimulus aspects (Table 4), is constructed.

Next, in step S203, the time-series input data 4 (electrical characteristics) in the state in which the unknown transported object 92 (object of estimation) is placed is acquired via the detecting section 118.

Next, in step S205, by using the learning model 51 acquired in step S201, the output data 6 (the placed state of the object of estimation), which corresponds to the input data 4 (the electrical characteristics) acquired in step S203, is estimated. Then in next step S207, the output data 6 (the placed state of the object of estimation) that is the results of estimation is outputted via the communication section 114, and the present processing routine is ended.

Note that, in step S207, it is possible to also output assisting information such as a notification of results of prediction that include the time period when the transported object 92 will break. For example, by using an above-described message that is intuitive to the user as the placed state, a predetermined time period, which corresponds to that placed state and in which it is predicted that the transported object 92 that is the object of estimation will break, may be outputted to the communication section 114 or the operation/display portion 116. By outputting assisting information in this way, the user can recognize that it is predicted that the transported object will break in the future if the current situation persists, and can carry out an appropriate processing that addresses the placed state in advance, such as changing the arrangement or the like for example.

Further, in step S207, it is also possible to output control information such as a control command of the transporting section 91 or the like. For example, in the case of a placed state in which it is predicted that the transported object 92 will break, in addition to giving notice of information expressing that the transported object 92 will break, it is possible to output a control command such as stopping the rotating driving section 91A of the transporting section 91 or the like. For example, control information, which expresses a control command such as stop the transporting or the like, is outputted such that there becomes a transporting state of the transporting section 91 such as a state in which the transporting by the transporting section is stopped, or the like. By outputting control information such as a control command or the like in this way, it is possible to inform the user of placement information by the behavior of the transporting section.

Figure 15:
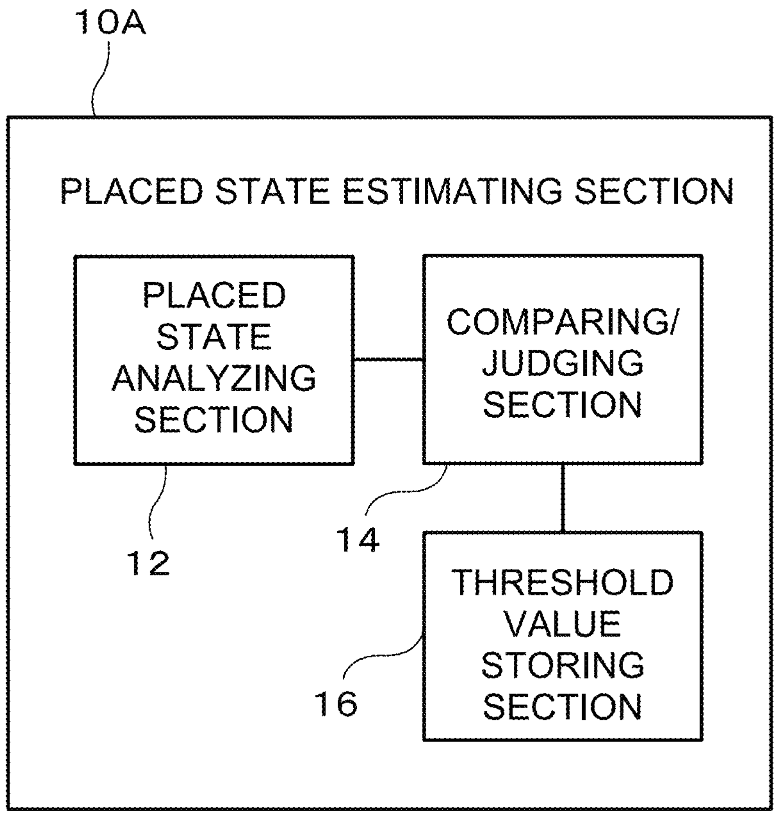
FIG. 15 is a drawing illustrating a modified example of a placed state estimating section relating to the first embodiment.

The estimating processing illustrated in above-described FIG. 15 is an example of the processing executed by a computer in the estimating method of the present disclosure.

As described above, in accordance with the present disclosure, it is possible to estimate the placed state of an object of estimation, from electrical characteristics at the object of estimation at which the placed state of a transported object is unknown. Namely, it is possible to estimate the placed state of a transported object that is the object of estimation, by using the electrical characteristics of the electrically-conductive urethane 22 and without using a special detecting device.

Further, by outputting the results of estimation of the placed state of the transported object 92 that is the object of estimation, it is possible to carry out, in advance, addressing of the future placed state that will be brought about by the current placed state, e.g., breakage of the transported object or the like.

First Modified Example

The above-described placed state estimating section 10 can include a processing of permitting placed states of a predetermined range as equilibrium states, e.g., as permitted states in which there is no concern that the transported object 92 will break. A placed state estimating section that includes the processing of permitting states as permitted states is described as a modified example.

FIG. 15 illustrates the structure of a modified example of the placed state estimating section 10. The placed state estimating section 10 includes a placed state analyzing section 12, a comparing/judging section 14, and a threshold value storing section 16.

The placed state analyzing section 12 is a functional section that analyzes the placed state of the transported object 92 by using time-series electrical characteristics (the input data 4) from the electrically-conductive urethane 22. The placed state analyzing section 12 derives an index expressed by the tendency of the placed state that is included in the above-described electrical characteristics. The comparing/judging section 14 is a functional section that is connected to the threshold value storing section 16 that stores a threshold value for judging the placed state, and compares the placed state that is the results of analysis and the threshold value for judging the placed state, and outputs the results of comparison. For example, it suffices for the threshold value storing section 16 to store, in the ROM 106 or the auxiliary storage device 108, a threshold value for judging the placed state so as to correspond to messages that are intuitive to users, or the like. Further, it suffices for the comparing/judging section 14 to, for example, by using the threshold value for judging the placed state, judge that there is an equilibrium state in a case in which an index such as the derived center of gravity position or the like is less than the threshold value, and to judge that there is a state in which there is the concern that the transported object 92 will break in a case in which the index is greater than or equal to the threshold value. By structuring a placed state estimating section 10A in this way, placed states of a predetermined range can be treated as equilibrium states.

Figure 16:
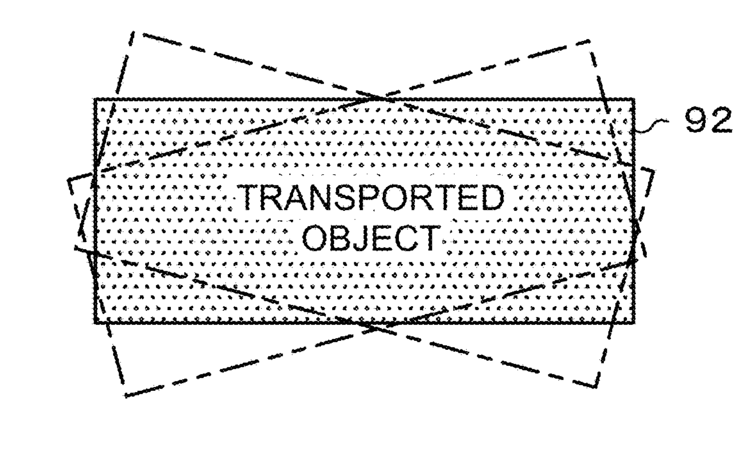
FIG. 16 is an drawing illustrating an example of wireless communication relating to the first embodiment.
Figure 16:
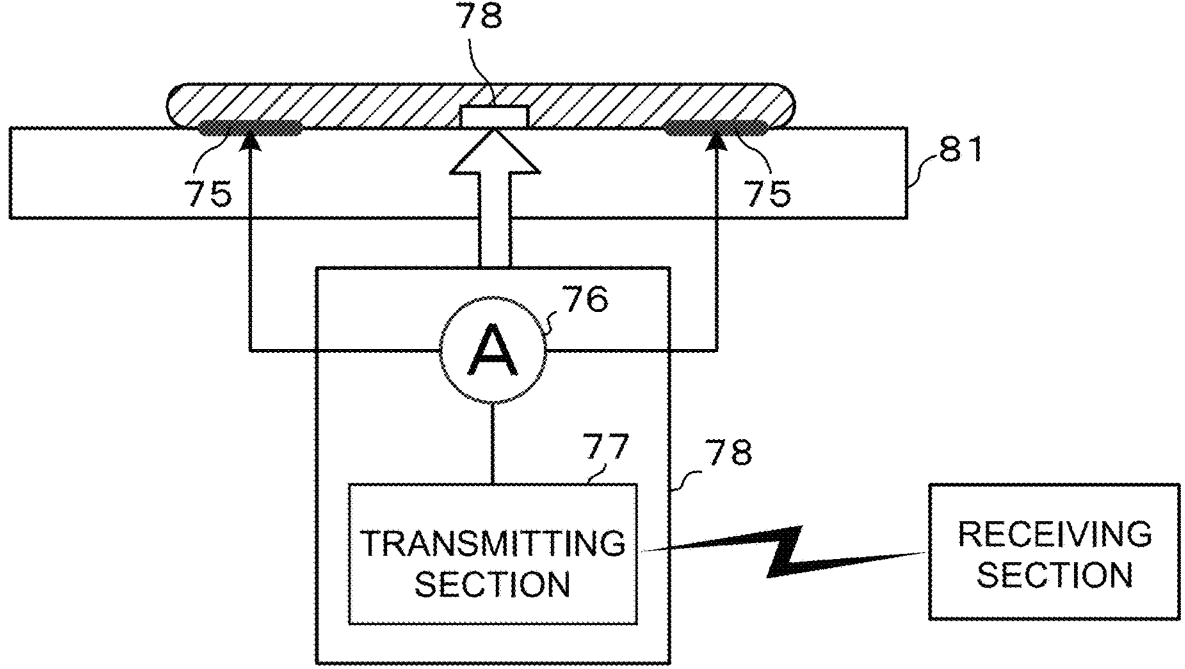

Note that the above embodiment describes an example in which the placed state estimating section 10 or the placed state estimating section 10A is connected to the electrically-conductive urethane 22 via the electrical characteristic detecting section 76, but this connection may be wired connection or may be wireless connection. For example, in the case of wireless connection, as illustrated in FIG. 16, it suffices to provide a transmitting unit 78, which includes the electrical characteristic detecting section 76 and a transmitting section 77, at the electrically-conductive urethane 22 side.

As described above, the present disclosure can estimate the placed state of a transported object by using the electrical characteristics of an assisting member that is provided at a transporting section that has a flexible material that is electrically conductive, without using a special detecting device.

Further, the technique of the present disclosure includes various processings being realized by software structures or hardware structures using a computer, and therefore includes the following techniques.

A first technique that serves as the above-described first aspect is an estimating device comprising:

a detecting section detecting electrical characteristics between a plurality of predetermined detection points at a flexible material that is electrically conductive and whose electrical characteristics vary in accordance with magnitude of an applied stimulus and that is at an assisting member that has the flexible material and is provided at a transporting section that transports a transported object; and an estimating section that inputs time-series electrical characteristics detected by the detecting section to a learning model that is trained by using, as learning data, time-series electrical characteristics at times when a stimulus was applied to the flexible material, and placed state information expressing a placed state of the transported object with respect to the assisting member that applies a stimulus to the flexible material, such that the time-series electrical characteristics are inputs of the learning model and the learning model outputs the placed state information, and the estimating section estimates placed state information expressing a placed state corresponding to inputted time-series electrical characteristics.

In a second technique, in the estimating device of the first technique, the electrical characteristics are volume resistances, the assisting member includes a member that is flexible, the placed state includes a state in which a pressure stimulus, or a stimulus that is a pressure stimulus and a material stimulus, is applied by the transported object to the assisting member, and the learning model is trained so as to output, as the placed state information, information expressing a state in which at least one stimulus among the pressure stimulus and the material stimulus is applied by the transported object that corresponds to detected electrical characteristics.

In a third technique, in the estimating device of the second technique, a state in which the pressure stimulus is applied is an equilibrium state of the transported object that varies in accordance with at least one of a center of gravity position of the transported object and a moment.

In a fourth technique, in the estimating device of any one of the first technique through the third technique, the assisting member includes a rubber material at which electrical conductivity is imparted to at least a portion of a rubber member that is flexible, or a urethane material at which electrical conductivity is imparted to at least a portion of a urethane of a structure having a skeleton that is at least one of fiber-like and mesh-like or a structure in which a plurality of minute air bubbles are scattered at an interior thereof.

In a fifth technique, in the estimating device of any one of the first technique through the fourth technique, the learning model includes a model generated by learning by using a network that uses the flexible material as a reservoir and is in accordance with reservoir computing using the reservoir.

In a sixth technique, the estimating device of any one of the first technique through the fifth technique further comprises:

an outputting section outputting results of estimation of the estimating section.

In a seventh technique, in the estimating device of the sixth technique, the outputting section outputs control information relating to transporting control of the transporting section, such that there becomes a predetermined transporting state of the transporting section corresponding to a placed state of results of estimation.

An eighth technique is an estimating method in which a computer:

acquires information from a detecting section that detects electrical characteristics between a plurality of predetermined detection points at a flexible material that is electrically conductive and whose electrical characteristics vary in accordance with magnitude of an applied stimulus and that is at an assisting member that has the flexible material and is provided at a transporting section that transports a transported object; and inputs time-series electrical characteristics detected by the detecting section to a learning model that is trained by using, as learning data, time-series electrical characteristics at times when a stimulus was applied to the flexible material, and placed state information expressing a placed state of the transported object with respect to the assisting member that applies a stimulus to the flexible material, such that the time-series electrical characteristics are inputs of the learning model and the learning model outputs the placed state information, and the computer estimates placed state information expressing a placed state corresponding to inputted time-series electrical characteristics.

Further, the following technique is included in the disclosed contents that were described above.

A ninth technique is an estimating program for causing a computer to execute processings of:

acquiring information from a detecting section that detects electrical characteristics between a plurality of predetermined detection points at a flexible material that is electrically conductive and whose electrical characteristics vary in accordance with magnitude of an applied stimulus and that is at an assisting member that has the flexible material and is provided at a transporting section that transports a transported object; and inputting time-series electrical characteristics detected by the detecting section to a learning model that is trained by using, as learning data, time-series electrical characteristics at times when a stimulus was applied to the flexible material, and placed state information expressing a placed state of the transported object with respect to the assisting member that applies a stimulus to the flexible material, such that the time-series electrical characteristics are inputs of the learning model and the learning model outputs the placed state information, and the computer estimates placed state information expressing a placed state corresponding to inputted time-series electrical characteristics.

Note that the above-described program can be applied to the following computer program product.

A computer program product for information processing, wherein the computer program product has a computer-readable storage medium that itself is not a transitory signal, a program is stored on the computer-readable storage medium, and the program causes a computer to execute:

acquiring information from a detecting section that detects electrical characteristics between a plurality of predetermined detection points at a flexible material that is electrically conductive and whose electrical characteristics vary in accordance with magnitude of an applied stimulus and that is at an assisting member that has the flexible material and is provided at a transporting section that transports a transported object; and inputting time-series electrical characteristics detected by the detecting section to a learning model that is trained by using, as learning data, time-series electrical characteristics at times when a stimulus was applied to the flexible material, and placed state information expressing a placed state of the transported object with respect to the assisting member that applies a stimulus to the flexible material, such that the time-series electrical characteristics are inputs of the learning model and the learning model outputs the placed state information, and the computer estimates placed state information expressing a placed state corresponding to inputted time-series electrical characteristics.

A tenth technique is a learning model generating device comprising:

an acquiring section acquiring electrical characteristics from a detecting section that detects electrical characteristics between a plurality of predetermined detection points at a flexible material that is electrically conductive and whose electrical characteristics vary in accordance with changes in an applied stimulus and that is at an assisting member that has the flexible material and is provided at a transporting section that transports a transported object, and placed state information expressing a placed state of a transported object that applies a stimulus to the flexible material due to the transported object being placed on the assisting member; and a learning model generating section that by using, as learning data, time-series electrical characteristics at times when a stimulus was applied to the flexible material and placed state information expressing placed states of the transported object with respect to the assisting member that applies a stimulus to the flexible material, generates a learning model whose inputs are the time-series electrical characteristics and that outputs placed state information that expresses a placed state corresponding to inputted time-series electrical characteristics.

In accordance with the above-described techniques, there is the effect that the placed state of a transported object can be estimated by using electrical characteristics of an assisting member provided at a transporting section that has a flexible material that is electrically conductive, without using a special detecting device.

Second Embodiment

A second embodiment of the present disclosure is described next. Because the second embodiment is structured similarly to the first embodiment, the same portions are denoted by the same reference numerals, and detailed description thereof is omitted.

Here, in a case in which an object such as an obstacle or the like exists at the periphery of a transported object at the time when the transported object is being transported, from the standpoint of protecting the transported object, it is preferable to reduce the impact that is due to a collision with the object such as an obstacle or the like, or to avoid a collision. For example, there are cases in which a transported object will break or move due to a collision with an object such as an obstacle or the like. Accordingly, it is important to address contact with an external object at the periphery, while the transported object is being transported.

However, in a case of detecting external objects at the periphery during transporting, a system that includes a camera and image analysis and the like becomes a large-scale system, which leads to an increase in the size of the device and therefore is not preferable. Further, also in cases of detecting changes in shape that arise due to impact or the like that is applied from an external object, a system that includes a camera and image analysis and the like becomes a large-scale system, which leads to an increase in the size of the device and therefore is not preferable. Moreover, portions that are hidden and cannot be captured by the camera cannot be measured in an optical method that uses a camera. Accordingly, there is room for improvement in applying the detection by deformation of an external object to the transporting of transported objects.

Thus, in the present embodiment, the above-described electrically-conductive urethane is disposed at a transporting section such as a moving body or the like, and the contact state at a collided-with side of the transporting side is estimated by using the electrical characteristics of the electrically-conductive urethane, and without using a special detecting device. The above-described state in which a pressure stimulus is applied is used as this contact state.

The present embodiment is an example of applying the technique of the present disclosure to an assisting member that is provided at a transporting section such as a moving body or the like, and assists the transporting of a transported object, and serves as the above-described target object 2. Note that, hereinafter, in order to simplify explanation, description is given of an example in which the electrically-conductive urethane 22 is disposed at the entirety of the member 21, and the target object 2 is formed by the electrically-conductive urethane 22 (target object cross-section 2-1 in FIG. 2). However, the electrically-conductive urethane 22 is not limited to being disposed at the entire member 21, and the technique of the present disclosure can, of course, be applied similarly to any of the above-described arrangements.

"Contact" and "contact state" in the present embodiment are a concept including states in which, at the time when a transported object is transported by the transporting section, there is at least contact between an external object, which applies a pressure stimulus to the electrically-conductive urethane 22, and the transporting section that transports the transported object. Contact states in which a pressure stimulus is applied include a collision state. A collision state is a state in which, at the time when an external object contacts the transporting section, a pressure stimulus, in which the amount of deformation by which the transporting section is deformed exceeds a predetermined deformation amount, is applied.

<Contact State Estimating Device>

An example of the contact state estimating device is described next. The contact state estimating device estimates the contact state of a transported object by using the electrically-conductive urethane 22.

Figure 17:
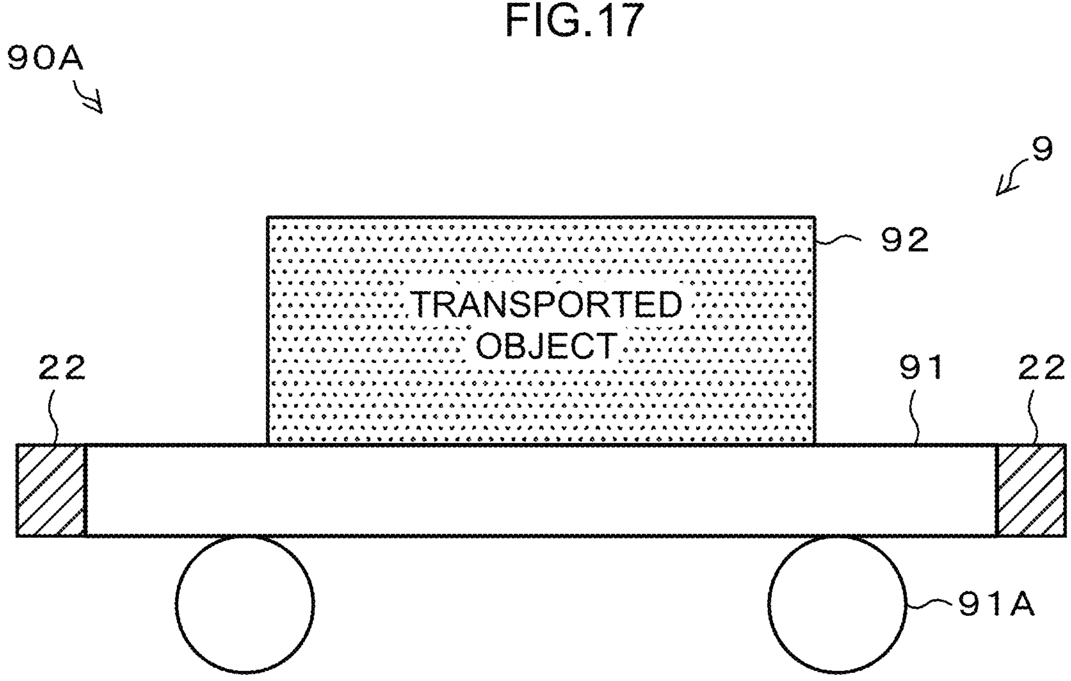
FIG. 17 is a drawing illustrating an example of a transporting body that includes the transported object and the transporting section relating to a second embodiment.
Figure 17:
Figure 17:
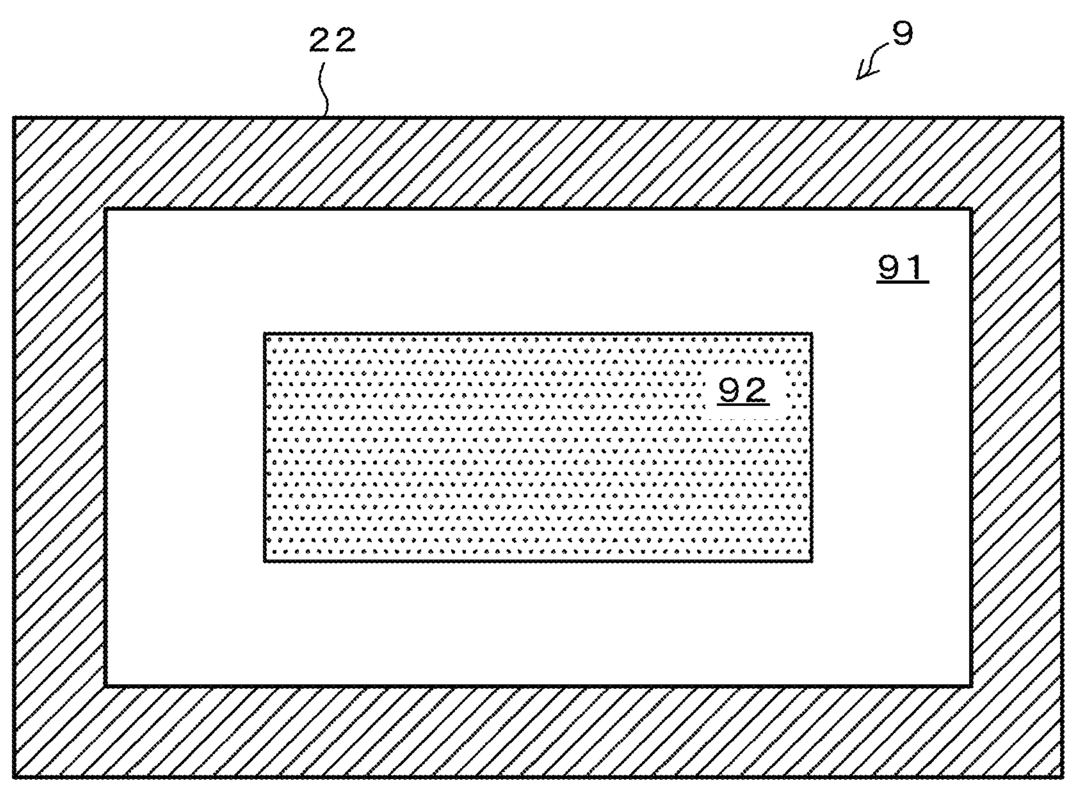

A transporting body, which includes the transported object whose contact state is to be estimated, is illustrated as the transporting body 9 in FIG. 17. FIG. 17 illustrates an example in which the electrically-conductive urethane 22 is provided at the periphery of the transporting section 91 that transports the transported object 92 by the rotational driving of the rotating driving section 91A. Note that, in FIG. 17, the transporting body 9 viewed from the side is illustrated as transporting body side surface 90A, and the transporting body 9 viewed from above is illustrated as transporting body upper surface 90B. Note that, although FIG. 17 illustrates a case in which the transported object 92 is placed on the transporting section 91, there may be a structure in which the transported object 92 is accommodated in or placed on a transporting pallet, or one or more plural transported objects 92 are placed.

By the way, in a case in which an external object and the transporting body 9 contact, it is important to sense the contact state that expresses that there is contact. This is effective, for example, in cases of sensing a collision and in cases of carrying out control to address the situation, in accordance with the state of contact between the external object and the transporting body 9. On the other hand, in cases in which an external object and the transporting body 9 contact, collision states in which the external object and the transporting body 9 affect one another, and states of slight contact in which, although the external object and the transporting body 9 contact one another, the effects of the external object and the transporting body 9 on one another do not constitute a collision state, are contemplated. Such slight contact states are states that do not require detailed consideration of the effects of the external object and the transporting body 9 on one another, or are states in which contact is permissible. Thus, in the present embodiment, contact states are classified into slight contact states and collision states, and control is carried out so as to address these respectively. Hereinafter, slight contact states are called permitted states.

Figure 18:
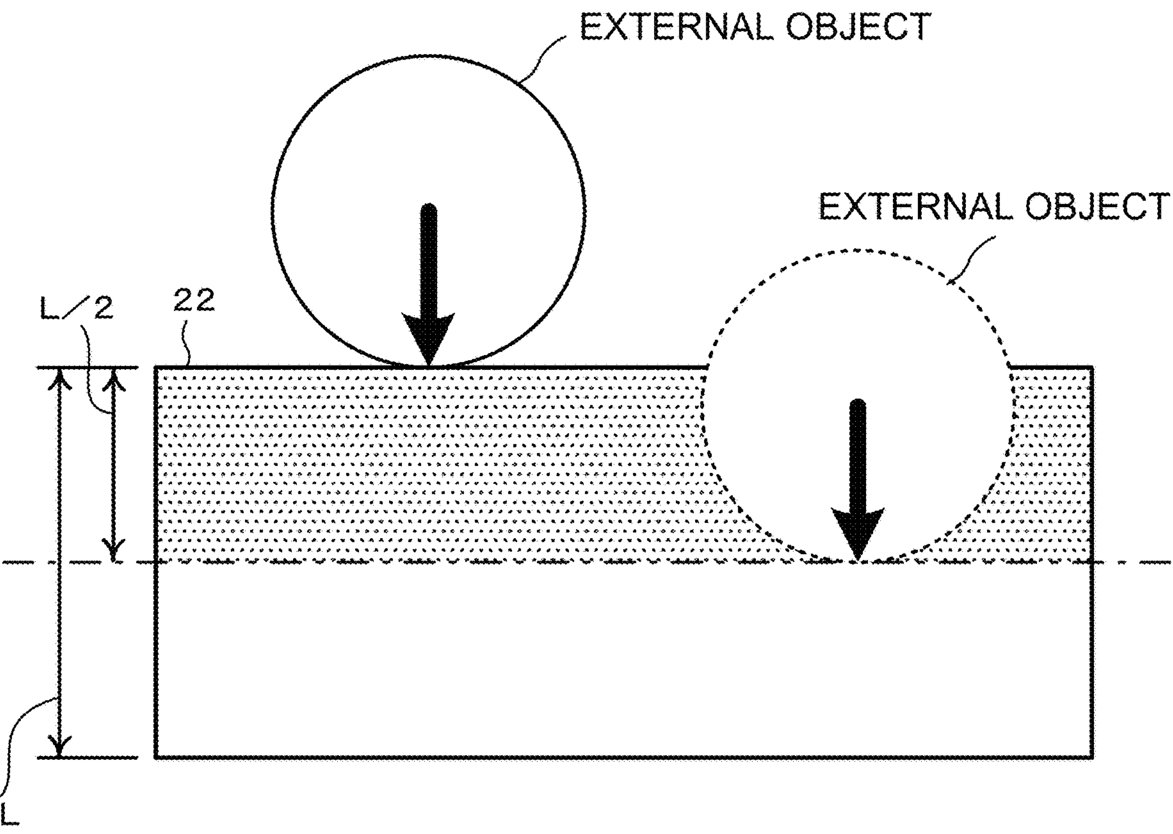
FIG. 18 is a schematic drawing illustrating contact states of an external object and the transporting body relating to the second embodiment.

FIG. 18 illustrates concepts relating to states of contact of an external object and the transporting body 9.

FIG. 18 illustrates a collision state that shows a state in which an external object and the transporting body 9 affect one another, from a state in which the external object contacts the electrically-conductive urethane 22. Specifically, in the contacting direction (colliding direction) of the external object and the electrically-conductive urethane 22, states, which are up until there is contact that involves deformation of a predetermined distance that is set as a collision state, are considered to be permitted states, and states of contact exceeding the deformation of a predetermined distance are considered to be collision states. In order to make it such that a permitted state can be formed, the electrically-conductive urethane 22 is formed so as to have a predetermined thickness L in the contacting direction (the colliding direction).

The boundary between a permitted state and a collision state can be set in advance on the basis of the flexibility of the electrically-conductive urethane 22. For example, it is possible to set the aforementioned predetermined distance in accordance with a ratio (e.g., 50%) with respect to the thickness L of the electrically-conductive urethane 22. By making a state, in which the electrically-conductive urethane 22 deforms up to a distance of 50% of the thickness L of the electrically-conductive urethane 22, be a permitted state, the above-described slight contact can be set to not be a state in which the external object and the transporting body 9 affect one another. On the other hand, by making a case in which deformation of a distance of 50% of the thickness L arises be the boundary of sensing a collision, a deformable region of the electrically-conductive urethane 22 remains.

Accordingly, it is possible to, while providing an impact mitigating function by the electrically-conductive urethane 22, obtain leeway of a predetermined time or a predetermined distance for mitigating the impact until the impact of the external object reaches the transporting section 91. More specifically, deformation of a distance of 50% or less of the thickness L of the electrically-conductive urethane 22 can be made to be a permitted state, and deformation of a distance exceeding 50% can be made to be a collision state.

Figure 19:
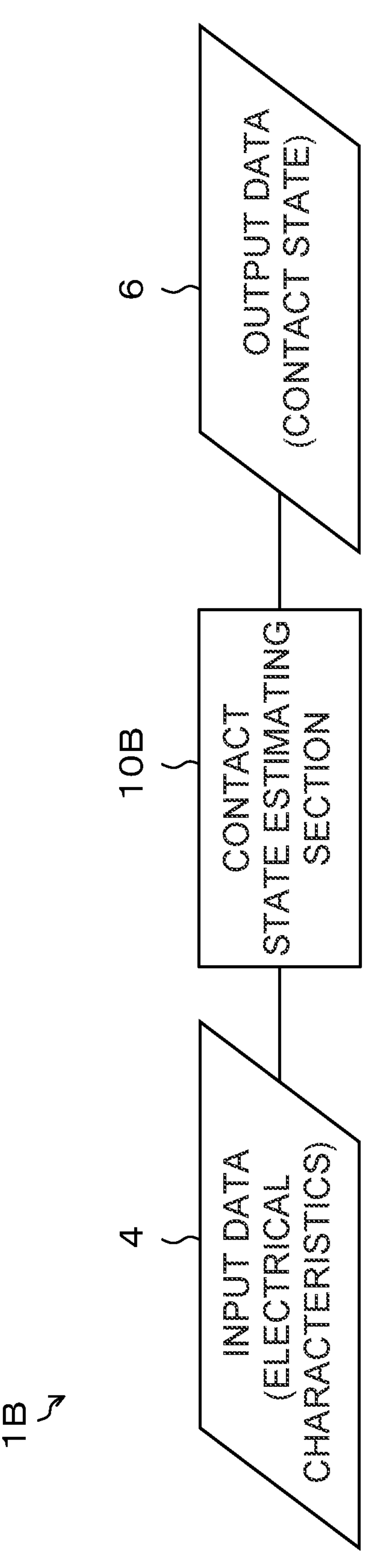
FIG. 19 is a drawing illustrating an example of the structure of a contact state estimating device relating to the second embodiment.
Figure 20:
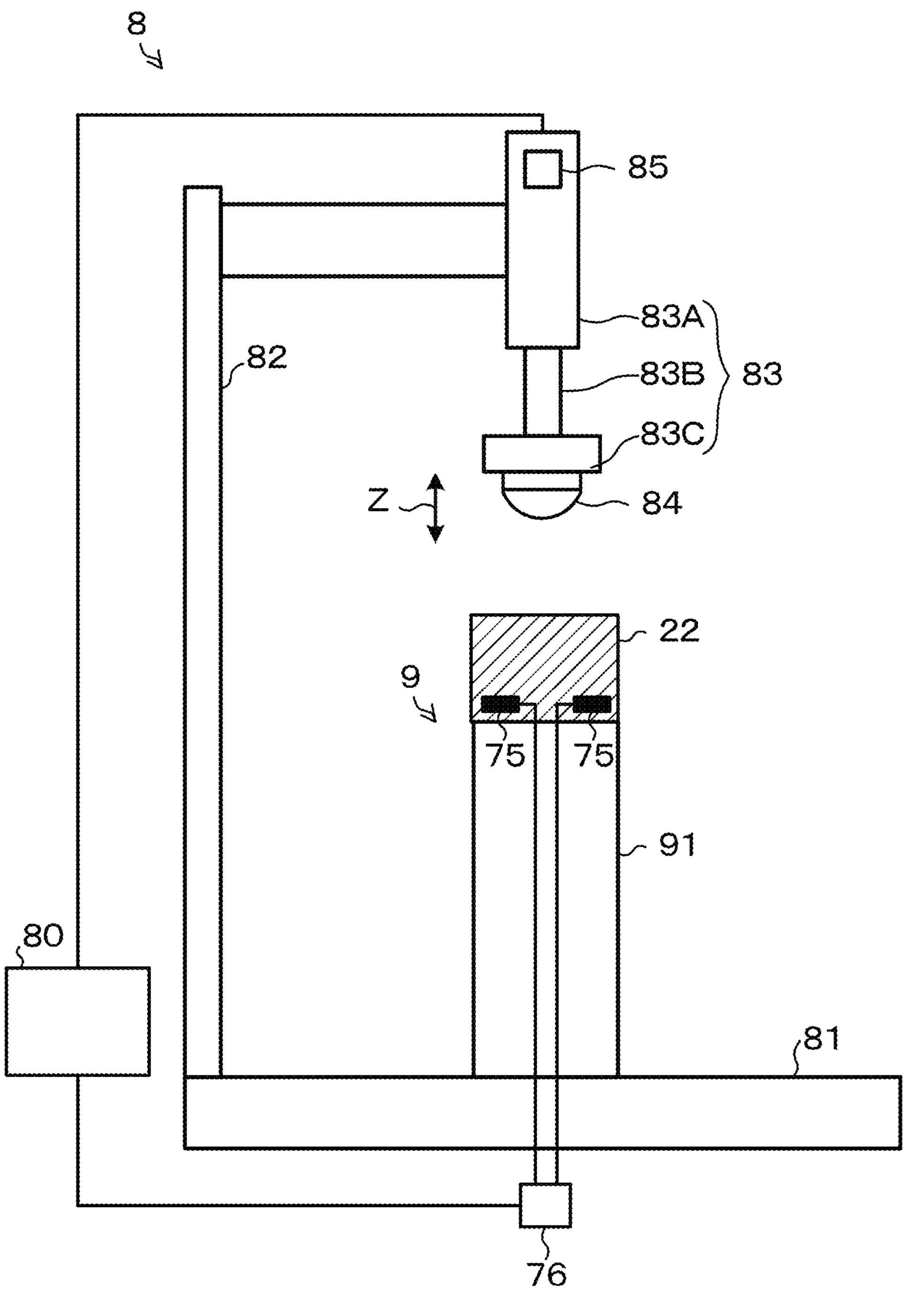
FIG. 20 is a drawing illustrating the measuring device that measures a physical amount that relates to a contact state relating to the second embodiment.

An example of the structure of an estimating device 1B that serves as the contact state estimating device relating to the present embodiment is illustrated in FIG. 19. The estimating device 1B illustrated in FIG. 19 has a contact state estimating section 10B instead of the estimating section 5 illustrated in FIG. 1.

In the same way as described above, by using the trained learning model 51, the estimating processing at the estimating device 1B estimates and outputs the state of contact with an unknown external object. The learning model 51 is trained by learning data that includes electrical characteristics of the electrically-conductive urethane 22 and contact states of the electrically-conductive urethane 22 and an external object.

The learning processing that generates the learning model 51 relating to the present embodiment is described next. In the learning processing relating to the present embodiment, learning is carried out by using, as learning data, electrical characteristics of the electrically-conductive urethane 22 (the input data 4) whose labels are contact state information (the state data 3) expressing states of contact with an external object.

First, the learning data that is used in the learning processing is described. FIG. 11 illustrates an example of the measuring device 8 that measures physical amounts relating to contact states. The measuring device 8 measures electrical characteristics of the electrically-conductive urethane 22 by applying a pressure stimulus to the electrically-conductive urethane 22. At the measuring device relating to the present embodiment and the above-described measuring device 8 illustrated in FIG. 11, the setting of the object of measurement, i.e., the relationship relating to the pressure stimulus between the electrically-conductive urethane 22 and the transporting body 9, is different, but the structures relating to measurement are substantially the same. Therefore, the portions that differ are described hereinafter.

The transporting body 9, at whose periphery the electrically-conductive urethane 22 is provided, is set on the base 81 of the measuring device 8. As described above, due to the arm 83B extending, the pressure applying section 83 operates such that the distal end portion 83C pushes the pushing member 84 against the electrically-conductive urethane 22. Further, the pressure applying main body 83A has the force sensor 85 having the function of detecting forces in six axial directions for example.

The measuring device 8 has the controller 80 that is connected to the pressure applying section 83 and the force sensor 85. The controller 80 acquires and stores the time-series electrical characteristics of the electrically-conductive urethane 22.

Figure 21:
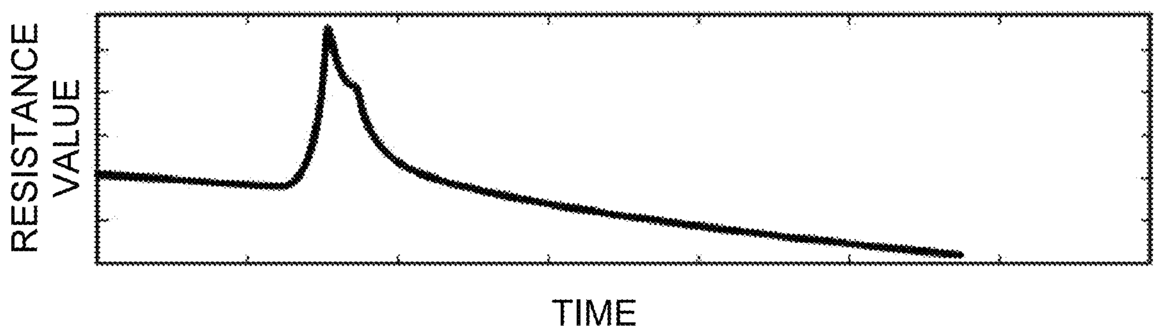
FIG. 21 is a drawing illustrating an example of the concept of electrical characteristics of the electrically-conductive urethane relating to the second embodiment.

In FIG. 21, an example of the electrical characteristics of the electrically-conductive urethane 22 in accordance with the results of the above-described test is illustrated as a concept. As illustrated in FIG. 21, the electrical characteristics at the time of applying a pressure stimulus, which artificially reproduces a contact state of an external object and the transporting body 9, are measured. In the present embodiment, by applying a pressure stimulus by the pressure applying section 83, a state relating to contact of an external object with respect to the transporting body 9 can be artificially reproduced.

The contact state of the transported object is described next.

The electrical characteristics of the electrically-conductive urethane 22 fluctuate due to the position and magnitude of the pressure stimulus applied from an external object for example. In the contact between an external object and the transporting body 9, it is important to be able to sense which position of the transporting body 9 is contacted. Thus, in the present embodiment, the contact position of the external object and the transporting body 9 and the magnitude (e.g., the above-described ratio with respect to the thickness L) are quantified and are made to be indices expressing the contact state.

It is possible to set contact state information (the state data 3) that expresses contact states of the transporting body 9, by the above-described indices. Accordingly, it is possible to set the contact state of the transported object 92 in correspondence with the time-series electrical characteristics relating to the stimulus to the electrically-conductive urethane 22, as the learning data. Accordingly, the set that is formed by the information, which express respectively the time-series electrical characteristics at the electrically-conductive urethane 22 and the contact state of the transporting body 9 with respect to the electrical characteristics, is used as the learning data.

Examples of data sets, in which time-series electrical resistance value data (r) and state data (R) expressing contact states are set in correspondence, are illustrated in following Table 5 as learning data relating to the contact state of an external object and the transporting body 9 (i.e., the electrically-conductive urethane 22).

TABLE 5

| time-series electrical resistance value data (r) | *pressure stimulus R → contact state (collision state) (position x, magnitude s (%))) | notes |
|---|---|---|
| r11, r12, r13, . . . , r1n | Ra1(x1, s1) | center of front surface |
| r21, r22, r23, . . . , r2n | Ra2(x2, s2) | front of right side surface |
| rk1, rk2, rk3, . . . , rkn | Ra3(x3, s3) | rear of right side surface |
| . . . | . . . | . . . |

Table 5 is an example of state data (Ra) that is made to correspond to the contact state of an external object and the transporting body 9 (i.e., the electrically-conductive urethane 22), as the state data (R). It suffices to set the indices that express the contact positions of the external object and the transporting body 9 and the magnitudes, in correspondence with the state data (R). Table 5 illustrates a case in which indices of the contact position (x) of the external object and the transporting body 9, and the magnitude (s: the ratio % with respect to the thickness L), are used as indices. Note that the notes column in Table 5 shows examples in which information, which express messages that are intuitive to a user, are set in correspondence with the contact position (x) and the magnitude(s) that are the state data (R). Accordingly, because the contact state of the external object and the transporting body 9 is expressed distinctively in the time-series electrical characteristics of the electrically-conductive urethane 22, this functions effectively in the learning processing.

Note that Table 5 illustrates learning data that are data sets in the above-described collision state. However, data sets including the above-described permitted states may be derived. In this case, it is possible to set data, which expresses which of a permitted-state data set or a collision-state data set that data set is, in correspondence with the data sets. By using data that expresses which of a permitted-state or collision-state data set that data set is, it is possible to select a data set that corresponds to the state that is the subject. For example, in a case in which only collision states are used as subjects, data sets that can improve the learning accuracy can be extracted as compared with a case in which all of the data sets are utilized.

The learning processing, which generates the learning model 51 relating to contact states of the transported object 92 relating to the present embodiment, is described next.

Figure 22:
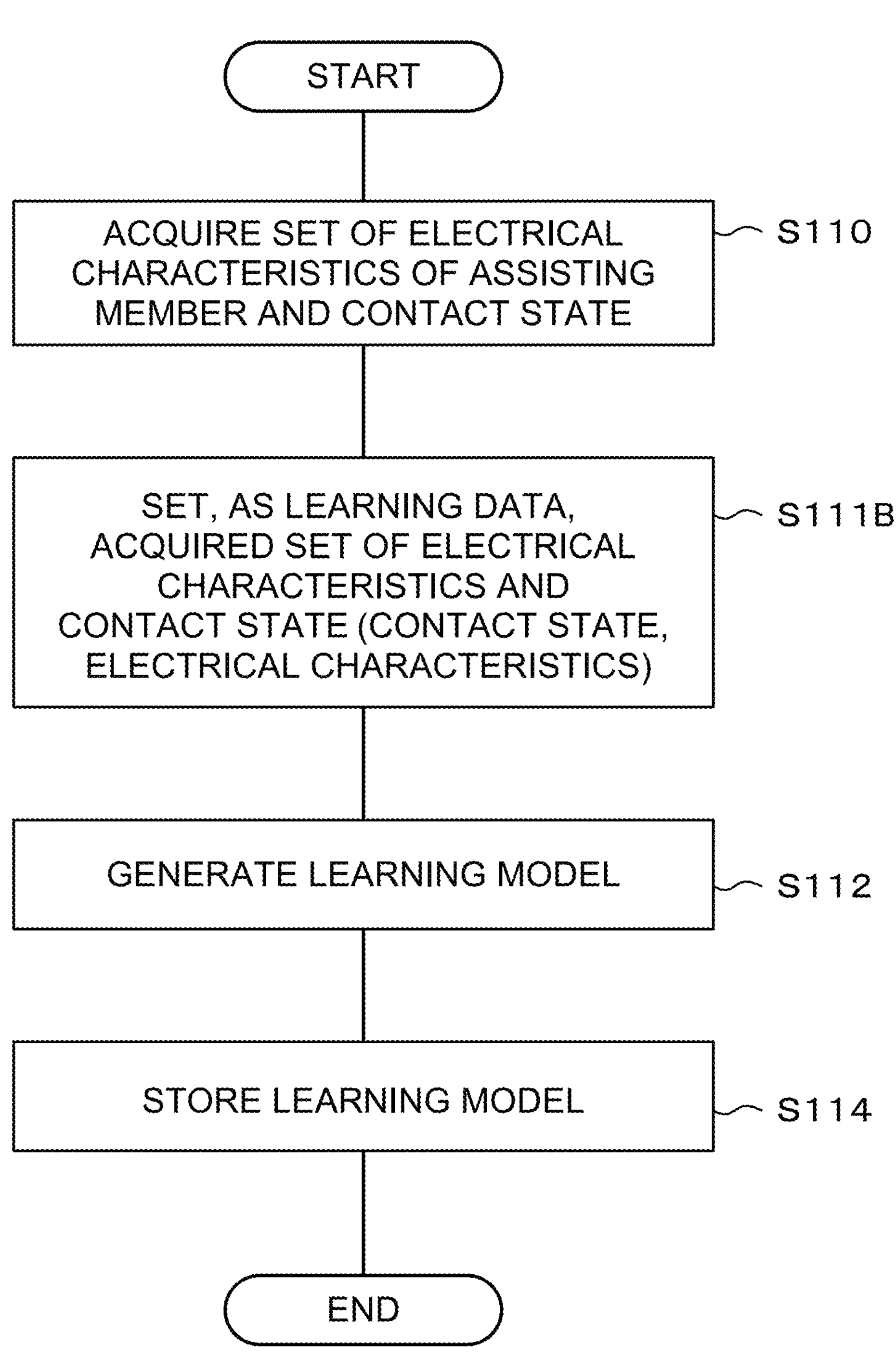
FIG. 22 is a drawing illustrating an example of the flow of learning processing relating to the second embodiment.

FIG. 22 illustrates an example of the flow of learning processing executed at the learning processing section 52. The learning processing illustrated in FIG. 22 is carried out by the processing of an unillustrated CPU at the above-described learning processing section 52. In the learning processing relating to the present embodiment, step S111B is executed instead of step S111 of the learning processing illustrated in FIG. 13.

After the electrical characteristics of the above-described electrically-conductive urethane 22 (the input data 4) are acquired (step S110), the state data 3 expressing the relative contact state of the external object and the transporting body 9 is acquired by deriving the index that expresses the contact state and that was given to the electrical characteristics of the electrically-conductive urethane 22 (the input data 4) (step S111B). In this step S111B, the input data 4 that are the electrical characteristics of the target object 2, and the state data 3 that expresses the contact state, are set in correspondence with one another, and the set of the input data 4 (electrical resistances), whose label is the state data 3 (the index), is set and acquired as learning data. Next, the learning model 51 is generated by using the acquired learning data (step S112). Data, which is expressed as the collection of the information of the weighting parameters (weights or strengths) of the connections between the nodes which are the results of learning, are stored as the learning model 51 (step S114). Note that the processings of step S110 and step S111 are examples of processings executed by the acquiring section of the present disclosure. Further, the processing of step S112 is an example of processing executed by the learning model generating section of the present disclosure.

The processing of estimating the contact state by using the learning model 51 relating to the present embodiment is described next.

As described above, at the contact state estimating device 1A, by using the trained learning model 51 that has been generated by the method exemplified above, it is possible to identify the contact state of relative contact of the external object and the transporting body 9 from the electrical characteristics that are due to the stimulus applied by the external object, if the learning model 51 that has been sufficiently trained is used.

Note that the contact state estimating device 1 of the target object is an example of the estimating section and the estimating device of the present disclosure. The electrical characteristic detecting section 76 is an example of the detecting section of the present disclosure. The operation/display portion 116 is an example of the outputting section of the present disclosure.

Figure 23:
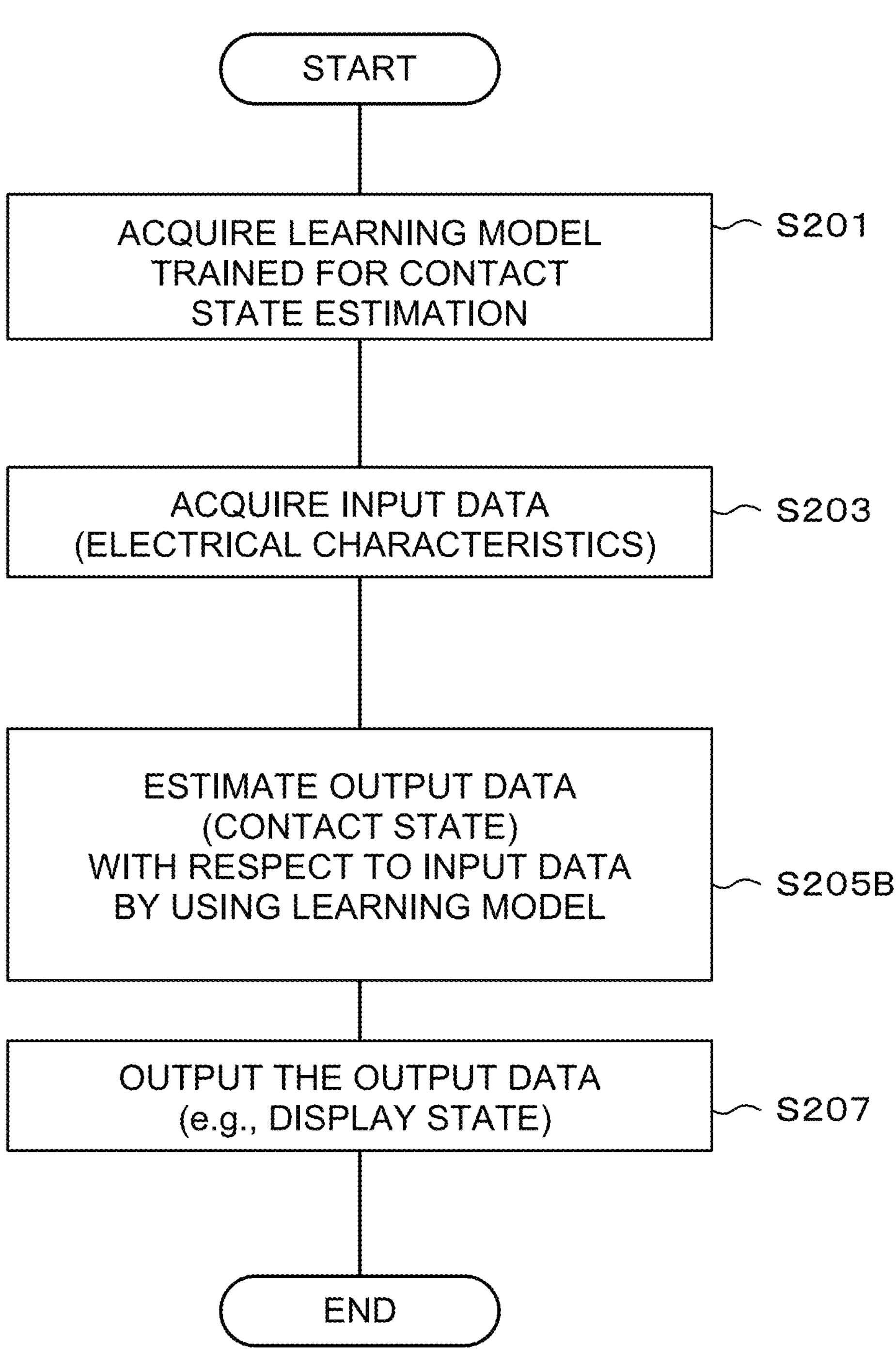
FIG. 23 is a flowchart illustrating an example of the flow of contact state estimating processing relating to the second embodiment.

An example of the flow of the processing of estimating the contact state of an external object in accordance with the control program 108P executed at the computer main body 100 is illustrated in FIG. 23. The estimating processing illustrated in FIG. 23 is executed by the CPU 102 when the power of the computer main body 100 is turned on. In the estimating processing illustrated in FIG. 23, step S205B is executed instead of step S205 of the estimating processing illustrated in FIG. 14.

First, the learning model 51 is acquired and the learning model 51 is constructed due to the learning model 51, which has been trained for the above-described contact state estimation, being read-out and being expanded in the RAM 104 (step S201). Here, the learning model 51, which has been trained by the above-described contact states of an external object and the transporting body 9 in accordance with a pressure stimulus (Table 5), is constructed. Next, the time-series input data 4 (electrical characteristics) in a state of contact with an unknown external object is acquired via the detecting section 118 (step S203).

In step S205B, by using the learning model 51 acquired in step S201, the output data 6 (the contact state) that corresponds to the input data 4 (the electrical characteristics) acquired in step S203 is estimated. Then, the output data 6 (the contact state) that is the results of estimation is outputted via the communication section 114 (step S207), and the present processing routine is ended.

Note that, in step S207, it is possible to also output assisting information such as a notification of predicted results including the time period when impact will be transmitted to the transported object 92. For example, the contact position of the external object and the transporting body 9 and the magnitude (ratio) may be outputted to the communication section 114 or the operation/display portion 116. Further, the above-described message that is intuitive to the user may be outputted to the communication section 114 or the operation/display portion 116 as the contact state. By outputting assisting information in this way, the user can recognize, with regard to the relative contact between an external object and the transporting body 9, that a future collision with the external object is predicted, and can carry out an appropriate processing that addresses the contact state in advance, such as, for example, stopping the transporting, moving in the reverse direction (an evasive action), or the like.

Further, in step S207, it is also possible to output control information such as a control command of the transporting section 91 or the like. For example, in the case of a contact state in which it is predicted that the transported object 92 will collide with the external object, in addition to giving notice of information, it is possible to output a control command such as stopping the rotating driving section 91A of the transporting section 91 or the like. For example, control information, which expresses a control command such as stop the transporting or the like, is outputted such that there becomes a transporting state by the transporting section 91 such as a state in which the transporting by the transporting section is stopped, or the like. By outputting control information such as a control command or the like in this way, it is possible to inform the user of contact information by the behavior of the transporting section 91.

The estimating processing illustrated in above-described FIG. 23 is an example of the processings executed by a computer in the estimating method of the present disclosure.

As described above, in accordance with the present disclosure, it is possible to estimate the contact state of an external object and the transporting body 9 (i.e., the electrically-conductive urethane 22), from electrical characteristics in the contact with an external object whose state of contact with the transported object is unknown. Namely, it is possible to estimate the state of contact of an external object and the transporting body 9, e.g., a collision, by using the electrical characteristics of the electrically-conductive urethane 22 and without using a special detecting device.

Further, the electrically-conductive urethane 22 has the predetermined thickness L that mitigates impact in relation to contact with external objects. Accordingly, by sensing contact of an external object and the electrically-conductive urethane 22 by using a predetermined distance in the contacting direction (the collision direction) as a boundary, it can be determined that, in slight contact of less than or equal to the predetermined distance, this is not a state in which the external object and the transporting body 9 affect one another. Further, by making a case in which deformation of a predetermined distance arises be the boundary for sensing a collision, a deformable region of the electrically-conductive urethane 22 remains. Accordingly, by sensing contact that goes past the predetermined distance as a collision, it is possible to, while providing a collision mitigating function due to the electrically-conductive urethane 22, obtain leeway of a predetermined time or a predetermined distance for mitigating impact until the impact of the external object is transmitted to the transporting body 9.

Moreover, by outputting the results of estimation of the contact state of the transporting body 9 with an external object, it is also possible to carry out, in advance, the addressing of a future state that will be brought about due to the current state of contact, e.g., the breakage of the transported object or the like.

Second Modified Example

The above-described contact state estimating section 10B can include a processing that makes the above-described permitted states be states in which there is no concern of a collision. A contact state estimating section that includes a processing of permitting states as permitted states is described as a modified example.

Figure 24:
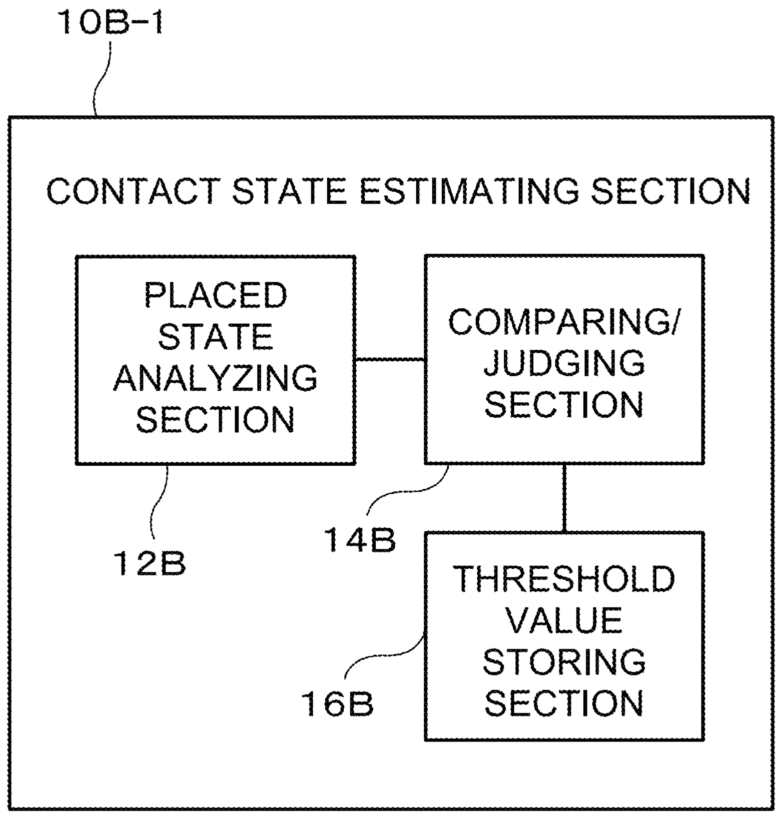
FIG. 24 is a drawing illustrating a modified example of a contact state estimating section relating to the second embodiment.
Figure 25:
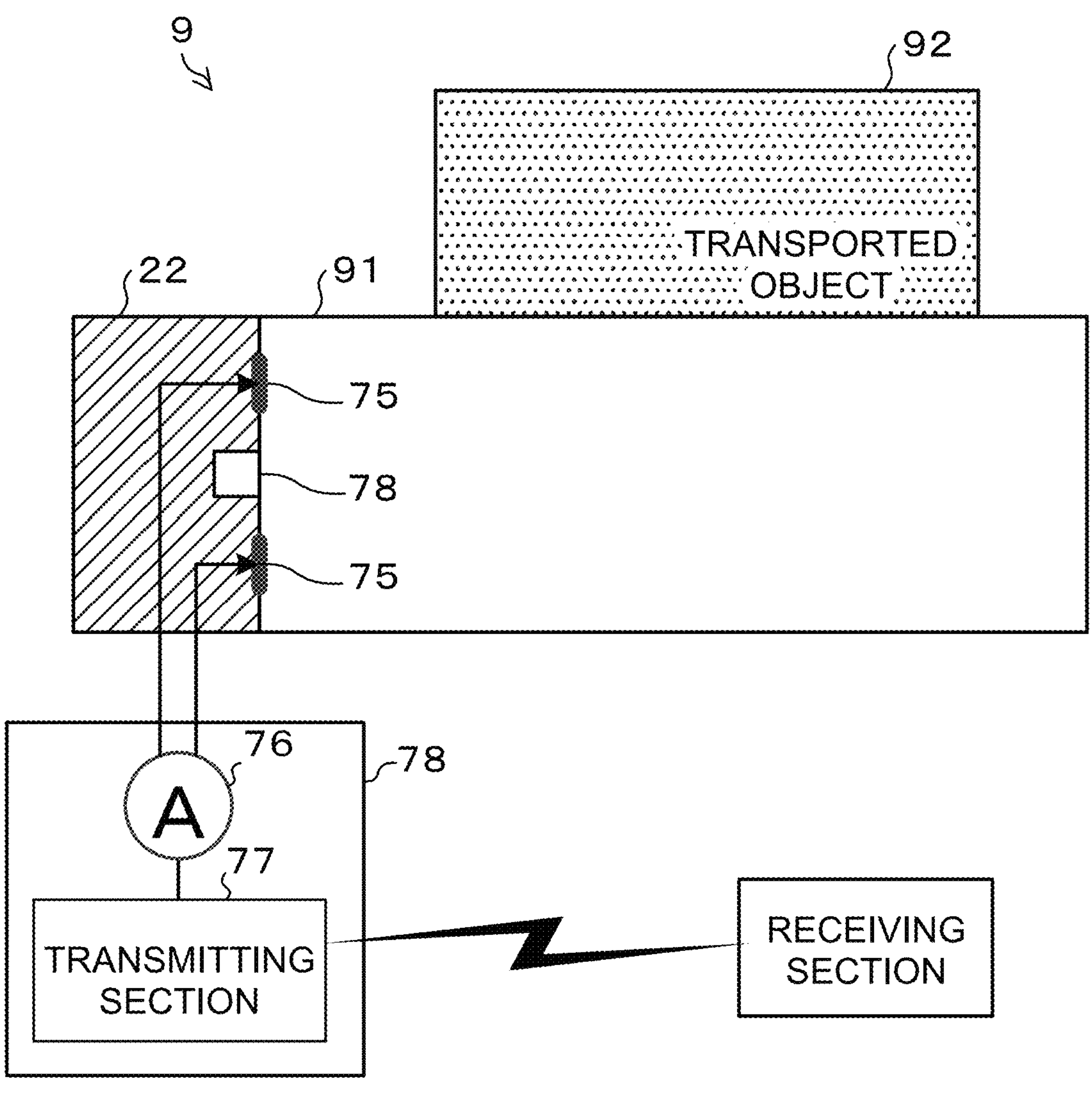
FIG. 25 is a drawing illustrating an example of wireless communication relating to the second embodiment.

FIG. 24 illustrates the structure of a modified example of the contact state estimating section 10B. A contact state estimating section 10B-1 relating to the modified example includes a contact state analyzing section 12B, a comparing/judging section 14B, and a threshold value storing section 16B.

The contact state analyzing section 12B is a functional section that analyzes the contact state of the transported object 92 by using time-series electrical characteristics from the electrically-conductive urethane 22 (the input data 4). The contact state analyzing section 12B derives an index expressing the above-described contact state. The comparing/judging section 14B is a functional section that is connected to the threshold value storing section 16B, which stores a threshold value for judging the contact state, and compares the contact state that is the results of analysis and the threshold value for judging the contact state, and outputs the results of comparison. For example, it suffices for the threshold value storing section 16B to store, in the ROM 106 or the auxiliary storage device 108, a threshold value for judging the contact state so as to correspond to messages that are intuitive to users, or the like. Further, it suffices for the comparing/judging section 14B to, by using the threshold value for judging the contact state for example, judge that there is a permitted state in a case in which an index such as the derived magnitude of contact (i.e., the ratio) or the like is less than the threshold value, and to judge that there is a collision state, in which there is the concern that an external object will collide, in a case in which the index is greater than or equal to the threshold value. By structuring the contact state estimating section 10B-1 in this way, contact states of a predetermined range can be treated as permitted states.

Note that the above embodiment describes an example in which the contact state estimating section 10B or the contact state estimating section 10B-1 is connected to the electrically-conductive urethane 22 via the electrical characteristic detecting section 76, but this connection may be wired connection or may be wireless connection. For example, in the case of wireless connection, as illustrated in FIG. 16, it suffices to provide the transmitting unit 78, which includes the electrical characteristic detecting section 76 and the transmitting section 77, at the electrically-conductive urethane 22 side.

As described above, the present disclosure can estimate the state of contact between an external object and a transporting section by using the electrical characteristics of an assisting member that is provided at the transporting section that has a flexible material that is electrically conductive, without using a special detecting device.

Further, the technique of the present disclosure includes various processings being realized by software structures or hardware structures using a computer, and therefore includes the following techniques.

An eleventh technique that serves as the above-described second aspect is an estimating device comprising:

a detecting section detecting electrical characteristics between a plurality of predetermined detection points at a flexible material that is electrically conductive and whose electrical characteristics vary in accordance with deformation and that is at an assisting member that has the flexible material and is provided at an exterior of a transporting section that transports a transported object; and an estimating section that inputs time-series electrical characteristics detected by the detecting section to a learning model that is trained by using, as learning data, time-series electrical characteristics of the flexible material that deforms by contact of an external object, and contact state information expressing a contact state with the external object that applies deformation to the flexible material, such that the time-series electrical characteristics are inputs of the learning model and the learning model outputs the contact state information, and the estimating section estimates contact state information expressing a contact state corresponding to inputted time-series electrical characteristics.

In a twelfth technique, in the estimating device of the eleventh technique, the electrical characteristics are volume resistances, the assisting member includes a member that is flexible, the contact state includes a state in which a pressure stimulus is applied by the external object to the assisting member, and the learning model is trained so as to output, as the contact state information, information expressing a state in which the pressure stimulus is applied by the external object that corresponds to detected electrical characteristics.

In a thirteenth technique, in the estimating device of the eleventh or twelfth technique, the assisting member includes a rubber material at which electrical conductivity is imparted to at least a portion of a rubber member that is flexible, or a urethane material at which electrical conductivity is imparted to at least a portion of a urethane of a structure having a skeleton that is at least one of fiber-like and mesh-like or a structure in which a plurality of minute air bubbles are scattered at an interior thereof.

In a fourteenth technique, in the estimating device of the thirteenth technique, the urethane material has a predetermined thickness toward an exterior, and the detecting section detects the electrical characteristics at a time when deformation of the urethane material that has the thickness exceeds a predetermined threshold value.

In a fifteenth technique, in the estimating device of any one of the eleventh technique through the fourteenth technique, the learning model includes a model generated by learning by using a network that uses the flexible material as a reservoir and is in accordance with reservoir computing using the reservoir.

In a sixteenth technique, the estimating device of any one of the eleventh technique through the fifteenth technique further comprises:

an outputting section outputting results of estimation of the estimating section.

In a seventeenth technique, in the estimating device of the sixteenth technique, the outputting section outputs control information relating to transporting control of the transporting section, such that there becomes a predetermined transporting state of the transporting section corresponding to a contact state of results of estimation.

An eighteenth technique is an estimating method in which a computer:

acquires electrical characteristics from a detecting section that detects electrical characteristics between a plurality of predetermined detection points at a flexible material that is electrically conductive and whose electrical characteristics vary in accordance with deformation and that is at an assisting member that has the flexible material and is provided at an exterior of a transporting section that transports a transported object; and inputs the acquired time-series electrical characteristics to a learning model that is trained by using, as learning data, time-series electrical characteristics of the flexible material that deforms by contact of an external object, and contact state information expressing a contact state with the external object that applies deformation to the flexible material, such that the time-series electrical characteristics are inputs of the learning model and the learning model outputs the contact state information, and the computer estimates contact state information expressing a contact state corresponding to inputted time-series electrical characteristics.

A nineteenth technique is an estimating program for causing a computer to execute processings of:

acquiring electrical characteristics from a detecting section that detects electrical characteristics between a plurality of predetermined detection points at a flexible material that is electrically conductive and whose electrical characteristics vary in accordance with deformation and that is at an assisting member that has the flexible material and is provided at an exterior of a transporting section that transports a transported object; and inputting the acquired time-series electrical characteristics to a learning model that is trained by using, as learning data, time-series electrical characteristics of the flexible material that deforms by contact of an external object, and contact state information expressing a contact state with the external object that applies deformation to the flexible material, such that the time-series electrical characteristics are inputs of the learning model and the learning model outputs the contact state information, and the computer estimates contact state information expressing a contact state corresponding to inputted time-series electrical characteristics.

Note that the above-described program can be applied to the following computer program product.

A computer program product for information processing, wherein the computer program product has a computer-readable storage medium that itself is not a transitory signal, a program is stored on the computer-readable storage medium, and the program causes a computer to execute:

acquiring electrical characteristics from a detecting section that detects electrical characteristics between a plurality of predetermined detection points at a flexible material that is electrically conductive and whose electrical characteristics vary in accordance with deformation and that is at an assisting member that has the flexible material and is provided at an exterior of a transporting section that transports a transported object; and inputting the acquired time-series electrical characteristics to a learning model that is trained by using, as learning data, time-series electrical characteristics of the flexible material that deforms by contact of an external object, and contact state information expressing a contact state with the external object that applies deformation to the flexible material, such that the time-series electrical characteristics are inputs of the learning model and the learning model outputs the contact state information, and the computer estimates contact state information expressing a contact state corresponding to inputted time-series electrical characteristics.

A twentieth technique is a learning model generating device comprising:

an acquiring section acquiring time-series electrical characteristics of a flexible material that is electrically-conductive and whose electrical characteristics vary in accordance with deformation and that deforms due to contact of an external object and that is at an assisting member that has the flexible material and is provided at an exterior of a transporting section that transports a transported object, the time-series electrical characteristics being detected by a detecting section that detects electrical characteristics between a plurality of predetermined detection points at the flexible material, and the acquiring section acquires contact state information expressing a contact state with the external object that applies deformation to the flexible material; and a learning model generating section that, by using the acquired time-series electrical characteristics and contact state information as learning data, generates a learning model whose inputs are the time-series electrical characteristics and that outputs contact state information corresponding to inputted time-series electrical characteristics.

In accordance with the above-described techniques, there is the effect that the contact state of an external object and a transporting body can be estimated by using electrical characteristics of an assisting member provided at a transporting section that has a flexible material that is electrically conductive, without using a special detecting device.

Third Embodiment

A third embodiment of the present disclosure is described next. Because the third embodiment is structured similarly to the first embodiment and the second embodiment, the same portions are denoted by the same reference numerals, and detailed description thereof is omitted.

Here, when a transported object is transported, there are cases in which a buffering material that buffers impact is inserted in the transported object such as a breakable object or the like. However, when a transported object is accommodated in a case such as a box or the like and is transported by a moving body such as a vehicle or the like, depending on the road conditions and the driving conditions and the like, there are cases in which an unexpected vibration or moment or the like is applied to the moving body, and the transported object moves within the case, and an unexpected impact is applied to that transported object. Accordingly, it is important to know of the behavior state that expresses the behavior of the transported object at the time when the transported object is transported.

However, in an aspect that detects changes in shape that arise at an object or the like, if the amount of deformation such as displacement or the like of a transported object at a transporting section is detected by using a camera and an image analysis method, a system that includes a camera and image analysis and the like becomes a large-scale system, which leads to an increase in the size of the device and therefore is not preferable. Further, portions that are hidden and cannot be captured by the camera cannot be measured in an optical method that uses a camera. Accordingly, there is room for improvement in applying the detection of deformation of an object to the transporting of transported objects.

Thus, in the present embodiment, the above-described electrically-conductive urethane is disposed at the periphery of a transported object in order to function as a buffering material as well, and the behavior state of the transported object is estimated by using the electrical characteristics of the electrically-conductive urethane and without using a special detecting device.

Further, when transporting a transported object, there are also cases in which leaks, in which the contents of a transported object leak-out to the exterior of the transported object, occur. However, because a special detecting device is needed in order to sense leaks and the like, this is not preferable. Thus, in the present embodiment, the behavior state of a transported object in accordance with the material stimulus aspect also can be estimated.

The present embodiment is an example of applying the technique of the present disclosure to an assisting member that is disposed at the periphery of a transported object and assists the transporting of the transported object and serves as the above-described target object 2. Note that, hereinafter, in order to simplify explanation, description is given of an example in which the electrically-conductive urethane 22 is disposed at the entirety of the member 21, and the target object 2 is formed by the electrically-conductive urethane 22 (target object cross-section 2-1 in FIG. 2). However, the electrically-conductive urethane 22 is not limited to being disposed at the entire member 21, and the technique of the present disclosure can, of course, be applied similarly to any of the above-described arrangements.

"Behavior" and "behavior state" in the present embodiment are a concept including movement of the transported object at which a stimulus is applied to the electrically-conductive urethane 22 from the transported object, and changes in form such as leaking or the like. The stimulus that is applied by the transported object includes at least one of the above-described pressure stimulus and material stimulus. From the standpoints of the structure and the shape of the electrically-conductive urethane 22, examples of values of behavior states in which a pressure stimulus is applied are the position where the transported object applies a pressure stimulus to the electrically-conductive urethane 22, the pressure distribution, the number of times that a pressure stimulus is applied, and the like. Further, from the standpoint of the material properties of the electrically-conductive urethane 22, examples of values of behavior states in which a material stimulus is applied are the moisture content (e.g., the content of a liquid such as moisture or the like, the water content, the percentage of contained water, and the like) that serves as the physical amount by which a material stimulus is applied from a transported object to the electrically-conductive urethane 22.

<Behavior State Estimating Device>

An example of the behavior state estimating device is described next. The behavior state estimating device estimates the behavior state of a transported object by using the electrically-conductive urethane 22.

Figure 26:
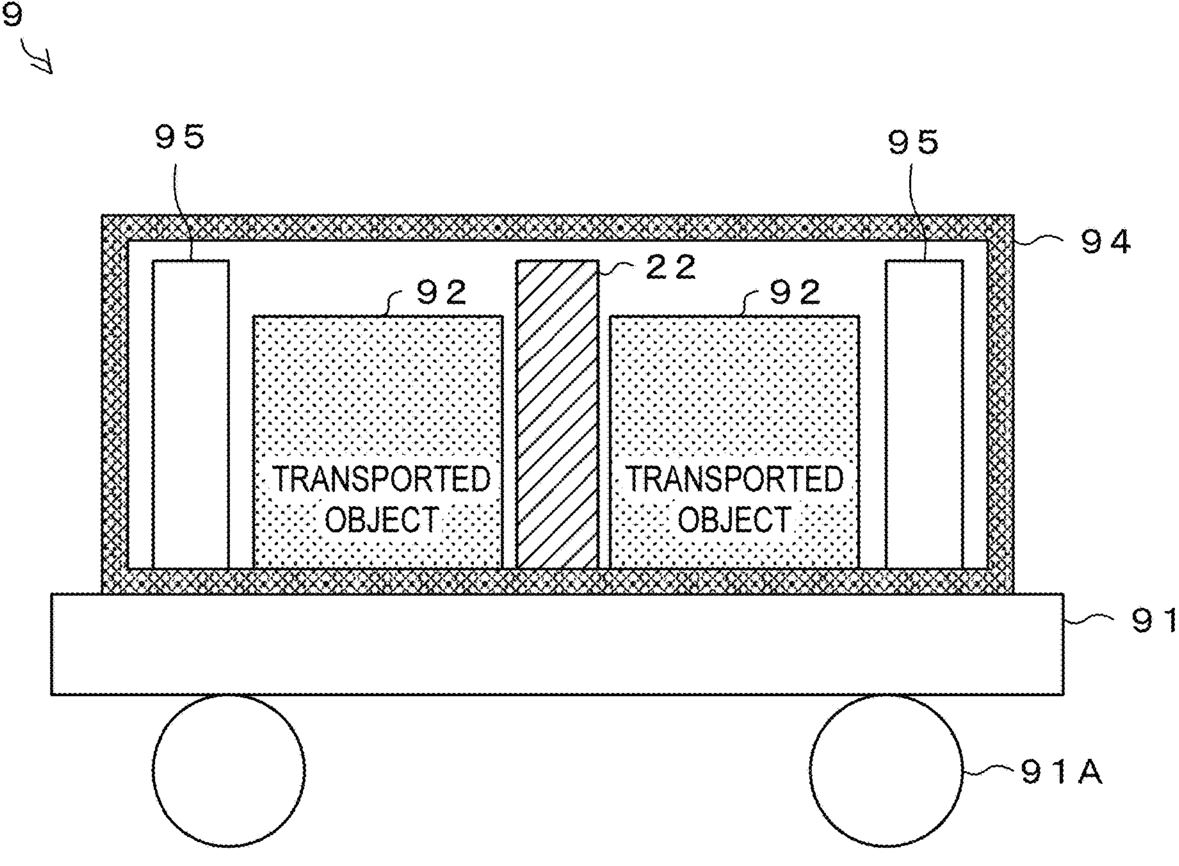
FIG. 26 is a drawing illustrating an example of the transported object and the transporting section relating to a third embodiment.
Figure 27:
FIG. 27 is a drawing illustrating another example of the transported objects and the transporting section relating to the third embodiment.
Figure 27:
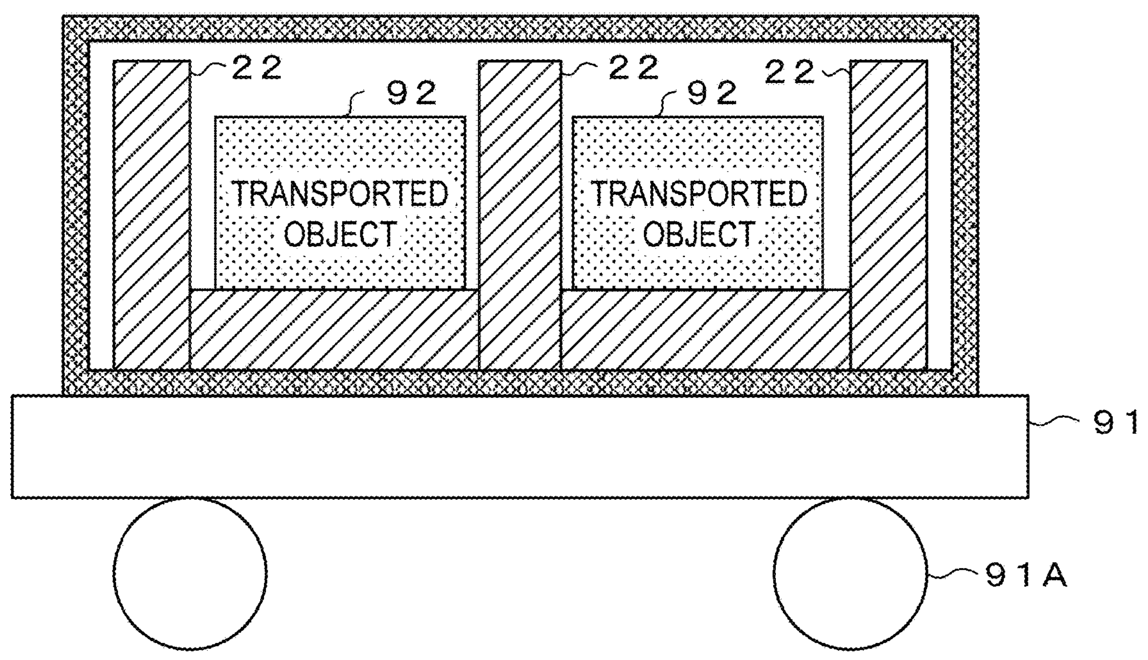

A transporting body, which includes a transported object whose behavior state is to be estimated, is illustrated as the transporting body 9 in FIG. 26 and FIG. 27. FIG. 26 and FIG. 27 illustrate examples in which the transported objects 92 are accommodated at the interior of case 94 that is a box or the like for transporting, and buffering materials are disposed at the peripheries of the transported objects 92, and this case 94 is placed on the transporting section 91 that transports by the rotational driving of the rotating driving section 91A. FIG. 26 is an example in which the electrically-conductive urethane 22 is disposed between the plural transported objects 92 that are accommodated within the case 94, and is an example in which buffering materials 95 are disposed at the respective peripheries of the plural transported objects. Note that the electrically-conductive urethane 22 functions also as a buffering material. FIG. 27 is an example in which electrically-conductive urethane 22 is disposed at the periphery of each of the plural transported objects, instead of the buffering material 95.

At the transporting body 9, the behavior state of the transported object 92 that is accommodated in the case 94 interior is estimated from electrical characteristics of the electrically-conductive urethane 22.

Figure 28:
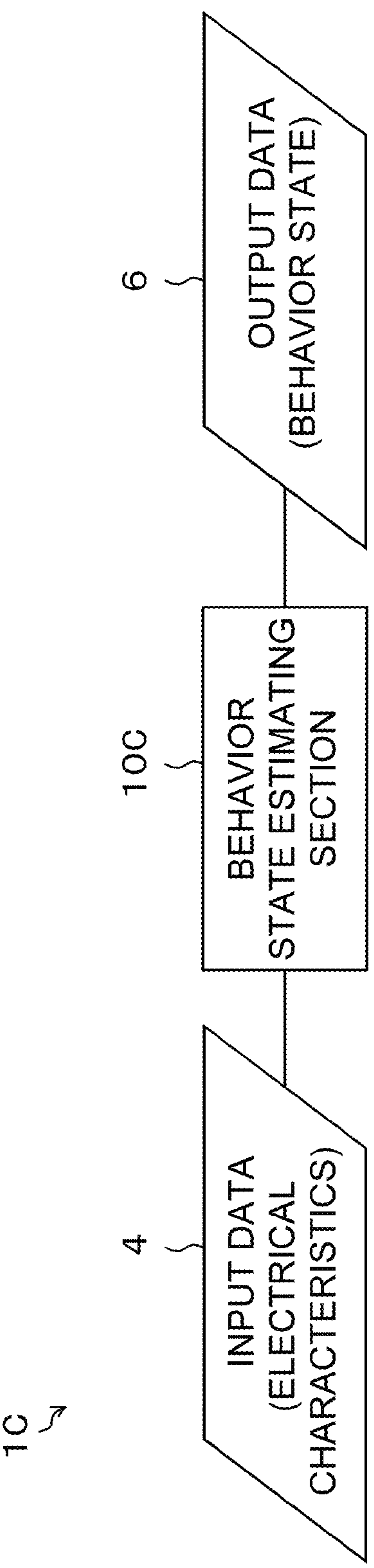
FIG. 28 is a drawing illustrating an example of the structure of a behavior state estimating device relating to the third embodiment.

An example of the structure of an estimating device 1C that serves as the behavior state estimating device relating to the present embodiment is illustrated in FIG. 28. The estimating device 1C illustrated in FIG. 28 has a behavior state estimating section 10C instead of the estimating section 5 illustrated in FIG. 1.

By using the trained learning model 51, the estimating processing at the estimating device 1C estimates and outputs the behavior state of an unknown transported object (object of estimation). The learning model 51 is trained by learning data that includes electrical characteristics of the electrically-conductive urethane 22 and behavior states of the transported object that is placed on the electrically-conductive urethane 22.

The learning processing that generates the learning model 51 relating to the present embodiment is described next. Learning is carried out by using, as learning data, electrical characteristics of the electrically-conductive urethane 22 (the input data 4) whose labels are behavior state information (the state data 3) expressing behavior states of the transported object.

First, the learning data that is used in the learning processing is described. Note that, because the measuring device 8 that acquires the learning data is similar to the above-described measuring device 8, detailed description thereof is omitted.

In the present embodiment, description is given of a case in which states relating to behavior such as movement and vibration and the like of the transported object 92 (the states of the transported object 92 illustrated by the one-dot chain line and the two-dot chain line in FIG. 11) are artificially reproduced by applying pressure stimuli by the pressure applying section 83. However, the technique of the present disclosure is not limited to this. For example, as another example of a state relating to behavior such as movement and vibration and the like of the transported object 92, the transported object 92 may be moved, or the measuring device 8 may be loaded on a moving body and moved so as to apply a moment, and a pressure stimulus that applies a moment may be reproduced.

The behavior state of the transported object is described next.

The electrical characteristics of the electrically-conductive urethane 22 fluctuate due to the position and the magnitude of the pressure stimulus applied from the transported object 92. For example, the transported object 92 moves or vibrates within the case 94 in accordance with the transporting state of the transporting section 91. Accordingly, the electrical characteristics of the electrically-conductive urethane 22 become characteristics in which physical amounts, such as the position, the distribution and the magnitude of the applied physical stimulus, and the number of times of an applied stimulus that is applied intermittently (e.g., the frequency per unit time), and the like, are reflected as tendencies expressing movement and vibration. Thus, in the present embodiment, a physical amount such as the position, distribution, magnitude, number of times or the like of the applied pressure stimulus is, as a tendency, used as an index that expresses the behavior state.

A physical amount relating to a pressure stimulus that is applied to the electrically-conductive urethane 22 at the above-described measuring device 8 can be used as an index that expresses the behavior state relating to the present embodiment.

Behavior state information (the state data 3), which express behavior states of the transported object 92, can be set in accordance with the above-described index. Accordingly, by deriving the above-described tendency that is exhibited in the electrical characteristics of the electrically-conductive urethane 22, it is possible to set the behavior state of the transported object 92 in correspondence with the time-series electrical characteristics relating to the stimulus to the electrically-conductive urethane 22, as another one learning data. Accordingly, the set that is formed by the information, which express respectively the time-series electrical characteristics at the electrically-conductive urethane 22 and the behavior state of the transported object 92 with respect to the electrical characteristics, is used as the learning data.

Examples of learning data are illustrated next as a table. Table 6 is an example of data sets, in which time-series electrical resistance value data (r) and state data (R) expressing behavior states are set in correspondence, as learning data relating to the behavior state of the transported object 92 in accordance with the pressure stimulus aspect.

TABLE 6

| time-series electrical resistance value data (r) | *pressure stimulus R → behavior state (vibration) (position x, frequency h) | notes |
|---|---|---|
| r11, r12, r13, . . . , r1n | Ra1(x1, h1) | shaking (slight) |
| r21, r22, r23, . . . , r2n | Ra2(x2, h2) | shaking (medium) |
| rk1, rk2, rk3, . . . , rkn | Ra3(x3, h3) | shaking (large) |
| . . . | . . . | . . . |

Table 6 is an example of state data (Ra) that is made to correspond to the behavior state in accordance with the pressure stimulus aspect, as the state data (R). It suffices to set the state data (R) in correspondence with any physical amount expressing a tendency that is exhibited in the above-described electrical characteristics. Table 6 illustrates a case in which the position (x) of the pressure stimulus and the frequency (h) of the pressure stimulus are used as the state data (R) that serve as indices expressing the behavior state. Note that the notes column in Table 6 shows examples in which information, which express messages that are intuitive to a user, are set in correspondence with the position (x) of the pressure stimulus and the frequency (h) of the pressure stimulus that are the state data (R). Accordingly, because the behavior state of the transported object 92 in accordance with the pressure stimulus aspect is expressed distinctively in the time-series electrical characteristics of the electrically-conductive urethane 22, this functions effectively in the learning processing.

A case of measuring the electrical characteristics of the electrically-conductive urethane 22 with respect to the behavior state of the transported object in accordance with a material stimulus aspect, is described next.

The electrical characteristics of the electrically-conductive urethane 22 fluctuate due to the position and magnitude of an applied material stimulus such as a leak of the transported object 92 or the like. Accordingly, it is possible to detect that the transported object 92 will be in a behavior state that has changed from the initial state in which the transported object 92 was accommodated at the interior of the case 94, e.g., a state of the transported object 92 such as a leak or the like that becomes larger as the magnitude of the material stimulus increases. Accordingly, the tendency for the state of the material of the transported object 92 to vary in accordance with the position and magnitude (e.g., the content of a liquid such as moisture or the like, the water content or the percentage of contained water, which serve as moisture contents) or the like of the applied material stimulus, appears in the electrical characteristics of the electrically-conductive urethane 22. Thus, in the present embodiment, the tendency for the state of the material to change is quantified by the material stimulus applied to the electrically-conductive urethane 22, and is used as an index expressing the material change state.

At the measuring device 8, moisture is applied to the electrically-conductive urethane 22 by the moisture applying section 86. The properties of the electrically-conductive urethane 22 vary (are altered) due to the application of a material stimulus by the moisture applying section 86. Accordingly, by measuring the electrical characteristics of the electrically-conductive urethane 22 with respect to the moisture content that is applied as the material stimulus, it is possible to set the behavior state of the transported object 92 that is in accordance with the material stimulus aspect, in correspondence with time-series electrical characteristics relating to the stimulus to the electrically-conductive urethane 22, as another one learning data. Accordingly, the set that is formed by the information, which express respectively the time-series electrical characteristics at the electrically-conductive urethane 22 and the behavior state of the transported object 92 with respect to the electrical characteristics, is used as the learning data.

Examples of data sets, in which time-series electrical resistance value data (r) and state data (R) expressing behavior states are set in correspondence, are illustrated in following Table 7 as learning data relating to the behavior state of the transported object 92 in accordance with the material stimulus aspect.

TABLE 7

| time-series electrical resistance value data | *material stimulus R → behavior state (state of leak) (moisture content g and position y) | notes |
|---|---|---|
| r11, r12, r13, . . . , r1n | Rb1(g1: y1) | no leak |
| r21, r22, r23, . . . , r2n | Rb2(g2: y2) | there is a leak |
| rk1, rk2, rk3, . . . , rkn | Rb3(g3: y3) | large leak |
| . . . | . . . | . . . |

Table 7 is an example of state data (Rb) that is made to correspond to the behavior state in accordance with the material stimulus aspect, as the state data (R). Table 7 illustrates a case in which the moisture content (g) and the position (y) of the leak are used as the state data (R). Namely, due to moisture being applied to the electrically-conductive urethane 22, the properties of the material vary (are altered), and the electrical characteristics (e.g., the electrical resistance values) vary. Accordingly, the electrical characteristics (e.g., the electrical resistance values) vary in accordance with the position and the amount of moisture. It suffices to acquire, as the learning data, data that relates to this change. Note that the notes column in Table 7 shows examples in which information, which express messages that are intuitive to a user, are set in correspondence with the moisture amount (g) that is the state data (R). Accordingly, because the behavior state of the transported object 92 in accordance with the material stimulus aspect is expressed distinctively in the time-series electrical characteristics of the electrically-conductive urethane 22, this functions effectively in the learning processing.

By the way, because the electrically-conductive urethane 22 is disposed at the periphery of the transported object at the interior of the case 94, it is thought that, with regard to leaks from the transported object 92, a pressure stimulus is applied and a material stimulus is applied to the electrically-conductive urethane 22. For example, it is thought that, if a leak from the transported object 92 arises, there will be electrical characteristics that vary even more from the electrical characteristics in the state in which the transported object 92 was contacted before the leak. Thus, the behavior state of the transported object 92 at the time when a pressure stimulus and a material stimulus are applied to the electrically-conductive urethane 22 is considered. Consideration of the behavior state of the transported object 92 at the time when a pressure stimulus and a material stimulus are applied can be realized by combining above Table 5 and Table 6. Further, concretely, it is also possible to use electrical characteristics of a time when a pressure stimulus and a material stimulus are applied.

Following Table 8 illustrates an example of data sets, in which time-series electrical resistance value data (r) and state data (R) expressing behavior states are set in correspondence, as learning data relating to the behavior state of the transported object 92 in accordance with the pressure stimulus and the material stimulus aspects.

TABLE 8

| time-series electrical resistance value data | *pressure stimulus, material stimulus R → behavior state (vibration, leak) | notes |
|---|---|---|
| r11, r12, r13, . . . , r1n | Rc1(Ra1, Rb1) | shaking (slight) no leak |
| r21, r22, r23, . . . , r2n | Rc2(Ra2, Rb2) | shaking (medium) there is a leak |
| rk1, rk2, rk3, . . . , rkn | Rc3(Ra3, Rb3) | shaking (large) large leak |
| . . . | . . . | . . . |

Table 8 is an example of state data (Rc) that is made to correspond to the behavior state in accordance with both the pressure stimulus and the material stimulus aspects, as the state data (R). Table 8 illustrates a case in which the above-described state data (Ra) and state data (Rb) are used as the state data (R). Note that the notes column in Table 8 shows examples in which information, which express messages that are intuitive to a user, are set in correspondence with the pressure stimulus and the material stimulus that are the state data (R). Accordingly, because the behavior state of the transported object 92 in accordance with both the pressure stimulus and the material stimulus aspects is expressed distinctively in the time-series electrical characteristics of the electrically-conductive urethane 22, this functions effectively in the learning processing.

Learning processing that generates the learning model 51, which relates to the behavior state of the transported object 92 relating to the present embodiment, is described next.

Figure 29:
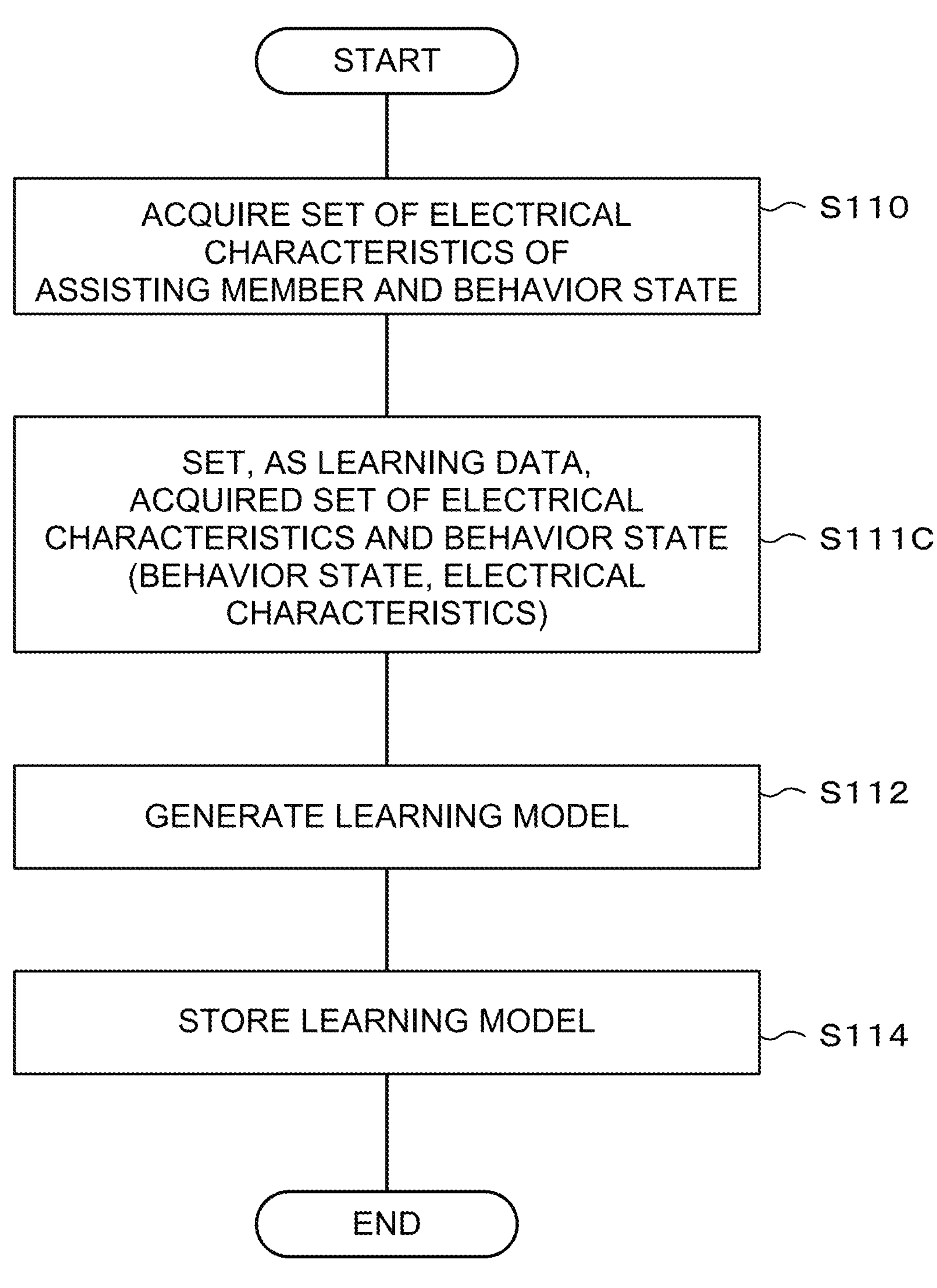
FIG. 29 is a drawing illustrating an example of the flow of learning processing relating to the third embodiment.

FIG. 29 illustrates an example of the flow of learning processing executed at the learning processing section 52. The learning processing illustrated in FIG. 29 is carried out by the processing of an unillustrated CPU at the above-described learning processing section 52. In the learning processing relating to the present embodiment, step S111C is executed instead of step S111 of the learning processing illustrated in FIG. 13.

After the electrical characteristics of the above-described electrically-conductive urethane 22 (the input data 4) are acquired (step S110), the state data 3 expressing the behavior state of the transported object 92 is acquired (step S111C) by deriving an index that expresses the behavior state and that was given to the electrical characteristics of the electrically-conductive urethane 22 (the input data 4). In this step S111C, the input data 4 that are the electrical characteristics of the target object 2, and the state data 3 that expresses the behavior state of the transported object 92, are set in correspondence with one another, and the set of the input data 4 (e.g., electrical resistances) whose label is the state data 3 (e.g., the index) is acquired as learning data. Next, the learning model 51 is generated by using the acquired learning data (step S112). Data, which is expressed as the collection of the information of the weighting parameters of the connections between the nodes which are the results of learning, are stored as the learning model 51 (step S114). Note that the processings of step S110 and step S111 are examples of processings executed by the acquiring section of the present disclosure. Further, the processing of step S112 is an example of processing executed by the learning model generating section of the present disclosure.

The processing of estimating the behavior state of a transported object by using the learning model 51 relating to the present embodiment is described next.

As described above, at the estimating device 1C, by using the trained learning model 51 that has been generated by the method exemplified above, it is possible to identify the behavior state of a transported object from the electrical characteristics that are due to the stimulus applied by the transported object 92, if the learning model 51 that has been sufficiently trained is used.

Note that the estimating device 1C is an example of the estimating section and the estimating device of the present disclosure. The electrical characteristic detecting section 76 is an example of the detecting section of the present disclosure. The operation/display portion 116 is an example of the outputting section of the present disclosure.

Figure 30:
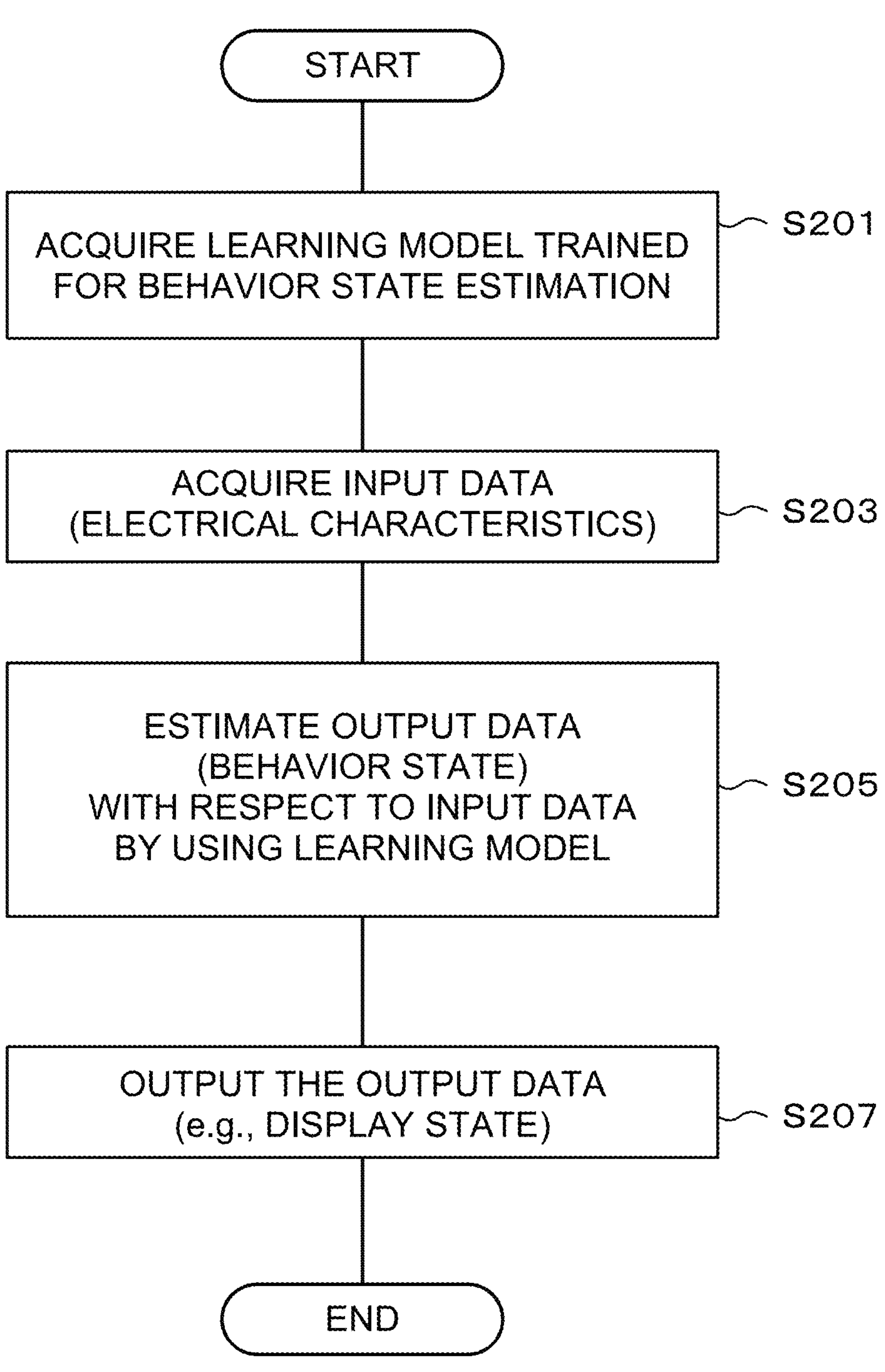
FIG. 30 is a flowchart illustrating an example of the flow of behavior state estimating processing relating to the third embodiment.

An example of the flow of the processing of estimating the behavior state of a transported object in accordance with the control program 108P executed at the computer main body 100 is illustrated in FIG. 30. The estimating processing illustrated in FIG. 30 is executed by the CPU 102 when the power of the computer main body 100 is turned on. In the estimating processing illustrated in FIG. 30, step S205C is executed instead of step S205 of the estimating processing illustrated in FIG. 14.

First, the learning model 51 is acquired and the learning model 51 is constructed due to the learning model 51, which has been trained for the above-described behavior state estimation, being read-out from the learning models 108M of the auxiliary storage device 108 and being expanded in the RAM 104 (step S201). Here, the learning model 51, which has been trained by any of the above-described behavior state of the transported object 92 in accordance with the pressure stimulus aspect (Table 6), behavior state of the transported object 92 in accordance with the material stimulus aspect (Table 7), and behavior state of the transported object 92 in accordance with both the physical stimulus and the material stimulus aspects (Table 8), is constructed.

Next, the time-series input data 4 (electrical characteristics) in a state in which the unknown transported object 92 (object of estimation) is placed is acquired via the detecting section 118 (step S203).

Next, in step S205C, by using the learning model 51 acquired in step S201, the output data 6 (the behavior state of the object of estimation) that corresponds to the input data 4 (the electrical characteristics) acquired in step S203 is estimated. Then, the output data 6 (the behavior state of the object of estimation) that is the results of estimation is outputted via the communication section 114 (step S207), and the present processing routine is ended.

Note that, in step S207 of the present embodiment, it is also possible to output a message that is intuitive to the user, as information expressing the behavior state of the transported object 92. Further, in step S207, it is also possible to output control information such as a control command of the transporting section 91 or the like. For example, in a case in which the transported object 92 is in a predetermined behavior state, in addition to giving notice of information expressing the estimated behavior state, it is possible to output a predetermined control command, e.g., a control command to stop the rotating driving section 91A of the transporting section 91 or the like. Namely, the behavior state estimating device can output, to an unillustrated control section that controls the transporting by the transporting section 91, control information expressing a control command such as stoppage of transporting or the like, such that there becomes a transporting state of the transporting section 91 such as a state in which transporting by the transporting section is stopped or the like. By outputting control information such as a control command or the like in this way, the user can be notified of the behavior state of the transported object 92 by the behavior of the transporting section 91.

Further, the output data 6 that is outputted as the results of estimation may include history information expressing a history relating to behavior of the transported object 92. For example, history information expressing continuous or intermittent behavior states from a start period (e.g., the start time, or the initial period of being accommodated in the case 94, or the like) to an end period (e.g., an end time, or the period of being removed from the case 94, or the like), can be used as the history of the behavior of the transported object 92. It suffices to successively accumulate information expressing the behavior state as data in a memory such as the auxiliary storage device 108 or the like each time that the output data 6 is obtained (e.g., each fixed time period or the like), and to use the accumulated data as the history information. By storing, accumulating and outputting history information relating to the behavior of the transported object 92, the user can confirm what kind of state the transported object 92 was sent in. For example, from the standpoint of ensuring the quality of the transported object 92, in a case in which the history information in the output data 6 expresses that there was (slight) shaking and no leaks for example, the history information can be utilized as proof that the transported object 92 was sent in an environment in which there was little vibration and such that there was no leaking of liquid from the transported object 92 to the exterior.

The estimating processing illustrated in above-described FIG. 30 is an example of the processings executed by a computer in the estimating method of the present disclosure.

As described above, in accordance with the present disclosure, it is possible to estimate the behavior state of an object of estimation, from electrical characteristics of the object of estimation at which the behavior state of a transported object is unknown. Namely, it is possible to estimate the behavior state of a transported object that is the object of estimation, by using the electrical characteristics of the electrically-conductive urethane 22 and without using a special detecting device.

Further, by outputting the results of estimation of the behavior state of the transported object 92, it is possible to provide the user with the current behavior state of the transported object 92. Further, by storing, accumulating and outputting the estimated results of the behavior state of the transported object 92, it is also possible to provide the user with the behavior state of the transported object 92 in the midst of transporting.

Third Modified Example

A modified example of the behavior estimating device relating to the present embodiment is described next. There are cases in which the above-described behavior state of the transported object 92 is improved, such as vibrations applied to the transported object 92 decrease or the like, by changing the transporting state of the transporting section 91. In a case in which changing of the transporting state of the transporting section 91 is preferable for the transported object 92 that is transported, it can be thought that the outputting of information, which expresses that the transporting state of the transporting section 91 is to be changed, will affect the transported object 92 effectively. For example, it is preferable that the transported object 92 that is a breakable object or the like be transported by transporting in which vibrations that are applied to the transported object 92 are reduced. The behavior state estimating device relating to the present embodiment can output instruction information corresponding to the estimated behavior state of the transported object 92. Instruction information is a concept including information expressing a predetermined, preferable behavior state of the transported object 92, e.g. a state in which vibrations applied to the transported object 92 are reduced.

It is also possible to output the above-described message that is intuitive to a user as instruction information corresponding to the behavior state of the transported object 92. Message information to transition to a transporting state relating to shaking, such as "reduce transporting speed" or the like, in accordance with the large/medium/small magnitude of the shaking that represents the behavior state of the transported object 92, can be used as an example of the message information. Further, a control value of the transporting of the transporting section 91 itself may be outputted. For example, a control value that expresses reducing the vehicle speed by a predetermined proportion (e.g., 10%) from the current vehicle speed may be outputted. Further, in a case of large vibrations, there is the possibility of being on a bad road, and therefore, a message such as "Because poor roads are anticipated, change the transportation route." or the like may be outputted. By outputting instruction information in this way, the user can recognize the current behavior state of the transported object 92, and, in a case in which it is judged that the behavior state is a behavior state that is unfavorable for transporting the transported object 92, an appropriate processing can be carried out such as changing the transporting state of the transporting section 91 from then on, e.g., changing the speed or changing the transportation route or the like of the transporting section 91 that is a moving body or the like.

Figure 31:
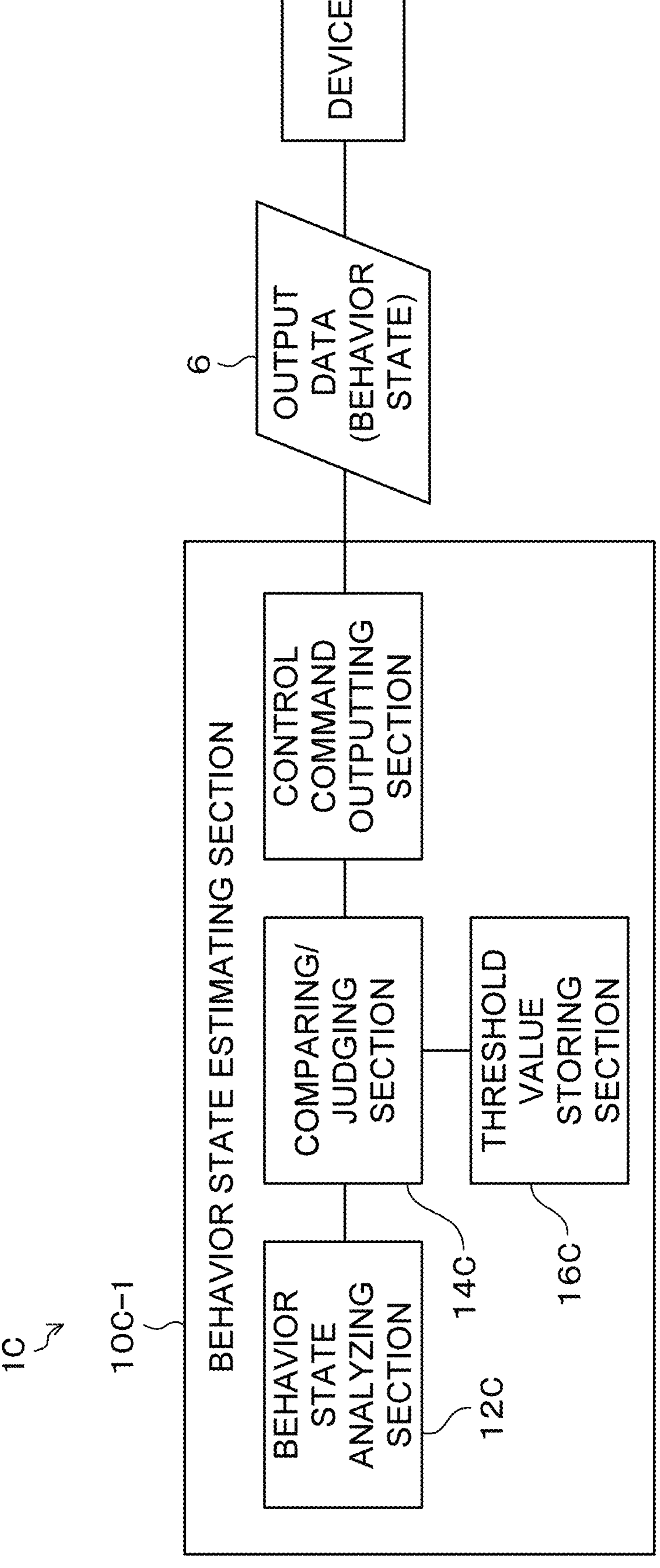
FIG. 31 is a drawing illustrating a modified example of a behavior state estimating section relating to the third embodiment.

FIG. 31 illustrates the structure of the behavior state estimating section 10C relating to a modified example as behavior state estimating section 10C-1. The behavior state estimating section 10C-1 includes a behavior state analyzing section 12C, a comparing/judging section 14C, and a threshold value storing section 16C.

The behavior state analyzing section 12C is a functional section that analyzes the behavior state of the transported object 92 by using time-series electrical characteristics from the electrically-conductive urethane 22 (the input data 4). The behavior state analyzing section 12C derives an index that is expressed by the tendency of the behavior state included in the above-described electrical characteristics. The comparing/judging section 14C is a functional section that is connected to the threshold value storing section 16C that stores a threshold value for judging the behavior state, and compares the behavior state that is the results of analysis and the threshold value for judging the behavior state, and outputs the results of comparison. For example, it suffices for the threshold value storing section 16C to store, in the ROM 106 or the auxiliary storage device 108, a threshold value for judging the behavior state so as to correspond to messages that are intuitive to users, or the like. Further, by using the threshold value for judging the behavior state for example, the comparing/judging section 14C outputs output data that includes instruction information corresponding to the derived index.

Note that, as illustrated in FIG. 31, the behavior state estimating section 10C may be connected to a device to which the output data 6 is inputted. Examples of the device are the above-described operation/display portion 116, or a decelerating section, an accelerating section, a suspension section or the like for causing braking as the transporting state of the transporting section.

Figure 32:
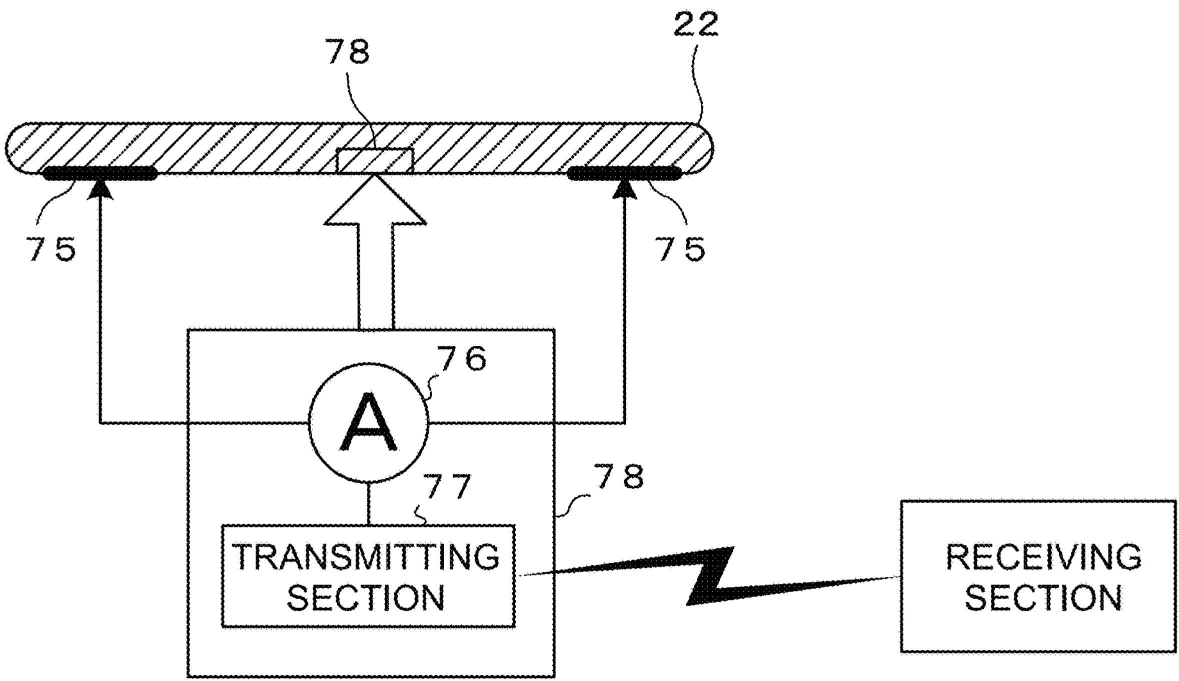
FIG. 32 is a drawing illustrating an example of wireless communication relating to the third embodiment.

Note that the above embodiment describes an example in which the behavior state estimating section 10C is connected to the electrically-conductive urethane 22 via the electrical characteristic detecting section 76, but this connection may be wired connection or may be wireless connection. For example, in the case of wireless connection, as illustrated in FIG. 32, it suffices to provide the transmitting unit 78, which includes the electrical characteristic detecting section 76 and the transmitting section 77, at the electrically-conductive urethane 22 side.

As described above, the present disclosure can estimate the behavior state of a transported object by using the electrical characteristics of an assisting member that has a flexible material that is electrically conductive, without using a special detecting device. Further, the technique of the present disclosure includes various processings being realized by software structures or hardware structures using a computer, and therefore includes the following techniques.

A twenty-first technique that serves as the above-described third aspect is an estimating device comprising:

- a detecting section detecting electrical characteristics between a plurality of predetermined detection points at a flexible material that is electrically conductive and whose electrical characteristics vary in accordance with magnitude of an applied stimulus and that is at an assisting member that has the flexible material and is provided at an interior of a transporting section that transports a transported object; and
- an estimating section that inputs time-series electrical characteristics detected by the detecting section to a learning model that is trained by using, as learning data, time-series electrical characteristics at times when a stimulus was applied to the flexible material, and behavior state information that expresses a behavior state of the transported object with respect to the assisting member that applies a stimulus to the flexible material, such that the time-series electrical characteristics are inputs of the learning model and the learning model outputs the behavior state information, and the estimating section estimates behavior state information expressing a behavior state corresponding to inputted time-series electrical characteristics.

In a twenty-second technique, in the estimating device of the twenty-first technique,

- the electrical characteristics are volume resistances,
- the assisting member includes a member that is flexible,
- the behavior state includes a state in which at least one stimulus among a pressure stimulus and a material stimulus is applied by the transported object to the assisting member, and
- the learning model is trained so as to output, as the behavior state information, information expressing a state in which at least one stimulus among the pressure stimulus and the material stimulus is applied by the transported object that corresponds to detected electrical characteristics.

In a twenty-third technique, in the estimating device of the twenty-second technique,

- the transporting section has a case that accommodates the transported object,
- the assisting member is provided at an interior of the case,
- the behavior state includes a moving state expressing movement of the transported object at the interior of the case, and
- the estimating section estimates the moving state of the transported object at the interior of the case.

In a twenty-fourth technique, in the estimating device of the twenty-third technique,

- the assisting member is provided at at least a portion of a mitigating material that is disposed at a periphery of the transported object and mitigates impact with respect to the transported object.

In a twenty-fifth technique, in the estimating device of any one of the twenty-first technique through the twenty-fourth technique,

- the assisting member includes a rubber material at which electrical conductivity is imparted to at least a portion of a rubber member that is flexible, or a urethane material at which electrical conductivity is imparted to at least a portion of a urethane of a structure having a skeleton that is at least one of fiber-like and mesh-like or a structure in which a plurality of minute air bubbles are scattered at an interior thereof.

In a twenty-sixth technique, in the estimating device of any one of the twenty-first technique through the twenty-fifth technique,

- the learning model includes a model generated by learning by using a network that uses the flexible material as a reservoir and is in accordance with reservoir computing using the reservoir.

In a twenty-seventh technique, the estimating device of any one of the twenty-first technique through the twenty-sixth technique further comprises:

- an outputting section outputting results of estimation of the estimating section.

In a twenty-eighth technique, in the estimating device of the twenty-seventh technique, the outputting section outputs control information relating to transporting control of the transporting section, such that there becomes a predetermined transporting state of the transporting section corresponding to a behavior state of results of estimation.

A twenty-ninth technique is an estimating method in which a computer:

acquires information from a detecting section that detects electrical characteristics between a plurality of predetermined detection points at a flexible material that is electrically conductive and whose electrical characteristics vary in accordance with magnitude of an applied stimulus and that is at an assisting member that has the flexible material and is provided at an interior of a transporting section that transports a transported object; and inputs time-series electrical characteristics detected by the detecting section to a learning model that is trained by using, as learning data, time-series electrical characteristics at times when a stimulus was applied to the flexible material, and behavior state information that expresses a behavior state of the transported object with respect to the assisting member that applies a stimulus to the flexible material, such that the time-series electrical characteristics are inputs of the learning model and the learning model outputs the behavior state information, and the computer estimates behavior state information expressing a behavior state corresponding to inputted time-series electrical characteristics.

A thirtieth technique is an estimating program for causing a computer to execute processings of:

acquiring information from a detecting section that detects electrical characteristics between a plurality of predetermined detection points at a flexible material that is electrically conductive and whose electrical characteristics vary in accordance with magnitude of an applied stimulus and that is at an assisting member that has the flexible material and is provided at an interior of a transporting section that transports a transported object; and inputting time-series electrical characteristics detected by the detecting section to a learning model that is trained by using, as learning data, time-series electrical characteristics at times when a stimulus was applied to the flexible material, and behavior state information that expresses a behavior state of the transported object with respect to the assisting member that applies a stimulus to the flexible material, such that the time-series electrical characteristics are inputs of the learning model and the learning model outputs the behavior state information, and the computer estimates behavior state information expressing a behavior state corresponding to inputted time-series electrical characteristics.

Note that the above-described program can be applied to the following computer program product.

A computer program product for information processing, wherein the computer program product has a computer-readable storage medium that itself is not a transitory signal, a program is stored on the computer-readable storage medium, and the program causes a computer to execute:

acquiring information from a detecting section that detects electrical characteristics between a plurality of predetermined detection points at a flexible material that is electrically conductive and whose electrical characteristics vary in accordance with magnitude of an applied stimulus and that is at an assisting member that has the flexible material and is provided at an interior of a transporting section that transports a transported object; and inputting time-series electrical characteristics detected by the detecting section to a learning model that is trained by using, as learning data, time-series electrical characteristics at times when a stimulus was applied to the flexible material, and behavior state information that expresses a behavior state of the transported object with respect to the assisting member that applies a stimulus to the flexible material, such that the time-series electrical characteristics are inputs of the learning model and the learning model outputs the behavior state information, and the computer estimates behavior state information expressing a behavior state corresponding to inputted time-series electrical characteristics.

A thirty-first technique is a learning model generating device comprising:

an acquiring section acquiring electrical characteristics from a detecting section that detects electrical characteristics between a plurality of predetermined detection points at a flexible material that is electrically conductive and whose electrical characteristics vary in accordance with magnitude of an applied stimulus and that is at an assisting member, which has the flexible material and is provided at an interior of a transporting section that transports a transported object, and acquiring behavior state information expressing a behavior state of a transported object with respect to the assisting member that applies a stimulus to the flexible material; and a learning model generating section that, by using, as learning data, time-series electrical characteristics at times when a stimulus was applied to the flexible material and behavior state information expressing behavior states of the transported object with respect to the assisting member that applies a stimulus to the flexible material, generates a learning model whose inputs are the time-series electrical characteristics and that outputs the behavior state information.

In accordance with the above-described techniques, there is the effect that the behavior state of a transported object can be estimated by using electrical characteristics of an assisting member having a flexible material that is electrically conductive, without using a special detecting device.

Other Embodiments

The present disclosure describes a case in which an electrically-conductive urethane is used as an example of the flexible member. However, it suffices for the flexible member to be flexible, and the flexible member is, of course, not limited to the above-described electrically-conductive urethane.

Further, the technical scope of the present disclosure is not limited to the scopes described in the above embodiments. Various changes and improvements can be made to the above-described embodiments within a scope that does not depart from the gist, and forms to which such changes and improvements are made also are included in the technical scope of the present disclosure.

Further, the above embodiments describe cases in which the estimating processing and the learning processing are realized by software structures in accordance with processings using flowcharts. However, the present disclosure is not limited to this, and may be a form in which the respective processings are realized by hardware structures for example. Further, at least some of the processings of the programs may be realized by hardware. Further, the flows of the processings of the programs described in the above embodiments also are examples, and unnecessary steps may be deleted therefrom, new steps may be added thereto, or the order of processings may be changed, within a scope that does not depart from the gist.

Further, portions of the estimating device, e.g., the neural network of the learning model or the like, may be structured by hardware circuits.

Moreover, in order to cause the processings in the above embodiments to be executed by a computer, programs, in which the above-described processings are written in code that can be processed by a computer, may be stored on a storage medium or the like such as an optical disc or the like, and distributed.

The above embodiments describe using a CPU as an example of a generic processor. However, in the above embodiments, processor means a processor in the broad sense and includes generic processors (e.g., CPUs and the like), and dedicated-use processors (e.g., GPUs: Graphics Processing Units, ASICs: Application Specific Integrated Circuits, FPGAs: Field-Programmable Gate Arrays, programmable logic devices, and the like).

Further, the operations of the processor in the above-described embodiments may be carried out not only by a single processor, but by plural processors cooperating with one another, and may be carried out by plural processors that exist at locations, which are apart from one another physically, cooperating with one another.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. An estimating device, comprising:

a detecting section detecting electrical characteristics between a plurality of predetermined detection points at a flexible material that is electrically conductive and has electrical characteristics that vary in accordance with a magnitude of an applied stimulus and that is at an assisting member that has the flexible material and is provided at a transporting section that transports a transported object; and an estimating section that inputs time-series electrical characteristics detected by the detecting section to a learning model that is trained by using, as learning data, time-series electrical characteristics at times when a stimulus was applied to the flexible material, and placed state information expressing a placed state of the transported object with respect to the assisting member that applies a stimulus to the flexible material, or contact state information expressing a contact state with an external object that applies deformation to the flexible material, or behavior state information that expresses a behavior state of the transported object with respect to the assisting member that applies a stimulus to the flexible material, such that the time-series electrical characteristics are inputs of the learning model and the learning model outputs the placed state information or the contact state information or the behavior state information, and the estimating section estimates placed state information expressing a placed state corresponding to inputted time-series electrical characteristics, or contact state information expressing a contact state corresponding to inputted time-series electrical characteristics, or behavior state information expressing a behavior state corresponding to inputted time-series electrical characteristics.

2. The estimating device of claim 1, wherein:

the electrical characteristics are volume resistances, the assisting member includes a member that is flexible, and in a case of training the learning model by using the electrical characteristics and the placed state information as the learning data, and such that the time-series electrical characteristics are the inputs and the learning model outputs the placed state information, the placed state includes a state in which a pressure stimulus, or a stimulus that is a pressure stimulus and a material stimulus, is applied by the transported object to the assisting member, and the learning model is trained so as to output, as the placed state information, information expressing a state in which at least one stimulus of the pressure stimulus or the material stimulus is applied by the transported object that corresponds to detected electrical characteristics.

3. The estimating device of claim 2, wherein:

a state in which the pressure stimulus is applied is an equilibrium state of the transported object that varies in accordance with at least one of a center of gravity position of the transported object or a moment.

4. The estimating device of claim 1, wherein:

the assisting member includes a rubber material at which electrical conductivity is imparted to at least a portion of a rubber member that is flexible, or a urethane material at which electrical conductivity is imparted to at least a portion of a urethane of a structure having a skeleton that is at least one of fiber-like or mesh-like or a structure in which a plurality of minute air bubbles are scattered at an interior thereof.

5. The estimating device of claim 1, wherein:

the learning model includes a model generated by learning by using a network that uses the flexible material as a reservoir and is in accordance with reservoir computing using the reservoir.

6. The estimating device of claim 1, further comprising:

an outputting section outputting results of estimation of the estimating section.

7. The estimating device of claim 6, wherein:

the outputting section outputs control information relating to transporting control of the transporting section, such that there becomes a predetermined transporting state of the transporting section corresponding to a placed state of the results of estimation.

8. The estimating device of claim 1, wherein:

the electrical characteristics are volume resistances, the assisting member is an assisting member that is provided at an exterior of the transporting section and includes a member that is flexible, and in a case in which the learning model is trained by using the electrical characteristics and the contact state information as the learning data, and such that the time-series electrical characteristics are the inputs and the learning model outputs the contact state information, the contact state includes a state in which a pressure stimulus is applied by the external object to the assisting member, and the learning model is trained so as to output, as the contact state information, information expressing a state in which the pressure stimulus is applied by the external object that corresponds to detected electrical characteristics.

9. The estimating device of claim 8, wherein:

the assisting member has a predetermined thickness toward an exterior, and the detecting section detects the electrical characteristics at a time at which deformation of the assisting member that has the thickness exceeds a predetermined threshold value.

10. The estimating device of claim 1, wherein:

the electrical characteristics are volume resistances, the assisting member is an assisting member that is provided at an interior of the transporting section and includes a member that is flexible, and in a case in which the learning model is trained by using the electrical characteristics and the behavior state information as the learning data, and such that the time-series electrical characteristics are the inputs and the learning model outputs the behavior state information, the behavior state includes a state in which at least one stimulus of a pressure stimulus or a material stimulus is applied by the transported object to the assisting member, and the learning model is trained so as to output, as the behavior state information, information expressing a state in which at least one stimulus of the pressure stimulus or the material stimulus is applied by the transported object that corresponds to detected electrical characteristics.

11. The estimating device of claim 10, wherein:

the transporting section has a case that accommodates the transported object, the assisting member is provided at an interior of the case, the behavior state includes a moving state expressing movement of the transported object at the interior of the case, and the estimating section estimates the moving state of the transported object at the interior of the case.

12. The estimating device of claim 11, wherein:

the assisting member is provided at at least a portion of a mitigating material that is disposed at a periphery of the transported object and mitigates impact with respect to the transported object.

13. An estimating method in which a computer:

acquires information from a detecting section that detects electrical characteristics between a plurality of predetermined detection points at a flexible material that is electrically conductive and has electrical characteristics that vary in accordance with a magnitude of an applied stimulus and that is at an assisting member that has the flexible material and is provided at a transporting section that transports a transported object; and inputs time-series electrical characteristics detected by the detecting section to a learning model that is trained by using, as learning data, time-series electrical characteristics at times when a stimulus was applied to the flexible material, and placed state information expressing a placed state of the transported object with respect to the assisting member that applies a stimulus to the flexible material, or contact state information expressing a contact state with an external object that applies deformation to the flexible material, or behavior state information that expresses a behavior state of the transported object with respect to the assisting member that applies a stimulus to the flexible material, such that the time-series electrical characteristics are inputs of the learning model and the learning model outputs the placed state information or the contact state information or the behavior state information, and the computer estimates placed state information expressing a placed state corresponding to inputted time-series electrical characteristics, or contact state information expressing a contact state corresponding to inputted time-series electrical characteristics, or behavior state information expressing a behavior state corresponding to inputted time-series electrical characteristics.

14. A non-transitory computer-readable medium storing an estimating program for causing a computer to execute processing of:

acquiring information from a detecting section that detects electrical characteristics between a plurality of predetermined detection points at a flexible material that is electrically conductive and has electrical characteristics that vary in accordance with a magnitude of an applied stimulus and that is at an assisting member that has the flexible material and is provided at a transporting section that transports a transported object; and inputting time-series electrical characteristics detected by the detecting section to a learning model that is trained by using, as learning data, time-series electrical characteristics at times when a stimulus was applied to the flexible material, and placed state information expressing a placed state of the transported object with respect to the assisting member that applies a stimulus to the flexible material, or contact state information expressing a contact state with an external object that applies deformation to the flexible material, or behavior state information that expresses a behavior state of the transported object with respect to the assisting member that applies a stimulus to the flexible material, such that the time-series electrical characteristics are inputs of the learning model and the learning model outputs the placed state information or the contact state information or the behavior state information, and the computer estimates placed state information expressing a placed state corresponding to inputted time-series electrical characteristics, or contact state information expressing a contact state corresponding to inputted time-series electrical characteristics, or behavior state information expressing a behavior state corresponding to inputted time-series electrical characteristics.

* * * * *